United States Patent
Aono

(10) Patent No.: US 11,271,655 B2
(45) Date of Patent: *Mar. 8, 2022

(54) OPTICAL TRANSMISSION APPARATUS, OPTICAL RECEPTION APPARATUS, OPTICAL COMMUNICATIONS APPARATUS, OPTICAL COMMUNICATION SYSTEM, AND METHODS OF CONTROLLING THEM

(71) Applicant: NEC Corporation, Tokyo (JP)

(72) Inventor: Yoshiaki Aono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/061,381

(22) Filed: Oct. 1, 2020

(65) Prior Publication Data

US 2021/0021348 A1 Jan. 21, 2021

Related U.S. Application Data

(63) Continuation of application No. 14/915,216, filed as application No. PCT/JP2013/005153 on Aug. 30, 2013, now Pat. No. 10,855,377.

(51) Int. Cl.
*H04B 10/50* (2013.01)
*H04J 14/02* (2006.01)
(Continued)

(52) U.S. Cl.
CPC ............ *H04B 10/50* (2013.01); *H04B 10/40* (2013.01); *H04B 10/60* (2013.01); *H04J 14/00* (2013.01);
(Continued)

(58) Field of Classification Search
None
See application file for complete search history.

(56) References Cited

U.S. PATENT DOCUMENTS

| | | |
|---|---|---|
| 5,483,370 A | 1/1996 | Takahashi |
| 5,940,196 A | 8/1999 | Piehler et al. |

(Continued)

FOREIGN PATENT DOCUMENTS

| | | |
|---|---|---|
| JP | 5-327616 | 12/1993 |
| JP | H05-327616 A | 12/1993 |

(Continued)

OTHER PUBLICATIONS

Office Action issued by Japanese Patent Office in counterpart Japanese Patent Application No. 2019-148701, dated Oct. 6, 2020.

(Continued)

*Primary Examiner* — Jai M Lee

(57) ABSTRACT

An optical transmission apparatus (1_1) according to the present invention includes a first transmission unit (11_1) that transmits a first optical transmission signal (21_1), a second transmission unit (11_2) that transmits a second optical transmission signal (21_2), and an output unit that outputs, when the first optical transmission signal (21_1) and the second optical transmission signal (21_2) share a set of information, both the first optical transmission signal (21_1) and the second optical transmission signal (21_2) to a first path (26_1) and outputs, when the first optical transmission signal (21_1) and the second optical transmission signal (21_2) do not share the set of information, one of the first optical transmission signal (21_1) and the second optical transmission signal (21_2) to a second path (26_2).

28 Claims, 25 Drawing Sheets

(51) Int. Cl.
  *H04B 10/40* (2013.01)
  *H04B 10/60* (2013.01)
  *H04J 14/00* (2006.01)
  *H04J 14/06* (2006.01)
  *H04Q 11/00* (2006.01)

(52) U.S. Cl.
  CPC .......... *H04J 14/02* (2013.01); *H04J 14/0238* (2013.01); *H04J 14/0257* (2013.01); *H04J 14/0267* (2013.01); *H04J 14/0298* (2013.01); *H04B 10/506* (2013.01); *H04J 14/06* (2013.01); *H04Q 11/0005* (2013.01); *H04Q 2011/0016* (2013.01)

(56) References Cited

U.S. PATENT DOCUMENTS

| | | | |
|---|---|---|---|
| 6,721,315 B1* | 4/2004 | Xiong | H04L 49/254 370/389 |
| 8,369,706 B2* | 2/2013 | Sorin | H04Q 11/0067 398/72 |
| 8,818,207 B2 | 8/2014 | Tanaka | |
| 9,130,851 B2 | 9/2015 | Ghiasi | |
| 10,855,377 B2* | 12/2020 | Aono | H04B 10/60 |
| 2002/0041727 A1* | 4/2002 | Zami | H04Q 11/0005 385/16 |
| 2002/0154361 A1 | 10/2002 | Pesach | |
| 2004/0114539 A1* | 6/2004 | Beshai | H04L 49/357 370/254 |
| 2004/0114929 A1* | 6/2004 | Madsen | H04J 14/0298 398/79 |
| 2007/0065153 A1 | 3/2007 | Hong | |
| 2008/0192625 A1* | 8/2008 | Aono | H04L 45/00 370/225 |
| 2009/0092389 A1* | 4/2009 | Wei | H04J 14/0241 398/59 |
| 2009/0226169 A1* | 9/2009 | Wei | H04J 14/0217 398/51 |
| 2009/0257751 A1 | 10/2009 | Sadananda | |
| 2009/0274462 A1 | 11/2009 | Yu | |
| 2010/0028002 A1 | 2/2010 | Qian | |
| 2010/0054735 A1 | 3/2010 | Wei | |
| 2010/0104284 A1 | 4/2010 | Liu | |
| 2010/0232786 A1* | 9/2010 | Aoki | H04J 3/1658 398/19 |
| 2011/0069975 A1 | 3/2011 | Liu et al. | |
| 2011/0176815 A1* | 7/2011 | Frankel | H04B 10/6161 398/184 |
| 2011/0236013 A1* | 9/2011 | Gazzola | H04J 14/0298 398/5 |
| 2012/0141130 A1 | 6/2012 | Nakashima et al. | |
| 2012/0195592 A1 | 8/2012 | Barnard | |
| 2012/0201537 A1* | 8/2012 | Uekama | H04L 45/62 398/51 |
| 2012/0213517 A1* | 8/2012 | Ji | H04J 14/0217 398/48 |
| 2012/0219293 A1 | 8/2012 | Boertjes | |
| 2012/0224851 A1 | 9/2012 | Takara et al. | |
| 2012/0230690 A1 | 9/2012 | Doerr | |
| 2012/0230693 A1 | 9/2012 | Zou | |
| 2012/0275783 A1* | 11/2012 | Kitajima | H04J 14/0212 398/27 |
| 2013/0121700 A1 | 5/2013 | Dong | |
| 2013/0195452 A1 | 8/2013 | Hui | |
| 2013/0251365 A1* | 9/2013 | Sone | H04J 14/0221 398/38 |
| 2014/0044137 A1 | 2/2014 | Miyaji | |
| 2014/0112661 A1 | 4/2014 | Sakane | |
| 2014/0112662 A1 | 4/2014 | Skubic | |
| 2014/0205286 A1* | 7/2014 | Ji | H04J 14/0298 398/45 |
| 2014/0286637 A1* | 9/2014 | Kikuchi | H04J 14/02 398/48 |
| 2014/0294393 A1 | 10/2014 | Lowery | |
| 2014/0314416 A1 | 10/2014 | Vassilieva | |
| 2015/0215688 A1* | 7/2015 | Sambo | H04J 14/0298 398/48 |

FOREIGN PATENT DOCUMENTS

| | | |
|---|---|---|
| JP | 2003-8513 | 1/2003 |
| JP | 2008-206063 | 9/2008 |
| JP | 2009-10679 | 1/2009 |
| JP | 2010-28470 | 2/2010 |
| JP | 2010-81374 | 4/2010 |
| JP | 2012-80384 A | 4/2012 |
| JP | 2012-114640 A | 6/2012 |
| JP | 2012-120010 | 6/2012 |
| JP | 2012-248958 A | 12/2012 |
| JP | 2013-12920 A | 1/2013 |
| JP | 2013-17170 A | 1/2013 |
| JP | 2013-505676 | 2/2013 |
| JP | 2013-085010 A | 5/2013 |
| RU | 2 370 915 C2 | 10/2009 |
| WO | WO 2005/020179 A1 | 3/2005 |
| WO | WO 2005/125263 A1 | 12/2005 |
| WO | WO 2011/030897 A1 | 3/2011 |
| WO | WO 2011/061886 A1 | 5/2011 |
| WO | WO 2012/147889 A1 | 11/2012 |
| WO | WO 2013/067158 A1 | 5/2013 |

OTHER PUBLICATIONS

International Search Report dated Sep. 24, 2013 in corresponding PCT International Application.
Notification of Reasons for Refusal issued by the Japanese Patent Office in counterpart Japanese Patent Application No. 2015-533764 dated Mar. 14, 2017.
Official Action issued by the Russian Patent Office in counterpart Russian Patent Application No. 2016111607/07(018294), dated Mar. 6, 2017.
Extended European Search Report from the European Patent Office in counterpart European Application No. 13 89 2271.1, dated Jun. 21, 2017.
Guoying Zhang et al., "A Survey on OFDM-Based Elastic Core Optical Networking", IEEE Communications Surveys And Tutorials, Institute Of Electrical and Electronics Engineers, US, vol. 15, No. 1, Jan. 1, 2013. pp 65-87.
Decision to Grant a Patent dated Mar. 6, 2018, issued by the Japanese Patent Office (JPO) in counterpart Japanese Patent Application No. 2015-533764.
Notification of Reasons for Refusal of the counterpart Japanese Patent Application No. 2018-004841 dated Dec. 25, 2018.
Decision to Grant a Patent dated Jul. 16, 2019, issued by the Japanese Patent Office in counterpart Japanese Patent Application No. 2018-004841.
Examination Report dated Nov. 5, 2019, issued by the Indian Patent Office in counterpart Indian Patent Application No. 201617006113.
Xu Shao et al., "Shared-Path Protection in OFDM-Based Optical Networks With Elastic Bandwidth Allocation", Optical Fiber Communication Conference (OFC/NFOEC) and the National Fiber Optic Engineers Conference, IEEE, Mar. 4, 2012, pp. 1-3.
Office Action dated May 26, 2020, issued by the European Patent Office in counterpart European Patent Application No. 13 892 271.1.
Misra et al., Guide to Wireless Mesh Networks, 2009, pp. 432-434.
Medhi, Von Neumann Architecture, 2012, http://www2.cs.siu.edu/~cs401 /Textbook/ch2.pdf.
Kazi, Khurram, Optical Networking Standards: A Comprehensive Guide, 2006, Springer Science+Business Media LLC, pp. 88-91 (Year:2006).
Horton, Lindi, Minimum and maximum Ethernet frame sizes, 2011, http://seachnetworking.techtarget.com/answer, Minimum-and-maximum-Ethernet-frame-sizes (Year:2011).

* cited by examiner

OPTICAL TRANSMISSION APPARATUS, OPTICAL RECEPTION APPARATUS, OPTICAL COMMUNICATIONS APPARATUS, OPTICAL COMMUNICATION SYSTEM, AND METHODS OF CONTROLLING THEM

CROSS-REFERENCE TO RELATED PATENT APPLICATIONS

This application is a continuation of U.S. patent application Ser. No. 14/915,216, filed on Feb. 26, 2016, which is a National Stage Entry of International Application No. PCT/JP2013/005153, filed Aug. 30, 2013. The entire contents of the above-referenced applications are expressly incorporated herein by reference.

TECHNICAL FIELD

The present invention relates to an optical transmission apparatus, an optical reception apparatus, an optical communication apparatus, an optical communication system, and methods of controlling them.

BACKGROUND ART

With an explosive increase in demand of a broadband multimedia communication service such as the Internet or video distribution, a dense wavelength-division multiplexing optical fiber communication system, which is suitable for a long-distance and large-capacity transmission and is highly reliable, has been introduced in trunk line networks and metropolitan area networks. In subscriber systems, an optical fiber access service spreads rapidly. In such an optical fiber communication system, cost reduction for laying optical fibers as optical transmission lines and improvement of spectral efficiency per optical fiber are important. Therefore, a wavelength division multiplex (WDM), which multiplexes multiple optical signals having different wavelengths, is widely used. In the WDM technology, one wavelength is used for one channel. On the other hand, in recent years, a SuperChannel technology, which can achieve a transmission capacity that exceeds 100 Gbps for each bandwidth of one channel of the WDM, has been focused. In this SuperChannel technology, a plurality of wavelengths (sub-carriers) are used for the bandwidth of one channel, whereby it is possible to multiplex wavelengths with high density. Therefore, when the transmission capacity increases to 400 Gbps or 1 Tbps in the future, this SuperChannel technology will become more important.

Patent Literature 1 and 2 disclose techniques related to an optical communication using the WDM. Patent Literature 1 discloses a technique related to an optical network apparatus capable of performing an efficient operation, management, and maintenance of a network. Patent Literature 2 discloses a technique related to an optical transmission apparatus capable of reducing an influence of intermixing noise when an electric signal including a plurality of sub-carriers is transmitted by analog optical modulation.

CITATION LIST

Patent Literature

[Patent Literature 1] Japanese Unexamined Patent Application Publication No. 2003-008513

[Patent Literature 2] Japanese Unexamined Patent Application Publication No. 2008-206063

SUMMARY OF INVENTION

Technical Problem

In the communication network, there is a fluctuation in an amount of traffic between predetermined nodes. Therefore, it is not necessary that the transmission between predetermined nodes be always performed at a maximum transmission capacity. On the other hand, as described in Background Art, in the optical communication using the WDM technology, one wavelength is used for one channel. Therefore, in the optical communication apparatus using the WDM technology, there are only two options: whether to turn off the communication or to perform the communication at the maximum transmission capacity, and it is impossible to set the transmission capacity to an intermediate value.

On the other hand, when the SuperChannel technology is used, a plurality of wavelengths are used in the bandwidth of one channel of the WDM, whereby it is possible to set the transmission capacity to the intermediate value. Based on this point, the present inventors have found that, when the transmission capacity is set to an intermediate value using a part of the plurality of wavelengths in the bandwidth of one channel for one transmission apparatus, the resources can be allocated to the other transmission apparatuses using the remaining wavelengths.

In view of the above description, one exemplary object of the present invention is to provide an optical transmission apparatus, an optical reception apparatus, an optical communication apparatus, an optical communication system, and methods of controlling them capable of efficiently allocating resources in an optical communication network.

Solution to Problem

An optical transmission apparatus according to the present invention includes: a first transmission unit that transmits a first optical transmission signal; a second transmission unit that transmits a second optical transmission signal; and an output unit that outputs, when the first optical transmission signal and the second optical transmission signal share a set of information, both the first optical transmission signal and the second optical transmission signal to a first path and outputs, when the first optical transmission signal and the second optical transmission signal do not share the set of information, one of the first optical transmission signal and the second optical transmission signal to a second path.

An optical reception apparatus according to the present invention includes: first and second reception units that receive a sub-carrier reception signal; and a switch unit that outputs a first sub-carrier reception signal and a second sub-carrier reception signal that have been input to the first and second reception units, in which: when the first and second sub-carrier reception signals share a set of information, the switch unit receives the first and second sub-carrier reception signals via one path and outputs the first sub-carrier reception signal to the first reception unit and the second sub-carrier reception signal to the second reception unit, and when the first sub-carrier reception signal and the second sub-carrier reception signal do not share the set of information, the switch unit receives the first and second sub-carrier reception signals via paths different from each other and outputs the first sub-carrier reception signal to the first reception unit and the second sub-carrier reception signal to the second reception unit.

An optical communication apparatus according to the present invention includes: a first transmission unit that transmits a first optical transmission signal; a second transmission unit that transmits a second optical transmission signal; an output unit that outputs, when the first optical transmission signal and the second optical transmission signal share a set of information, both the first optical transmission signal and the second optical transmission signal to a first path and outputs, when the first optical transmission signal and the second optical transmission signal do not share the set of information, one of the first optical transmission signal and the second optical transmission signal to a second path; first and second reception units that receive a sub-carrier reception signal; and a switch unit that outputs a first sub-carrier reception signal and a second sub-carrier reception signal that have been input to the first and second reception units, in which: the switch unit receives, when the first and second sub-carrier reception signals share a set of information, the first and second sub-carrier reception signals via one path and outputs the first sub-carrier reception signal to the first reception unit and the second sub-carrier reception signal to the second reception unit, and the switch unit receives, when the first sub-carrier reception signal and the second sub-carrier reception signal do not share the set of information, the first and second sub-carrier reception signals via paths different from each other and outputs the first sub-carrier reception signal to the first reception unit and the second sub-carrier reception signal to the second reception unit.

An optical communication system according to the present invention includes an optical transmission apparatus and first and second optical reception apparatuses, in which: the optical transmission apparatus includes: a first transmission unit that transmits a first optical transmission signal; a second transmission unit that transmits a second optical transmission signal; and an output unit that outputs, when the first optical transmission signal and the second optical transmission signal share a set of information, both the first optical transmission signal and the second optical transmission signal to the first optical reception apparatus and outputs, when the first optical transmission signal and the second optical transmission signal do not share the set of information, one of the first optical transmission signal and the second optical transmission signal to the second optical reception apparatus.

An optical communication system according to the present invention includes: an optical transmission apparatus that transmits first and second optical transmission signals; first and second optical reception apparatuses that receive the first and second optical transmission signals; and a controller that controls the optical transmission apparatus, in which the optical transmission apparatus outputs the first optical transmission signal and a second optical transmission signal that shares a set of information with the first optical transmission signal to the first optical reception apparatus according to an instruction from the controller and outputs a second optical transmission signal that does not share the set of information with the first optical transmission signal to the second optical reception apparatus.

An optical communication system according to the present invention includes first and second optical transmission apparatuses and an optical reception apparatus, in which: the optical reception apparatus includes: first and second reception units that receive a sub-carrier reception signal; and a switch unit that outputs a first sub-carrier reception signal and a second sub-carrier reception signal that have been input to the first and second reception units, when the first and second sub-carrier reception signals share a set of information, the switch unit receives the first and second sub-carrier reception signals from one optical transmission apparatus and outputs the first sub-carrier reception signal to the first reception unit and the second sub-carrier reception signal to the second reception unit, and when the first sub-carrier reception signal and the second sub-carrier reception signal do not share the set of information, the switch unit receives the first and second sub-carrier reception signals via paths different from each other and outputs the first sub-carrier reception signal to the first reception unit and the second sub-carrier reception signal to the second reception unit.

A controller according to the present invention causes, in an optical communication system including an optical transmission apparatus and first and second optical reception apparatuses, the optical transmission apparatus to output a first optical transmission signal and a second optical transmission signal that share a set of information with the first optical transmission signal to the first optical reception apparatus and to output a second optical transmission signal that does not share the set of information with the first optical transmission signal to the second optical reception apparatus.

A method of controlling an optical communication system according to the present invention is method of controlling an optical communication system including an optical transmission apparatus and first and second optical reception apparatuses, in which: the optical transmission apparatus includes: a first transmission unit that transmits a first optical transmission signal; a second transmission unit that transmits a second optical transmission signal; and an output unit that outputs, when the first optical transmission signal and the second optical transmission signal share a set of information, both the first optical transmission signal and the second optical transmission signal to the first optical reception apparatus, and when the first optical transmission signal and the second optical transmission signal do not share the set of information, outputs one of the first optical transmission signal and the second optical transmission signal to the second optical reception apparatus, and each of the optical transmission apparatus and the first and second optical reception apparatuses is controlled according to a state of communication of the optical communication system.

A program according to the present invention is a program for controlling an optical communication system including an optical transmission apparatus and first and second optical reception apparatuses, in which: the optical transmission apparatus includes: a first transmission unit that transmits a first optical transmission signal; a second transmission unit that transmits a second optical transmission signal; and an output unit that outputs, when the first optical transmission signal and the second optical transmission signal share a set of information, both the first optical transmission signal and the second optical transmission signal to the first optical reception apparatus, and outputs, when the first optical transmission signal and the second optical transmission signal do not share the set of information, one of the first optical transmission signal and the second optical transmission signal to the second optical reception apparatus, and the program causes a computer to execute processing for controlling each of the optical transmission apparatus and the first and second optical reception apparatuses according to a state of communication of the optical communication system.

An optical transmission method according to the present invention includes: generating a first optical transmission signal; generating a second optical transmission signal; and outputting, when the first optical transmission signal and the second optical transmission signal share a set of information, both the first optical transmission signal and the second optical transmission signal to a first path and outputting, when the first optical transmission signal and the second optical transmission signal do not share the set of information, one of the first optical transmission signal and the second optical transmission signal to a second path.

An optical reception method according to the present invention receives, when first and second sub-carrier reception signals share a set of information, the first and second sub-carrier reception signals via one path and outputs the first sub-carrier reception signal to a first reception unit and the second sub-carrier reception signal to a second reception unit and receives, when the first sub-carrier reception signal and the second sub-carrier reception signal do not share the set of information, the first and second sub-carrier reception signals via paths different from each other, outputs the first sub-carrier reception signal to the first reception unit, and outputs the second sub-carrier reception signal to the second reception unit.

Advantageous Effects of Invention

According to the present invention, it is possible to provide an optical transmission apparatus, an optical reception apparatus, an optical communication apparatus, an optical communication system, and methods of controlling them capable of efficiently allocating resources in an optical communication network.

DESCRIPTION OF EMBODIMENTS

First Exemplary Embodiment

Figure 1:
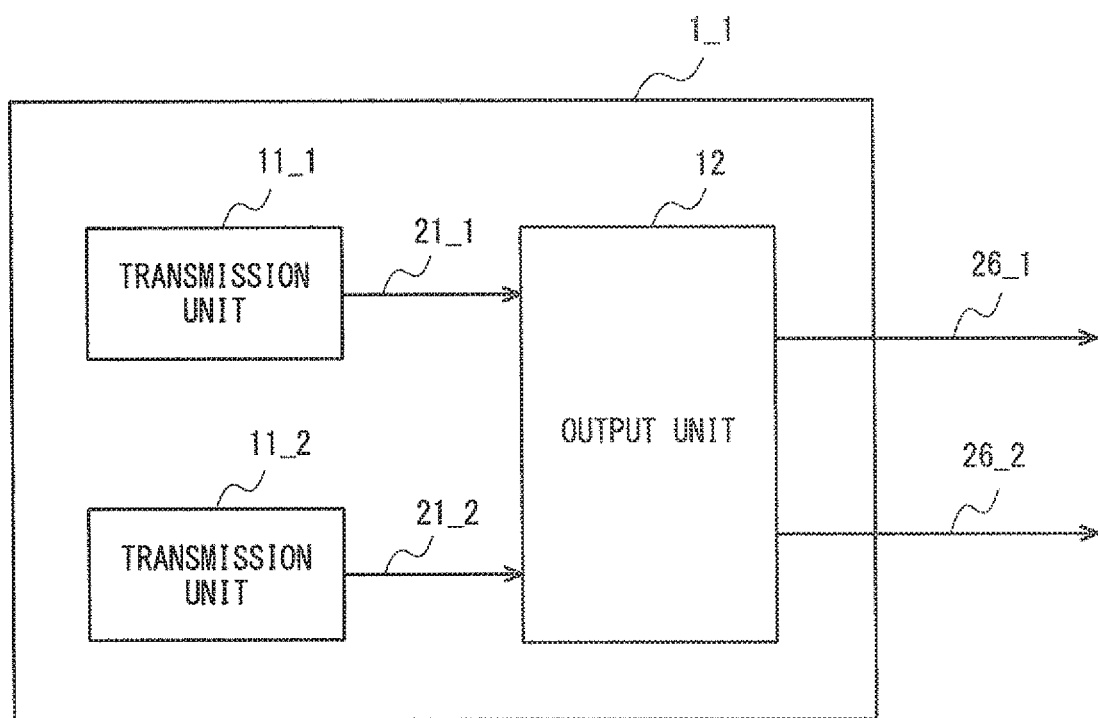
FIG. 1 is a block diagram showing an optical transmission apparatus according to a first exemplary embodiment.

In the following description, with reference to the drawings, exemplary embodiments of the present invention will be described. FIG. 1 is a block diagram showing an optical transmission apparatus 1_1 according to a first exemplary embodiment. As shown in FIG. 1, the optical transmission apparatus 1_1 according to this exemplary embodiment includes a first transmission unit 11_1, a second transmission unit 11_2, and an output unit 12. In the following description, the first and second transmission units may be referred to as sub-carrier transmission units.

The first transmission unit 11_1 transmits a first optical transmission signal 21_1. The second transmission unit 11_2 transmits a second optical transmission signal 21_2. That is, transmission data is supplied to each of the first transmission unit 11_1 and the second transmission unit 11_2 and the first transmission unit 11_1 and the second transmission unit 11_2 respectively generate the first optical transmission signal 21_1 and the second optical transmission signal 21_2 to transmit the transmission data. The first optical transmission signal 21_1 and the second optical transmission signal 21_2 are signals to transmit the transmission data using sub-carriers.

The optical transmission apparatus 1_1 according to this exemplary embodiment uses a WDM technology, which multiplexes a plurality of optical signals having different wavelengths and transmits the multiplexed signal. That is, the first optical transmission signal 21_1 and the second optical transmission signal 21_2 respectively generated in the first transmission unit 11_1 and the second transmission unit 11_2 have wavelengths different from each other. In the optical transmission apparatus according to this exemplary embodiment, in particular, a SuperChannel technology, which allocates a plurality of wavelengths (sub-carriers) to the bandwidth of one channel of the WDM, can be used. By using this SuperChannel technology, it is possible to multiplex wavelengths with high density and to increase the transmission capacity.

When the first optical transmission signal 21_1 and the second optical transmission signal 21_2 share a set of information, the output unit 12 outputs both the first optical transmission signal 21_1 and the second optical transmission signal 21_2 to one path (e.g., a first path 26_1).

On the other hand, when the first optical transmission signal 21_1 and the second optical transmission signal 21_2 do not share the set of information, the output unit 12 outputs one of the first optical transmission signal 21_1 and the second optical transmission signal 21_2 to a second path. For example, when the first optical transmission signal 21_1 and the second optical transmission signal 21_2 do not share the set of information, the output unit 12 may output the first optical transmission signal 21_1 to the first path 26_1 and the second optical transmission signal 21_2 to a second path 26_2. Alternatively, for example, when the first optical transmission signal 21_1 and the second optical transmission signal 21_2 do not share the set of information, the output unit 12 may output the first optical transmission signal 21_1 to the second path 26_2 and the second optical transmission signal 21_2 to the first path 26_1. In other words, when the first optical transmission signal 21_1 and the second optical transmission signal 21_2 do not share the set of information, the output unit 12 outputs the first optical transmission signal 21_1 and the second optical transmission signal 21_2 to paths different from each other.

The case in which the first optical transmission signal 21_1 and the second optical transmission signal 21_2 share the set of information includes, for example, a case in which the first transmission unit 11_1 and the second transmission unit 11_2 transmit desired transmission data in parallel using the first optical transmission signal 21_1 and the second optical transmission signal 21_2.

On the other hand, the case in which the first optical transmission signal 21_1 and the second optical transmission signal 21_2 do not share the set of information includes, for example, a case in which the first transmission unit 11_1 and the second transmission unit 11_2 independently transmit desired transmission data using the first optical transmission signal 21_1 and the second optical transmission signal 21_2 (i.e., a case in which the first transmission unit 11_1 transmits a predetermined first transmission data using the first optical transmission signal 21_1 and the second transmission unit 11_1 transmits a predetermined second transmission data using the second optical transmission signal 21_1). In this case, since the first optical transmission signal 21_1 and the second optical transmission signal 21_2 include respective pieces of transmission data independent from each other, the first optical transmission signal 21_1 and the second optical transmission signal 21_2 can be output to the paths different from each other (the first path 26_1 and the second path 26_2).

The first path 26_1 is a path connected to a first optical reception apparatus (not shown) and the second path 26_2 is a path connected to a second optical reception apparatus (not shown).

As described above, in the optical transmission apparatus 1_1 according to this exemplary embodiment, the output destinations of the first optical transmission signal 21_1 and the second optical transmission signal 21_2 are switched using the output unit 12. It is therefore possible to provide the optical transmission apparatus capable of efficiently allocating the resources. The reason therefor will be described later in detail.

Figure 2:
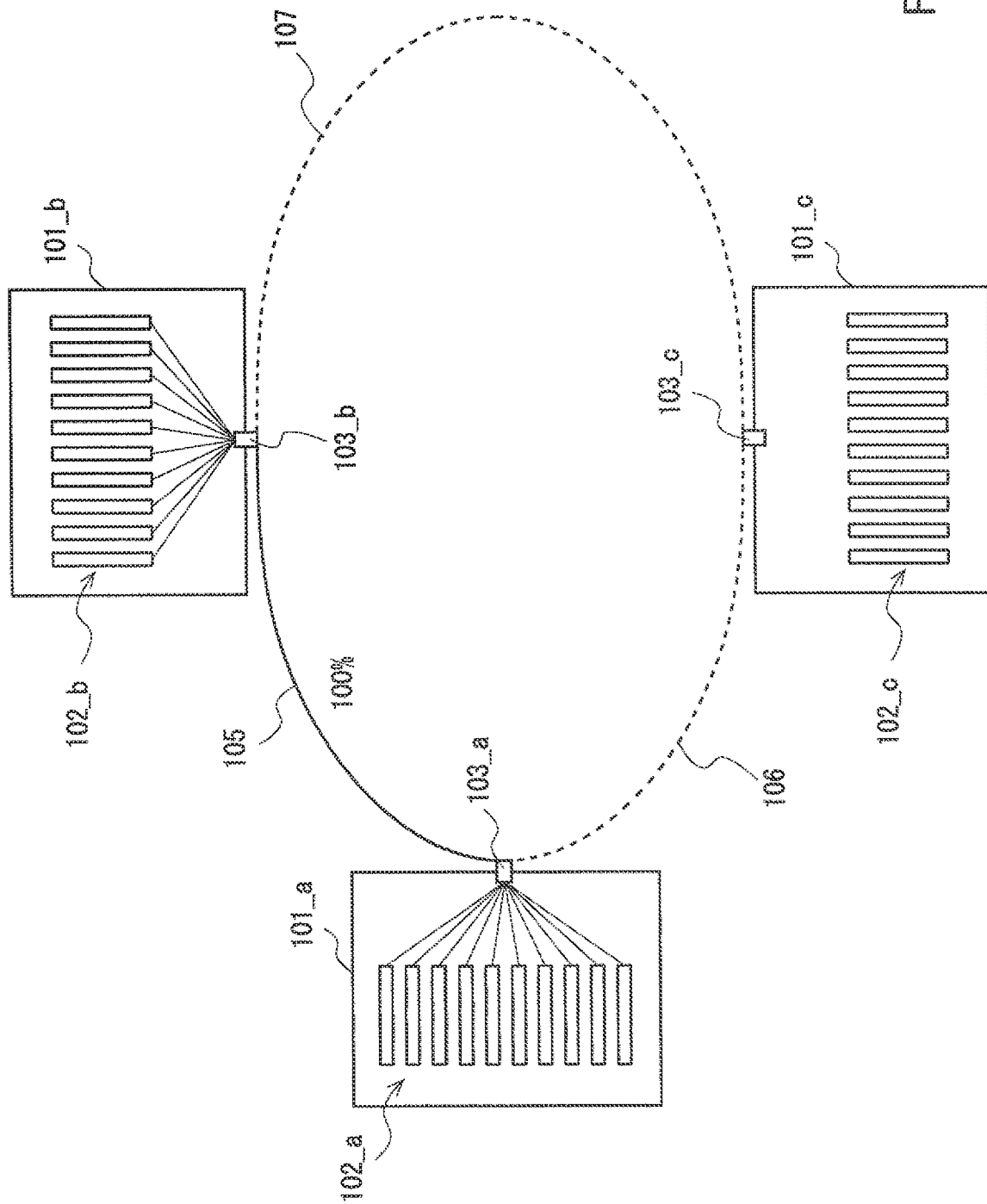
FIG. 2 is a diagram showing an optical communication system according to a comparative example.
Figure 3:
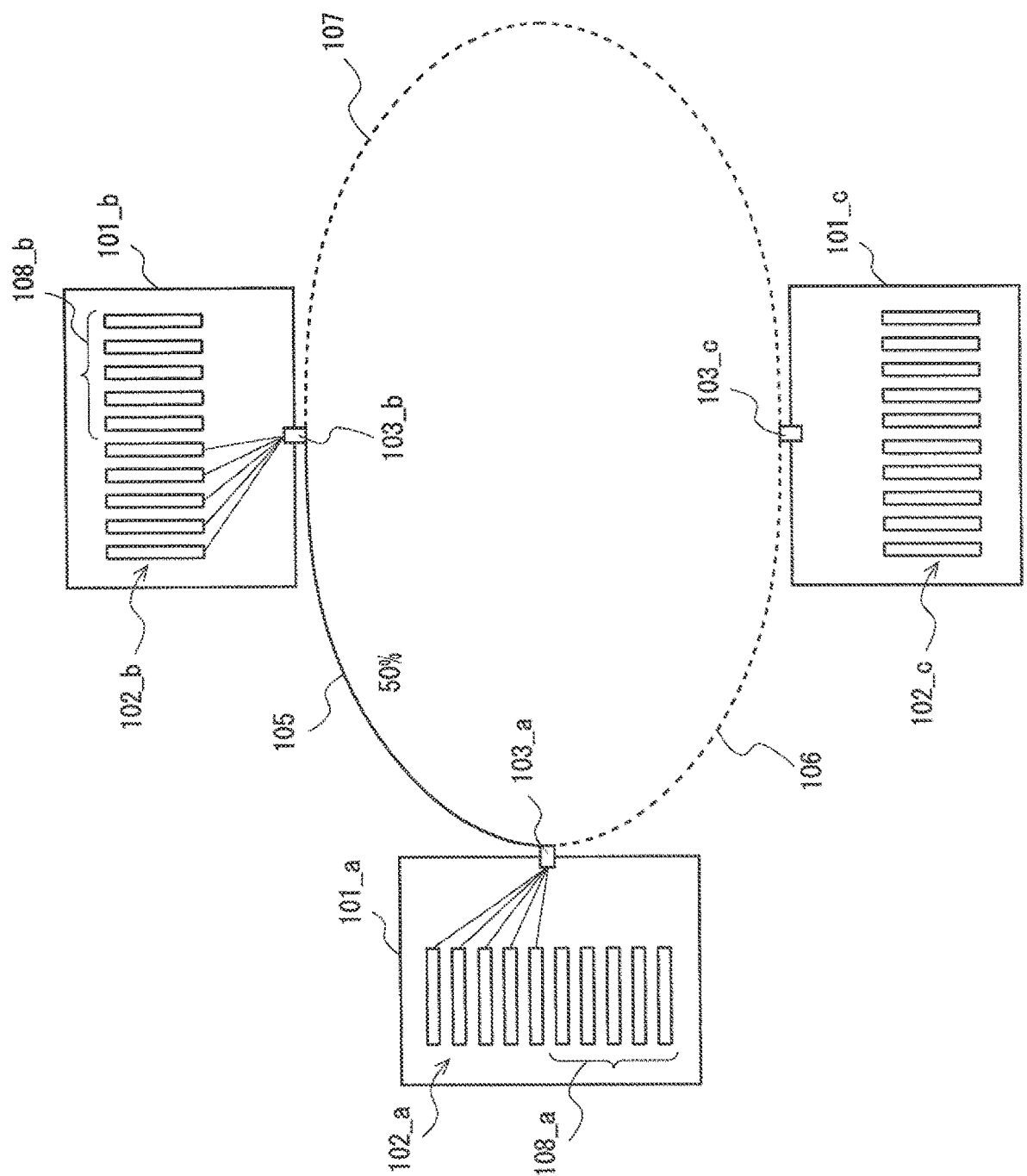
FIG. 3 is a diagram showing the optical communication system according to the comparative example.

FIGS. 2 and 3 are diagrams showing an optical communication system according to a comparative example and show one example of the optical communication system using the SuperChannel technology. The optical communication system shown in FIGS. 2 and 3 includes optical communication apparatuses 101_a to 101_c. The optical communication apparatus 101_a includes a plurality of transceiver units 102_a and a single transmission/reception port 103_a. The plurality of transceiver units 102_a are configured to be able to transmit and receive data using wavelengths (sub-carriers) different from each other. That is, the optical communication apparatus 101_a is able to allocate a plurality of wavelengths (sub-carriers) to the bandwidth of one channel of the WDM. The respective transceiver units 102_a are configured to be able to transmit and receive data using the respective sub-carriers. The same is applicable to the optical communication apparatus 101_b and the optical communication apparatus 101_c.

In the optical communication system shown in FIGS. 2 and 3, the optical communication apparatus 101_a and the optical communication apparatus 101_b can be connected each other via an optical fiber 105, the optical communication apparatus 101a and the optical communication apparatus 101_c can be connected each other via an optical fiber 106, and the optical communication apparatus 101_b and the optical communication apparatus 101_c can be connected each other via an optical fiber 107.

The example shown in FIG. 2 shows the case in which the optical communication apparatus 101_a and the optical communication apparatus 101_b are connected via the optical fiber 105 and the optical communication apparatus 101_a and the optical communication apparatus 101_b communicate with each other at a maximum transmission capacity (100%).

In the communication network, there is a fluctuation in an amount of traffic between predetermined nodes. Therefore, it is not necessary that the transmission between the optical communication apparatus 101_a and the optical communication apparatus 101_b be always performed at the maximum transmission capacity. As described in Background Art, in the optical communication using the WDM technology, one wavelength is used for one channel. Therefore, in the optical communication apparatus using the WDM technology, there are only two options: whether to turn off the communication or to perform the communication at the maximum transmission capacity, and it is impossible to set the transmission capacity to an intermediate value.

On the other hand, when the SuperChannel technology is used, a plurality of wavelengths are used in the bandwidth of one channel of the WDM, whereby it is possible to set the transmission capacity to the intermediate value. Therefore, as shown in FIG. 3, for example, the transmission capacity between the optical communication apparatus 101_a and the optical communication apparatus 101_b can be set to 50% of the maximum transmission capacity. In this case, however, some of the transceiver units 102_a of the optical communication apparatus 101_a which are denoted by transceiver units 108_a are not to be used. Further, some of the transceiver units 102_b of the optical communication apparatus 101_b which are denoted by transceiver units 108_b are not to be used.

When the SuperChannel technology is used, the signals transmitted or received by the respective transceiver units 102_a share the set of information. In other words, the respective transceiver units 102_a transmit or receive data in parallel. Therefore, the optical communication apparatus 101_a is configured to transmit or receive optical signals via the single port 103_a. Therefore, even when there are transceiver units 108_a, which are not to be used, among the transceiver units 102_a of the optical communication apparatus 101_a, it is impossible to use the transceiver units 108_a that are not to be used for the communication with another optical communication apparatus 101_c and the resources are wasted.

Figure 4:
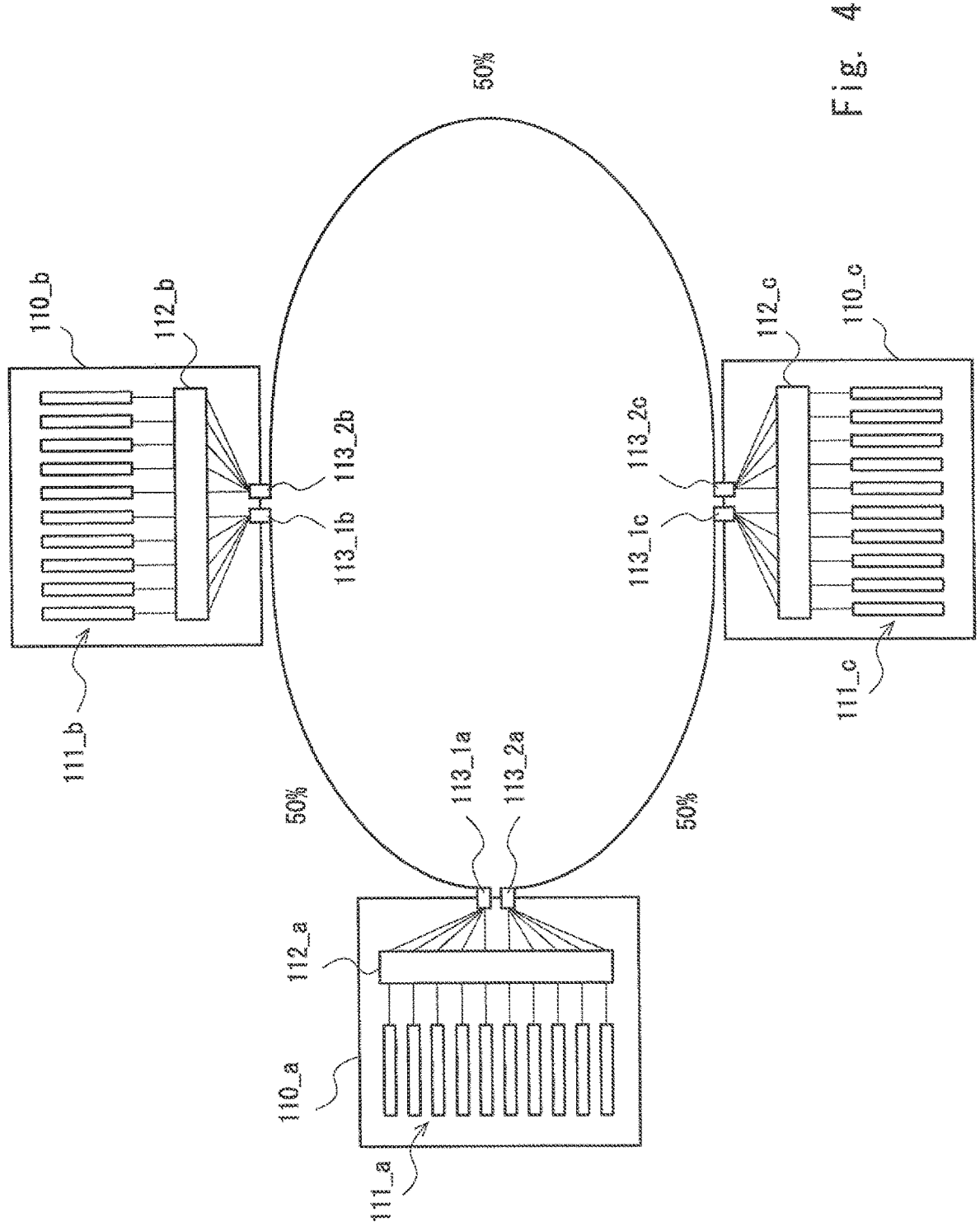
FIG. 4 is a diagram for describing effects of the present invention.

FIG. 4 is a diagram for describing effects of the present invention. While the effects of the present invention are described in FIG. 4 using an optical communication apparatus (an optical communication apparatus that can transmit and receive data), the effects of the present invention may also be obtained in a similar way in the optical transmission apparatus and the optical reception apparatus as well.

The optical communication system shown in FIG. 4 includes optical communication apparatuses 110_a to 110_c. The optical communication apparatus 110_a includes a plurality of transceiver units 111_a, a switch unit 112_a, and a plurality of transmission/reception ports 113_1a and 113_2a. The plurality of transceiver units 111_a are configured to be able to transmit and receive data using sub-carriers different from one another. That is, the optical communication apparatus 110_a is able to allocate the plurality of wavelengths (sub-carriers) to the bandwidth of one channel of the WDM. The same is applicable to the optical communication apparatus 110_b and the optical communication apparatus 110_c.

As described above, the optical communication apparatus 110_a includes the plurality of transmission/reception ports 113_1a and 113_2a and is able to switch the transceiver units 111_a connected to the plurality of transmission/reception ports 113_1a and 113_2a using the switch unit 112_a. Accordingly, even when there are unused transceiver units in the plurality of transceiver units 111_a of the optical communication apparatus 110_a, the unused transceiver units can be allocated to the communication with another optical communication apparatus.

For example, in the optical communication system shown in FIG. 3, when the transmission capacity between the optical communication apparatus 101_a and the optical communication apparatus 101_b is set to 50% of the maximum transmission capacity, there are unused transceiver units 108_a of the transceiver units 102_a of the optical communication apparatus 101_a and the resources are wasted. On the other hand, in the optical communication system shown in FIG. 4, the unused transceiver units (corresponding to the transceiver units 108_a shown in FIG. 3) of the optical communication apparatus 111_a are connected to the transmission/reception port 113_2a using the switch unit 112_a, whereby it is possible to allocate the unused transceiver units to the communication with the optical communication apparatus 110_c. It is therefore possible to efficiently allocate the resources in the optical communication network.

At this time, the optical communication apparatus 110_a and the optical communication apparatus 110_b communicate with each other via the transmission/reception port 113_1l of the optical communication apparatus 110_a and a transmission/reception port 113_1b of the optical communication apparatus 110_b. The optical communication apparatus 110_a and the optical communication apparatus 110_c communicate with each other via the transmission/reception port 113_2a of the optical communication apparatus 110_a and a transmission/reception port 113_1c of the optical communication apparatus 110_c. The optical communication apparatus 110_b and the optical communication apparatus 110_c communicate with each other via a transmission/reception port 113_2b of the optical communication apparatus 110_b and a transmission/reception port 113_2c of the optical communication apparatus 110_c.

While the case in which the transmission capacity among the optical communication apparatuses 110_a to 110_c is 50% of the maximum transmission capacity is shown in FIG. 4, the transmission capacity among the optical communication apparatuses 110_a to 110_c may be flexibly set by changing the number of transceiver units connected to the transmission/reception ports using the switch units 112_a to 112_c.

According to the present invention described in this exemplary embodiment, it is possible to provide the optical transmission apparatus and the optical transmission method capable of efficiently allocating the resources in the optical communication network.

Second Exemplary Embodiment

Figure 5:
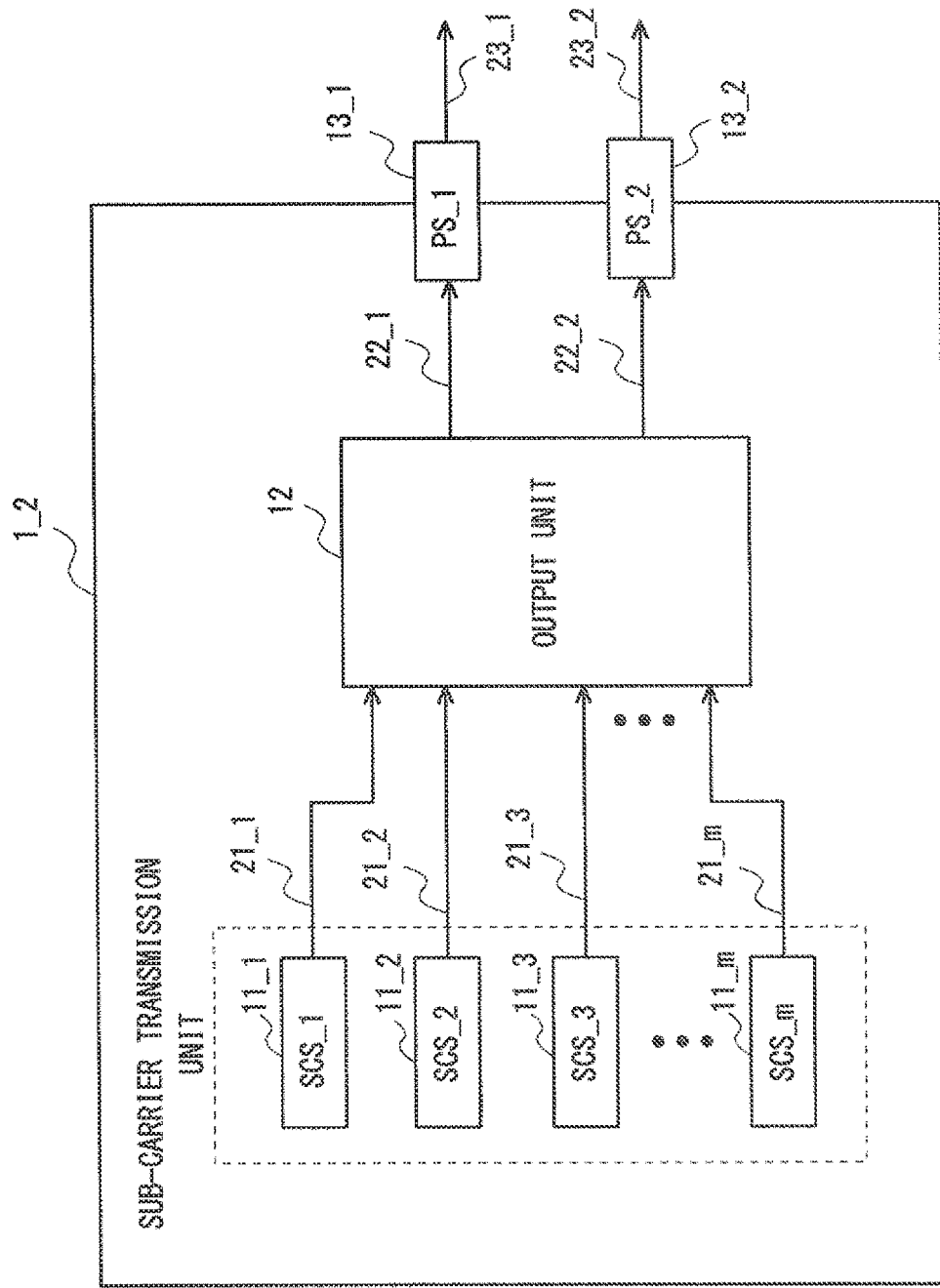
FIG. 5 is a block diagram showing an optical transmission apparatus according to a second exemplary embodiment.

Next, a second exemplary embodiment of the present invention will be described. In the second exemplary embodiment, detailed configurations of the optical transmission apparatus 1_1 described in the first exemplary embodiment will be described. FIG. 5 is a block diagram showing an optical transmission apparatus 1_2 according to the second exemplary embodiment. As shown in FIG. 5, the optical transmission apparatus 1_2 according to this exemplary embodiment includes a plurality of sub-carrier transmission units 11_1 to 11_m, an output unit 12, and transmission ports 13_1 and 13_2.

The plurality of sub-carrier transmission units 11_1 to 11_m are supplied with transmission data. The plurality of sub-carrier transmission units (SCS_1 to SCS_m) 11_1 to 11_m respectively generate optical transmission signals 21_1 to 21_m to transmit transmission data. The symbol m is an integer equal to or greater than 2 and corresponds to the number of sub-carrier transmission units. The optical transmission signals 21_1 to 21_m are signals to transmit the transmission data using sub-carriers. For example, the sub-carrier transmission unit 11_1 generates the optical transmission signal 21_1 using a sub-carrier SC1 that corresponds to the sub-carrier transmission unit 11_1. Further, the sub-carrier transmission unit 11_2 generates the optical transmission signal 21_2 using a sub-carrier SC2 that corresponds to the sub-carrier transmission unit 11_2. In this way, the sub-carrier transmission units 11_1 to 11_m respectively generate the optical transmission signals 21_1 to 21_m using the sub-carriers SC1 to SCm respectively corresponding to the sub-carrier transmission units 11_1 to 11_m.

The optical transmission signals 21_1 to 21_m (in other words, sub-carriers SC1 to SCm used when the optical transmission signals 21_1 to 21_m are generated) can be set using a predetermined parameter. At this time, the parameters of the respective optical transmission signals 21_1 to 21_m are allocated in such a way that they do not overlap each other. When a plurality of parameters are used as a predetermined parameter, the optical transmission signals 21_1 to 21_m are arranged in such a way they do not overlap each other on a matrix having a plurality of parameters as axes. For example, the predetermined parameter is at least one of a wavelength, a polarization, and a time.

Figure 6:
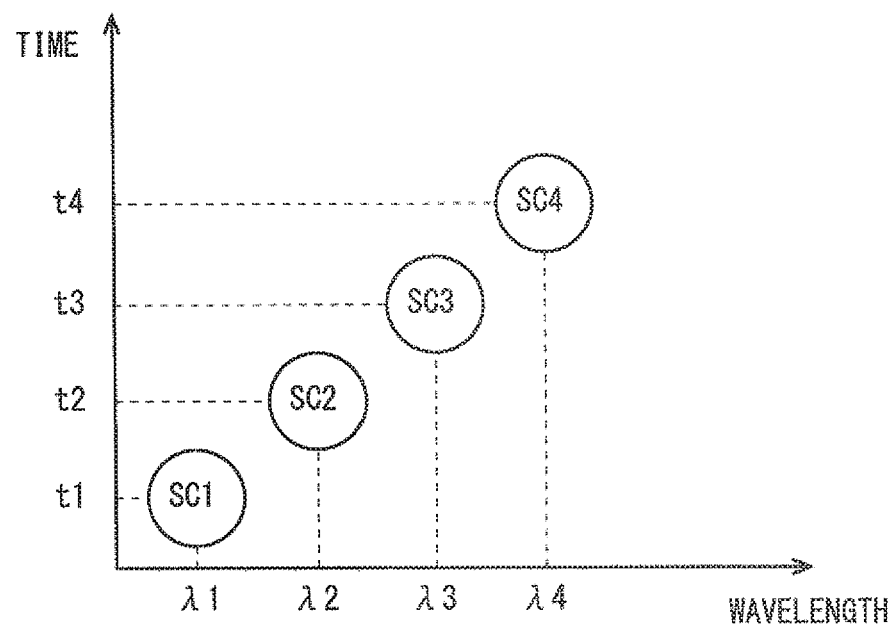
FIG. 6 is a diagram for describing an arrangement of sub-carriers.
Figure 7:
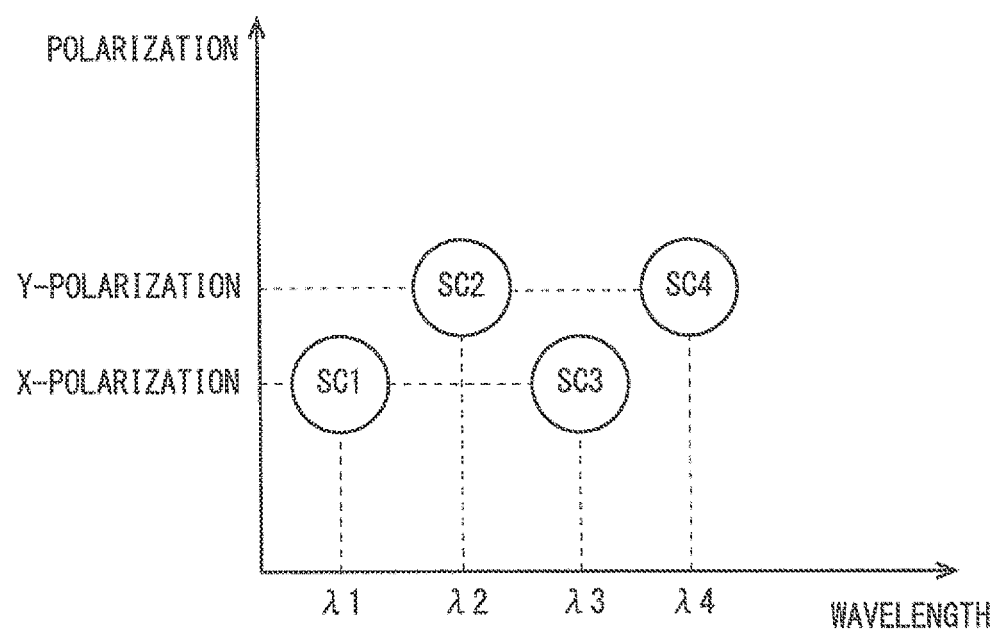
FIG. 7 is a diagram for describing an arrangement of sub-carriers.

FIGS. 6 and 7 are diagrams each describing an arrangement of the sub-carriers. FIG. 6 shows one example of the arrangement of the sub-carriers when the wavelength and the time are used as the predetermined parameter. In the case shown in FIG. 6, when each of the sub-carriers SC1 to SC4 is arranged on a matrix in which an X axis represents the wavelength and a Y axis represents the time (in this case, XY-plane), the sub-carriers SC1 to SC4 are arranged so that they do not overlap with one another on the matrix plane. In the example shown in FIG. 6, the wavelengths of the sub-carriers SC1 to SC4 are respectively set to $\lambda1$ to $\lambda4$ and further the sub-carriers SC1 to SC4 are time-divided by time t1 to t4. That is, the sub-carrier SC1 can be set using a parameter ($\lambda1$, t1), the sub-carrier SC2 can be set using a parameter ($\lambda2$, t2), the sub-carrier SC3 can be set using a parameter ($\lambda3$, t3), and the sub-carrier SC4 can be set using a parameter ($\lambda4$, t4).

Further, FIG. 7 shows one example of the arrangement of the sub-carriers when the wavelength and the polarization are used as the predetermined parameter. In the case shown in FIG. 7, when the sub-carriers SC1 to SC4 are arranged on a matrix in which an X axis represents the wavelength and a Y axis represents the polarization (in this case, XY-plane), the sub-carriers SC1 to SC4 are arranged so that they do not overlap with one another on the matrix plane. In the example shown in FIG. 7, the wavelengths of the sub-carriers SC1 to SC4 are respectively set to $\lambda1$ to $\lambda4$ and further the polarization of each of the sub-carriers SC1 to SC4 is set to one of an X-polarization and a Y-polarization. That is, the sub-carrier SC1 can be set using the parameter ($\lambda1$, X-polarization), the sub-carrier SC2 can be set using the parameter ($\lambda2$, Y-polarization), the sub-carrier SC3 can be set using the parameter ($\lambda3$, X-polarization), and the sub-carrier SC4 can be set using the parameter ($\lambda4$, Y-polarization).

As described above, by allocating the parameters of the optical transmission signals 21_1 to 21_m in such a way that they do not overlap with one another, it is possible to reduce the influence of the mutual interference among the sub-carriers. While the case in which the respective sub-carriers have been set using two parameters have been described in FIGS. 6 and 7, the respective sub-carriers may be set using three or more parameters in this exemplary embodiment.

When the wavelength is included as the above parameter, the plurality of sub-carrier transmission units 11_1 to 11_m may include light sources (light sources that output light having a single wavelength (not shown)) to generate the sub-carriers SC1 to SCm, respectively. For example, the light source can be formed of a laser diode.

Further, the sub-carrier transmission units 11_1 to 11_m may respectively modulate the optical transmission signals 21_1 to 21_m using a predetermined modulation system. The modulation system may be, for example, amplitude shift keying (ASK), frequency shift keying (FSK), phase shift keying (PSK), quadrature amplitude modulation (QAM), or quadri-phase shift keying (QPSK). The quadrature amplitude modulation (QAM) may be, for example, 16-QAM, 64-QAM, 128-QAM, or 256-QAM.

The output unit 12 selectively outputs the optical transmission signals 21_1 to 21_m respectively output from the plurality of sub-carrier transmission units 11_1 to 11_m to the plurality of transmission ports (PS_1, PS_2) 13_1 and 13_2. The transmission ports 13_1 and 13_2 respectively correspond to the first path 26_1 and the second path 26_2 described in the first exemplary embodiment. At this time, the output unit 12 outputs an optical transmission signal 22_1 in which a plurality of optical transmission signals are multiplexed to the transmission port 13_1. For example, when the output unit 12 outputs the optical transmission signals 21_1 to 21_5 to the transmission port 13_1, the optical transmission signal 22_1 in which the optical transmission signals 21_1 to 21_5 are multiplexed is output to the transmission port 13_1. In a similar way, the output unit 12 outputs an optical transmission signal 22_2 in which a plurality of optical transmission signals are multiplexed to the transmission port 13_2. For example, when the output unit 12 outputs the optical transmission signals 21_6 to 21_10 to the transmission port 13_2, the optical transmission signal 22_2 in which the optical transmission signals 21_6 to 21_10 are multiplexed is output to the transmission port 13_2.

The output unit 12 is able to arbitrarily and dynamically switch the optical transmission signals 21_1 to 21_m to be supplied to the transmission ports 13_1 and 13_2. For example, the output unit 12 is controlled using control means (not shown).

The plurality of transmission ports 13_1 and 13_2 are configured to be able to transmit the optical transmission signals 22_1 and 22_2 output from the output unit 12 (in other words, the optical transmission signals 21_1 to 21_m output from the sub-carrier transmission units 11_1 to 11_m). That is, the transmission port 13_1 outputs an optical transmission signal 23_1 (same as the optical transmission signal 22_1) to the first optical reception apparatus (not shown), which is a connection destination. Further, the transmission port 13_2 outputs an optical transmission signal 23_2 (same as the optical transmission signal 22_2) to the second optical reception apparatus (not shown), which is a connection destination.

In this exemplary embodiment, the case in which the optical transmission apparatus 1_2 includes two transmission ports 13_1 and 13_2 has been described as an example. However, the number of transmission ports included in the optical transmission apparatus 1_2 may be three or more. When the number of transmission ports is three or more, the output unit 12 is able to selectively output the optical transmission signals 21_1 to 21_m respectively output from the plurality of sub-carrier transmission units 11_1 to 11_m to the three or more transmission ports.

As described above, in the optical transmission apparatus according to this exemplary embodiment, as shown in FIG. 5, the plurality of transmission ports 13_1 and 13_2 and the output unit 12 are provided and the optical transmission signals 21_1 to 21_m respectively output from the plurality of sub-carrier transmission units 11_1 to 11_m are selectively output to the transmission ports 13_1 and 13_2 using the output unit 12. Accordingly, when there is a sub-carrier transmission unit 11_m that is not used while data is being transmitted to the first optical reception apparatus (not shown) via the transmission port 13_1, for example, data can be transmitted to the second optical reception apparatus (not shown) via the transmission port 13_2 using the unused sub-carrier transmission unit 11_m.

Further, by dynamically changing the optical transmission signals 21_1 to 21_m to be supplied to the transmission ports 13_1 and 13_2 using the output unit 12, it is possible to dynamically adjust the transmission capacity in the communication via the transmission port 13_1 and the transmission capacity in the communication via the transmission port 13_2.

According to the present invention described in this exemplary embodiment, it is possible to provide the optical transmission apparatus and the optical transmission method capable of efficiently allocating the resources in the optical communication network.

Third Exemplary Embodiment

Figure 8:
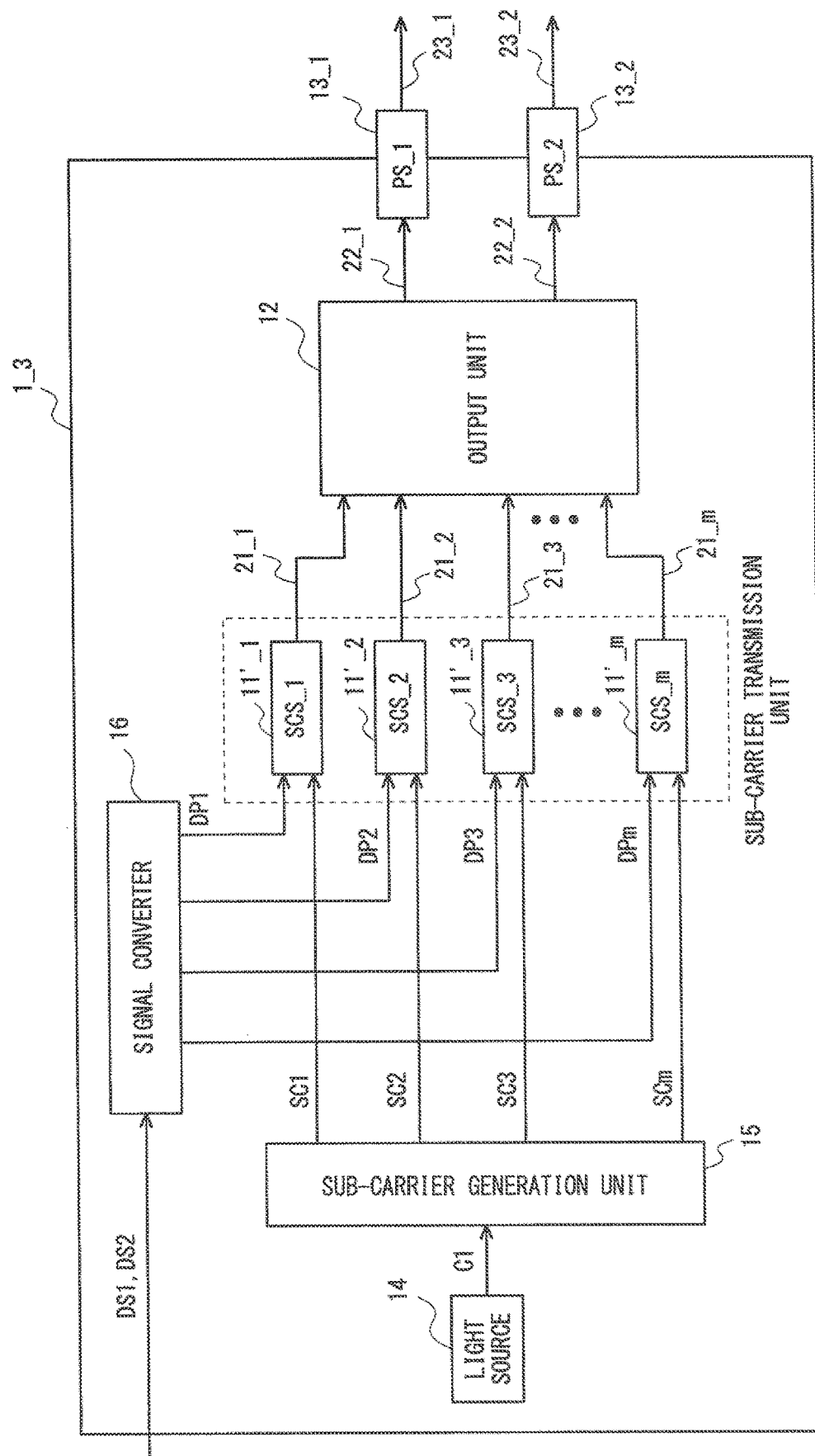
FIG. 8 is a block diagram showing an optical transmission apparatus according to a third exemplary embodiment.

Next, a third exemplary embodiment of the present invention will be described. FIG. 8 is a block diagram showing an optical transmission apparatus 1_3 according to this exemplary embodiment. The optical transmission apparatus 1_3 according to this exemplary embodiment is different from the optical transmission apparatus 1_2 according to the second exemplary embodiment in that the optical transmission apparatus 1_3 according to this exemplary embodiment includes a light source 14, a sub-carrier generation unit 15, and a signal converter 16. Since the other configurations are similar to those of the optical transmission apparatus 1_2 described in the second exemplary embodiment, the same components are denoted by the same reference symbols and overlapping descriptions will be omitted.

As shown in FIG. 8, the optical transmission apparatus 1_3 according to this exemplary embodiment includes a plurality of sub-carrier transmission units 11'_1 to 11'_m, an output unit 12, transmission ports 13_1 and 13_2, a light source 14, a sub-carrier generation unit 15, and a signal converter 16.

The light source 14 is a light source that outputs a single carrier C1 (light having a single wavelength) and may be formed of, for example, a laser diode. The carrier C1 generated by the light source 14 is output to the sub-carrier generation unit 15.

The sub-carrier generation unit 15 generates a plurality of sub-carriers SC1 to SCm using the carrier C1 generated in the light source 14 and supplies the sub-carriers SC1 to SCm that have been generated to the sub-carrier transmission units 11'_1 to 11'_m, respectively. At this time, the sub-carrier generation unit 15 may generate the plurality of sub-carriers SC1 to SCm by modulating the carrier C1 generated in the light source 14 using a predetermined modulation system.

For example, the sub-carrier generation unit 15 may generate the plurality of sub-carriers SC1 to SCm that are perpendicular to each other by modulating the carrier C1 generated in the light source 14 using orthogonal frequency division multiplexing (OFDM). Alternatively, the sub-carrier generation unit 15 may generate the plurality of sub-carriers SC1 to SCm using a Nyquist WDM system. By generating the plurality of sub-carriers SC1 to SCm using the OFDM system or the Nyquist WDM system as stated above, it is possible to narrow down the frequency intervals to symbol rate intervals and to improve the frequency use efficiency in the communication using the SuperChannel technology.

Figure 9:
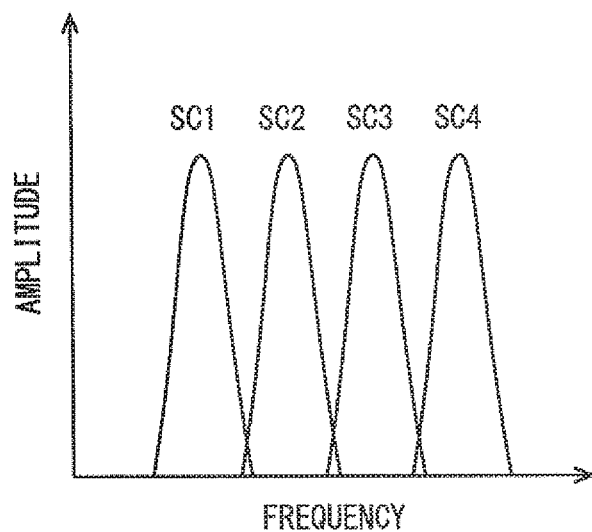
FIG. 9 is a diagram showing one example of the sub-carriers (WDM)
Figure 10:
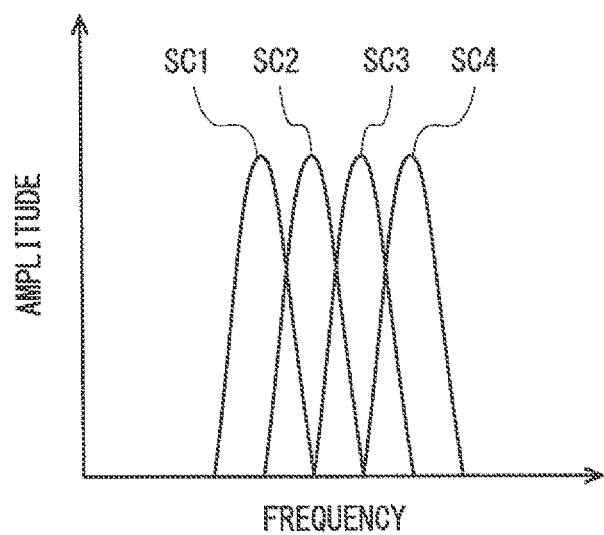
FIG. 10 is a diagram showing another example of the sub-carriers (OFDM modulation)

When the sub-carriers are generated using light sources included in the respective sub-carrier transmission units 11_1 to 11_m (see the second exemplary embodiment), for example, the intervals between the sub-carriers SC1 to SC4 become wide, as shown in FIG. 9. On the other hand, when the sub-carriers are generated by modulating the carrier C1 generated by the light source 14 in the OFDM system as in this exemplary embodiment, as shown in FIG. 10, the intervals between the sub-carriers SC1 to SC4 become narrower than those shown in FIG. 9, whereby it is possible to enhance the frequency use efficiency.

At this time, it is preferable that the intervals between the sub-carriers SC1 to SCm be constant. That is, when the wavelength intervals between the respective sub-carriers SC1 to SCm vary, it is required to consider the change in the wavelengths of the respective sub-carriers SC1 to SCm. In this case, the frequency use efficiency is reduced. Therefore, in the optical transmission apparatus 1_3 according to this exemplary embodiment, a single light source is used as the light source 14. It is therefore possible to make the intervals of the respective sub-carriers SC1 to SCm become constant.

The signal converter 16 serial-parallel converts transmission data DS1 and DS2 that have been input and outputs data DP1 to DPm obtained by serial-parallel converting the transmission data DS1 and DS2 to the sub-carrier transmission units 11'_1 to 11'_m, respectively. The sub-carrier transmission unit 11'_1 generates an optical transmission signal 21_1 to transmit the data DP1 using the sub-carrier SC1. The sub-carrier transmission unit 11'_2 generates an optical transmission signal 21_2 to transmit the data DP2 using the sub-carrier SC2. In this way, the sub-carrier transmission unit 11'_m generates the optical transmission signal 21_m to transmit the data DPm using the sub-carrier SCm.

Accordingly, in the optical transmission apparatus 1_3 according to this exemplary embodiment, the plurality of sub-carrier transmission units 11'_1 to 11'_m are able to transmit the transmission data DP1 to DPm in parallel using the sub-carriers SC1 to SCm respectively corresponding to the sub-carrier transmission units 11'_1 to 11'_m.

That is, the respective sub-carrier transmission units of the plurality of sub-carrier transmission units 11'_1 to 11'_m that transmit the optical transmission signal 22_1 via the transmission port 13_1 are able to transmit the first data in parallel. Further, the respective sub-carrier transmission units of the plurality of sub-carrier transmission units 11'_1 to 11'_m that transmit the optical transmission signal 22_2 via the transmission port 13_2 are able to transmit the second data in parallel.

Specifically, it is assumed, for example, that the optical transmission apparatus 1_3 includes the sub-carrier transmission units 11'_1 to 11'_10 and the sub-carrier transmission units 11'_1 to 11'_6 of the sub-carrier transmission units 11'_1 to 11'_10 transmit the first data DS1 via the transmission port 13_1. It is further assumed that the sub-carrier transmission units 11'_7 to 11'_10 transmit the second data DS2 via the transmission port 13_2.

In this case, the signal converter 16 serial-parallel converts the first data DS1 that has been input and outputs the first data DP1 to DP6 obtained by serial-parallel converting the first data DS1 to the sub-carrier transmission units 11'_1 to 11'_6, respectively. The sub-carrier transmission units 11'_1 to 11'_6 respectively generate the optical transmission signals 21_1 to 21_6 to transmit the first data DP1 to DP6 using the sub-carriers SC1 to SC6, respectively. The output unit 12 outputs the optical transmission signals 21_1 to 21_6 that have been generated to the transmission port 13_1. Accordingly, the multiplexed optical transmission signal 22_1 is output from the transmission port 13_1. Therefore, the sub-carrier transmission units 11'_1 to 11'_6 are able to transmit the first data DS1 that has been serial-parallel converted via the transmission port 13_1 in parallel. At this time, the data width of the transmission data transmitted via the transmission port 13_1 corresponds to the number of sub-carrier transmission units 11'_1 to 11'_6 connected to the transmission port 13_1 (that is, data DP1 to DP6).

Further, the signal converter 16 serial-parallel converts the second data DS2 that has been input and outputs the second data DP7 to DP10 obtained by serial-parallel converting the second data DS2 to the sub-carrier transmission units 11'_7 to 11'_10, respectively. The sub-carrier transmission units 11'_7 to 11'_10 respectively generate the optical transmission signals 21_7 to 21_10 to transmit the second data DP7 to DP10 using the sub-carriers SC7 to SC10, respectively. The output unit 12 outputs the optical transmission signals 21_7 to 21_10 that have been generated to the transmission port 13_2. Accordingly, the multiplexed optical transmission signal 22_2 is output from the transmission port 13_2. Therefore, the sub-carrier transmission units 11'_7 to 11'_10 are able to transmit the second data DS2 that has been serial-parallel converted via the transmission port 13_2 in parallel. At this time, the data width of the transmission data transmitted via the transmission port 13_2 corresponds to the number of sub-carrier transmission units 11'_7 to 11'_10 connected to the transmission port 13_2 (that is, data DP7 to DP0).

The data width of the transmission data transmitted via the transmission port 13_1 and the data width of the transmission data transmitted via the transmission port 13_2 can be adjusted by changing the output destinations of the respective optical transmission signals 21_1 to 21_$m$ output from the plurality of sub-carrier transmission units 11'_1 to 11'_$m$ using the output unit 12.

According to the present invention described in this exemplary embodiment, it is possible to provide the optical transmission apparatus and the optical transmission method capable of efficiently allocating the resources in the optical communication network.

Fourth Exemplary Embodiment

Figure 11:
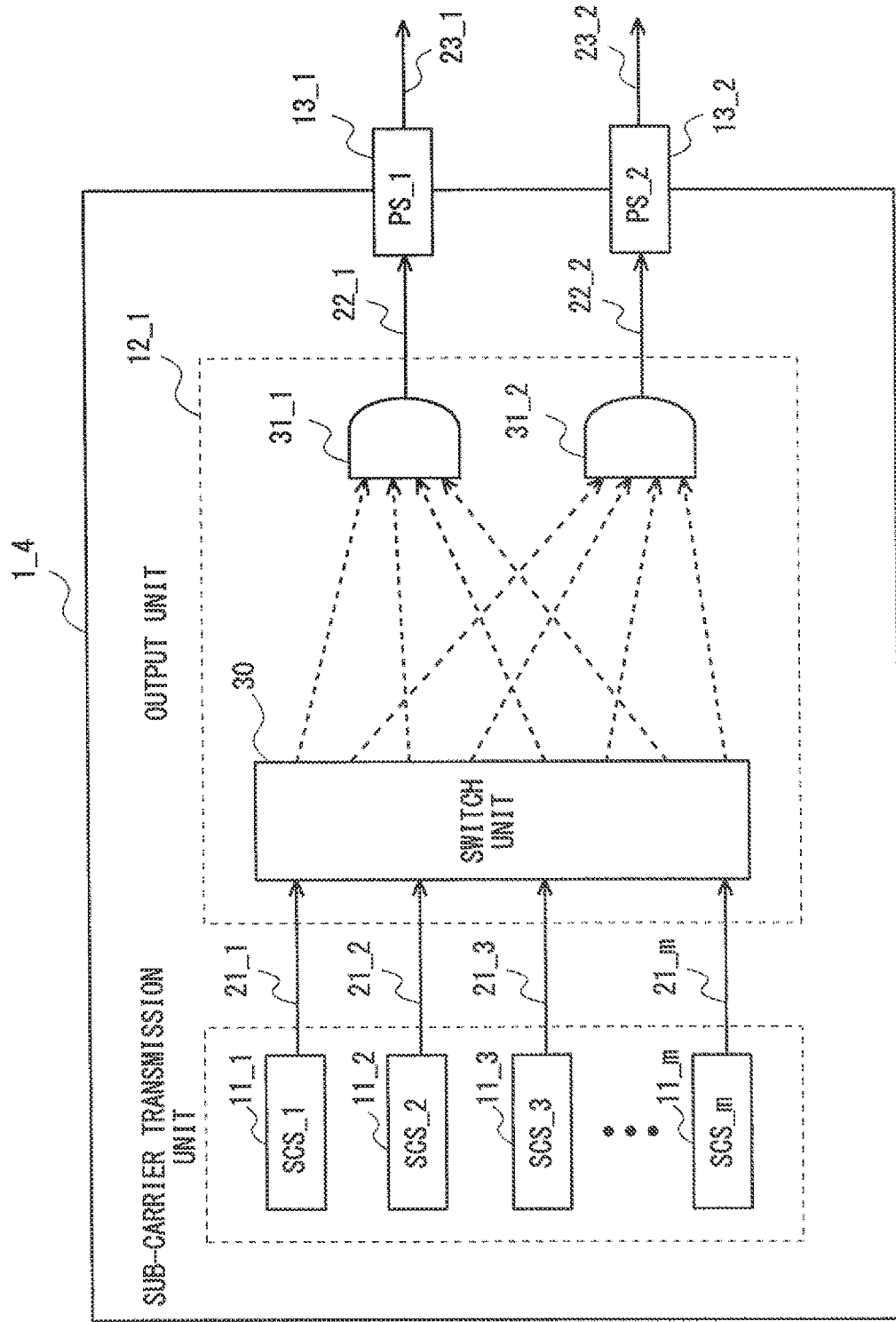
FIG. 11 is a block diagram showing an optical transmission apparatus according to a fourth exemplary embodiment.

Next, a fourth exemplary embodiment of the present invention will be described. FIG. 11 is a block diagram showing an optical transmission apparatus 14 according to this exemplary embodiment. In the optical transmission apparatus 14 according to this exemplary embodiment, a specific configuration example of the output unit 12 included in the optical transmission apparatuses 1_1 to 1_3 described in the first to third exemplary embodiments is shown. Since the other configurations are similar to those of the optical transmission apparatuses 1_1 to 1_3 described in the first to third exemplary embodiments, the same components are denoted by the same reference symbols and overlapping descriptions will be omitted.

As shown in FIG. 11, an output unit 12_1 included in the optical transmission apparatus 1_4 according to this exemplary embodiment includes a switch unit 30 and optical multiplexers 31_1 and 31_2. The switch unit 30 switches the output destinations of the optical transmission signals 21_1 to 21_$m$ respectively output from the sub-carrier transmission units 11_1 to 11_$m$ to one of the optical multiplexer 31_1 and the optical multiplexer 31_2. The switch unit 30 may be formed, for example, using an optical matrix switch having m inputs and m×2 outputs. Here, the m inputs of the switch unit 30 correspond to the number of optical transmission signals 21_1 to 21_$m$. For example, the switch unit 30 is controlled using control means (not shown).

The plurality of optical multiplexers 31_1 and 31_2 are provided to correspond to the transmission ports 13_1 and 13_2, respectively, and multiplex the optical transmission signals 21_1 to 21_$m$ output from the switch unit 30. That is, the optical multiplexer 31_1 multiplexes the optical transmission signals output from the switch unit 30 to produce a multiplexed optical transmission signal 22_1 and outputs the multiplexed optical transmission signal 22_1 to the transmission port 13_1. In a similar way, the optical multiplexer 31_2 multiplexes the optical transmission signals output from the switch unit 30 to produce a multiplexed optical transmission signal 22_2 and outputs the multiplexed optical transmission signal 22_2 to the transmission port 13_2.

As described above, in the optical transmission apparatus 1_4 according to this exemplary embodiment, the output unit 12_1 is formed using the switch unit 30 and the optical multiplexers 31_1 and 31_2. It is therefore possible to dynamically switch the optical transmission signals 21_1 to 21_$m$ to be supplied to the transmission ports 13_1 and 13_2.

Figure 12:
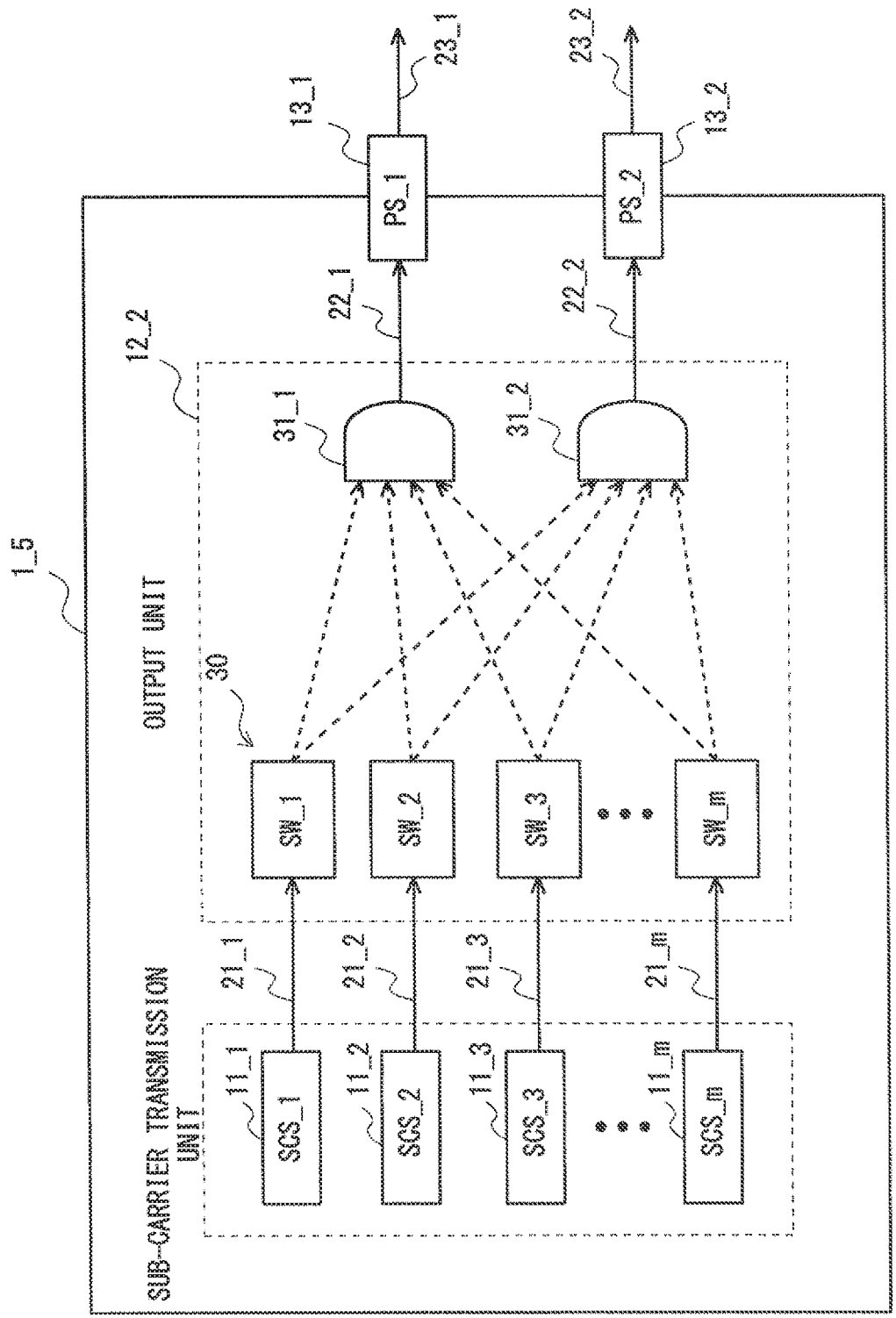
FIG. 12 is a block diagram showing the optical transmission apparatus according to the fourth exemplary embodiment.

The switch unit 30 may include a plurality of optical switches SW_1 to SW_m as shown in an output unit 12_2 included in an optical transmission apparatus 15 shown in FIG. 12. In this case, the plurality of optical switches SW_1 to SW_m are provided to correspond to the sub-carrier transmission units 11_1 to 1_$m$, respectively, and switch the output destinations of the optical transmission signals 21_1 to 21_$m$ respectively output from the sub-carrier transmission units 11_1 to 11_$m$ to the optical multiplexer 31_1 or the optical multiplexer 31_2.

For example, the optical switch SW_1 is provided to correspond to the sub-carrier transmission unit 11_1 and outputs the optical transmission signal 21_1 output from the sub-carrier transmission unit 11_1 to one of the optical multiplexer 31_1 and the optical multiplexer 31_2. The optical switch SW_2 is provided to correspond to the sub-carrier transmission unit 11_2 and outputs the optical transmission signal 21_2 output from the sub-carrier transmission unit 11_2 to one of the optical multiplexer 31_1 and the optical multiplexer 31_2. The optical switches SW_1 to SW_m are controlled using control means (not shown).

Figure 13:
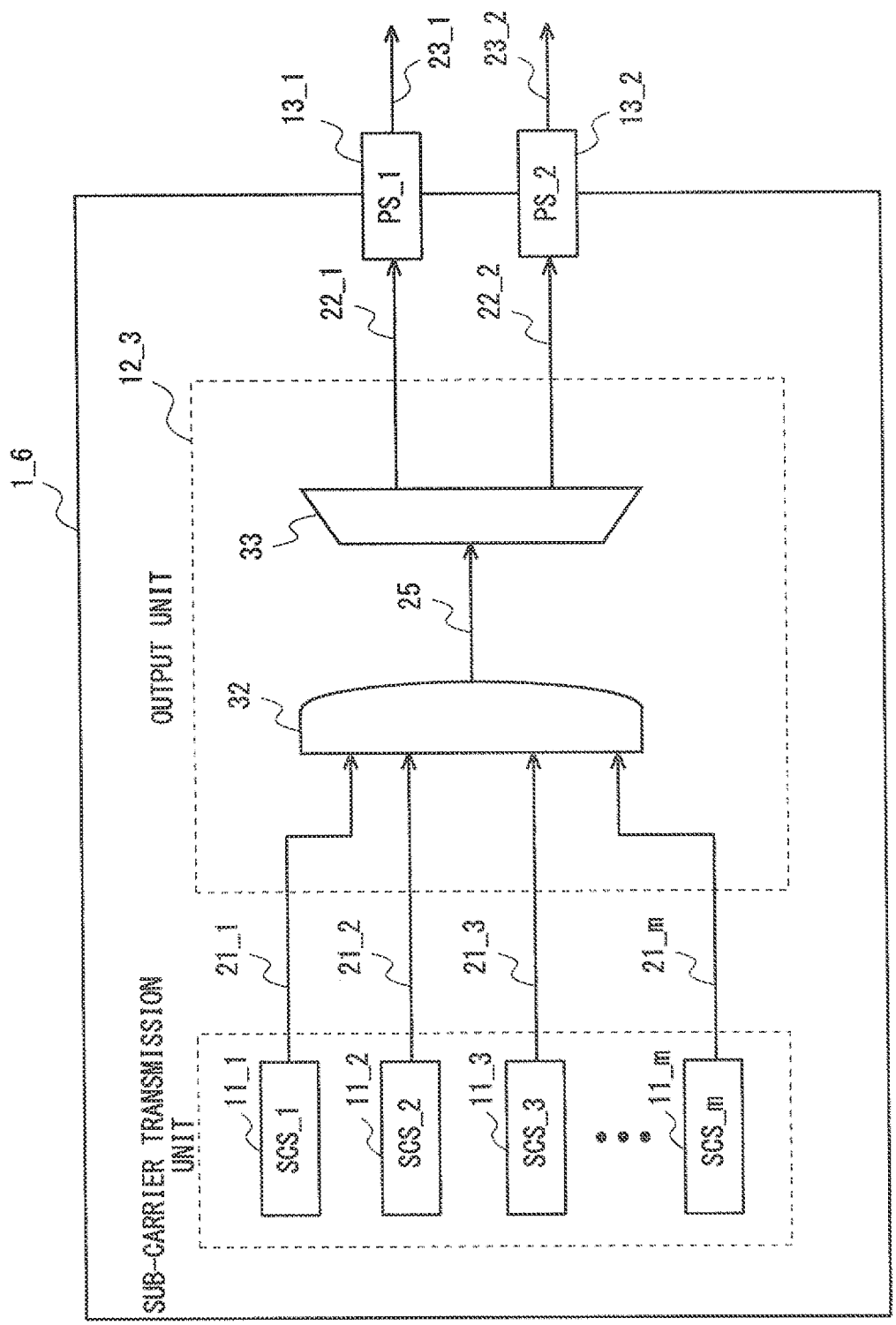
FIG. 13 is a block diagram showing the optical transmission apparatus according to the fourth exemplary embodiment.

Further, the output unit may include an optical multiplexer 32 and an optical demultiplexer 33 as shown in an output unit 12_3 included in an optical transmission apparatus 16 shown in FIG. 13. In this case, the optical multiplexer 32 multiplexes the optical transmission signals 21_1 to 21_$m$ respectively output from the sub-carrier transmission units 11_1 to 11_$m$ to produce a multiplexed optical signal 25 and outputs the multiplexed optical signal 25 to the optical demultiplexer 33. The optical demultiplexer 33 selectively outputs the respective optical transmission signals 21_1 to 21_$m$ included in the multiplexed optical signal 25 output from the optical multiplexer 32 to the transmission port 13_1 or 13_2.

For example, the optical demultiplexer 33 outputs the optical transmission signal 21_1 included in the multiplexed optical signal 25 to one of the transmission port 13_1 and the transmission port 13_2. Further, the optical demultiplexer 33 outputs the optical transmission signal 21_2 included in the multiplexed optical signal 25 to one of the transmission port 13_1 and the transmission port 13_2.

For example, the optical demultiplexer 33 may selectively output the respective optical transmission signals 21_1 to 21_$m$ included in the multiplexed optical signal 25 to the transmission port 13_1 or 13_2 according to the wavelength.

Fifth Exemplary Embodiment

Figure 14:
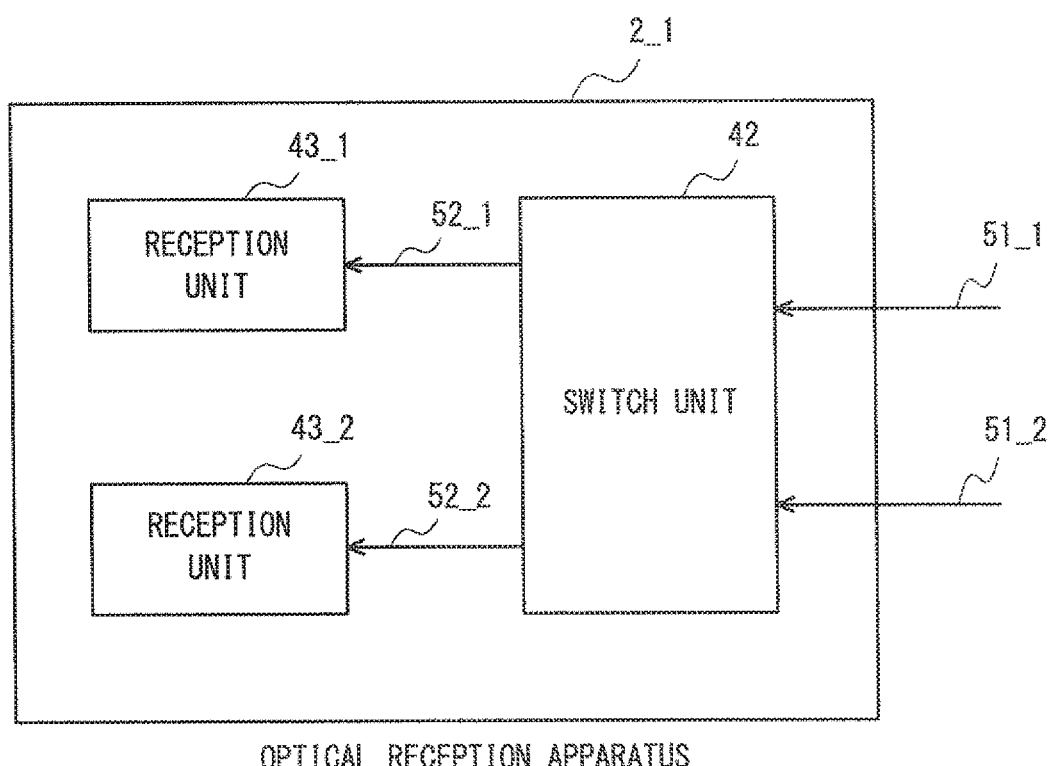
FIG. 14 is a block diagram showing an optical reception apparatus according to a fifth exemplary embodiment.

Next, a fifth exemplary embodiment according to the present invention will be described. FIG. 14 is a block diagram showing an optical reception apparatus 2_1 according to the fifth exemplary embodiment. As shown in FIG. 14, the optical reception apparatus 2_1 according to this exemplary embodiment includes a switch unit 42, a first reception unit 43_1, and a second reception unit 43_2. In the following description, the first and second reception units may be referred to as sub-carrier reception units.

The switch unit 42 receives optical reception signals 51_1 and 51_2 that have been input and selectively outputs sub-carrier reception signals 52_1 and 52_2 included therein to the first reception unit 43_1 and the second reception unit 43_2. In other words, the switch unit 42 is able to arbitrarily and dynamically switch the output destinations (first and second reception units 43_1 and 43_2) of the sub-carrier reception signals included in the optical reception signals 51_1 and 51_2. For example, the switch unit 42 is controlled using control means (not shown).

The first reception unit 43_1 receives data transmitted using the sub-carrier reception signal 52_1. The second reception unit 43_2 receives data transmitted using the sub-carrier reception signal 52_2. The first reception unit 43_1 and the second reception unit 43_2 include detectors (not shown) to detect the sub-carrier reception signals 52_1 and 52_2, respectively. Each of the detectors may include a local oscillator.

In the optical reception apparatus 2_1 according to this exemplary embodiment, when the first sub-carrier reception signal 52_1 and the second sub-carrier reception signal 52_2 share the set of information, the switch unit 42 receives the first sub-carrier reception signal 52_1 and the second sub-carrier reception signal 52_2 via one path. For example, the switch unit 42 is able to receive the first sub-carrier reception signal 52_1 and the second sub-carrier reception signal 52_2 via one path by receiving the optical reception signal 51_1 including the first sub-carrier reception signal 52_1 and the second sub-carrier reception signal 52_2. At this time, the switch unit 42 outputs the first sub-carrier reception signal 52_1 to the first reception unit 43_1 and the second sub-carrier reception signal 52_2 to the second reception unit 43_2.

On the other hand, when the first sub-carrier reception signal 52_1 and the second sub-carrier reception signal 52_2 do not share the set of information, the switch unit 42 receives the first sub-carrier reception signal 52_1 and the second sub-carrier reception signal 52_2 via paths different from each other. For example, when the optical reception signal 51_1 includes the first sub-carrier reception signal 52_1 and the optical reception signal 51_2 includes the second sub-carrier reception signal 52_2, the switch unit 42 is able to receive the first sub-carrier reception signal 52_1 and the second sub-carrier reception signal 52_2 via paths different from each other by receiving the optical reception signal 51_1 and the optical reception signal 51_2. At this time, the switch unit 42 outputs the first sub-carrier reception signal to the first reception unit 43_1 and the second sub-carrier reception signal to the second reception unit 43_2.

The case in which the first sub-carrier reception signal 52_1 and the second sub-carrier reception signal 52_2 share the set of information includes, for example, a case in which desired data is transmitted in parallel using the first sub-carrier reception signal 52_1 and the second sub-carrier reception signal 52_2.

On the other hand, the case in which the first sub-carrier reception signal 52_1 and the second sub-carrier reception signal 52_2 do not share the set of information includes, for example, a case in which the first sub-carrier reception signal 52_1 and the second sub-carrier reception signal 52_2 independently transmit desired data (e.g., a case in which a first optical transmission apparatus (not shown) transmits the first data using the first sub-carrier reception signal 52_1 and a second optical transmission apparatus (not shown) transmits the second data to the second sub-carrier reception signal 52_2). At this time, the optical reception apparatus 2_1 receives the first sub-carrier reception signal 52_1 transmitted from the first optical transmission apparatus (not shown) via the first path and the second sub-carrier reception signal 52_2 transmitted from the second optical transmission apparatus (not shown) via the second path.

As described above, in the optical reception apparatus 2_1 according to this exemplary embodiment, the first sub-carrier reception signal 52_1 and the second sub-carrier reception signal 52_2 are selectively output to the first reception unit 43_1 and the second reception unit 43_2 using the switch unit 42.

Due to the reason same as that described in the first exemplary embodiment, it is possible to provide the optical reception apparatus and the optical reception method capable of efficiently allocating the resources in the optical communication network.

Sixth Exemplary Embodiment

Figure 15:
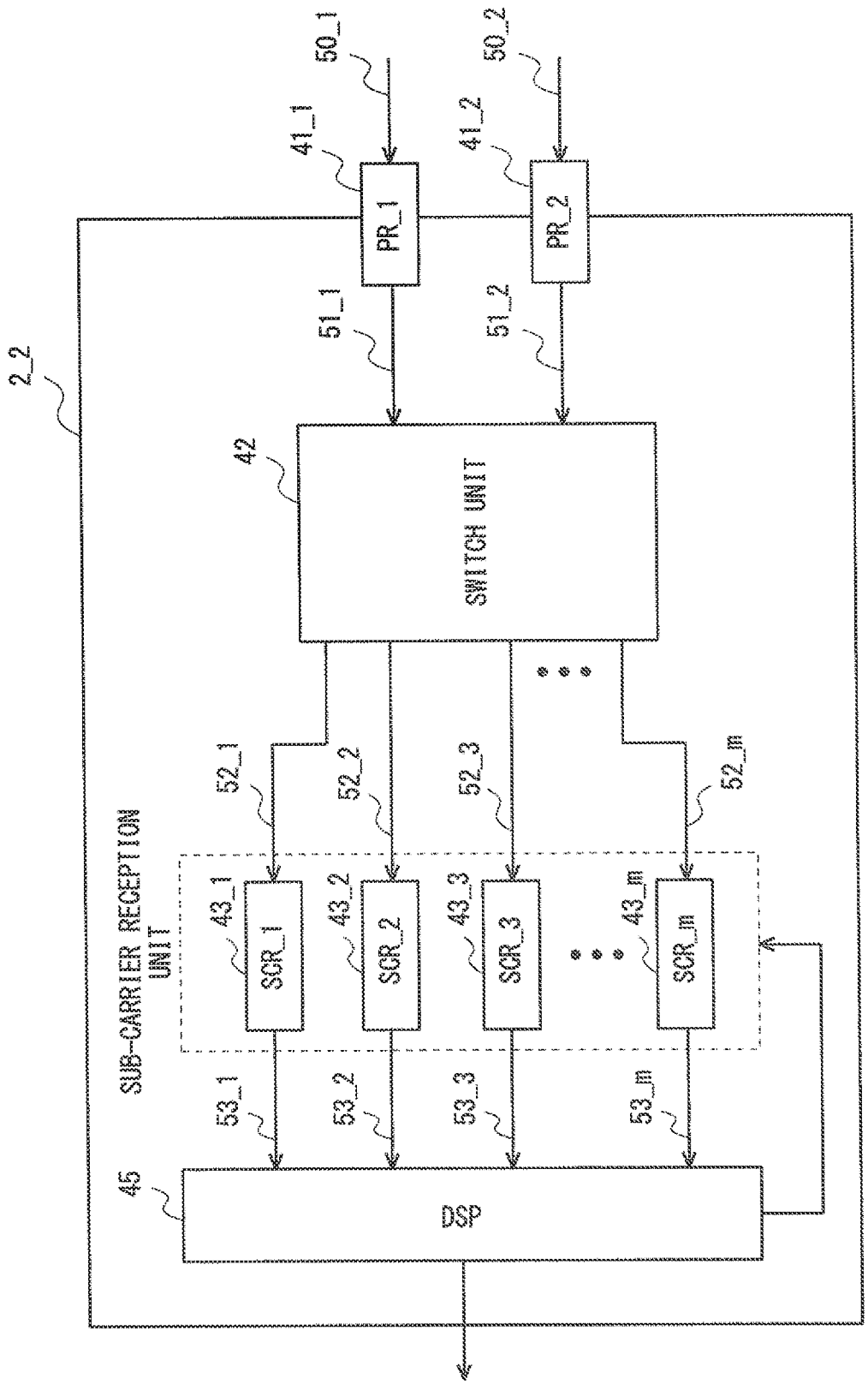
FIG. 15 is a block diagram showing an optical reception apparatus according to a sixth exemplary embodiment.

Next, a sixth exemplary embodiment of the present invention will be described. FIG. 15 is a block diagram showing an optical reception apparatus 2_2 according to the sixth exemplary embodiment. In the sixth exemplary embodiment, detailed configurations of the optical reception apparatus 2_1 described in the fifth exemplary embodiment will be described. As shown in FIG. 15, the optical reception apparatus 2_2 according to this exemplary embodiment includes a plurality of reception ports 41_1 and 41_2, a switch unit 42, sub-carrier reception units 43_1 to 43_$m$, and a signal processing unit 45.

The plurality of reception ports (PR_1 and PR_2) 41_1 and 41_2 receive multiplexed optical reception signals 50_1 and 50_2 supplied to the optical reception apparatus 2_2, respectively, and output optical reception signals 51_1 and 51_2 that have been received to the switch unit 42. The reception ports 41_1 and 41_2 are able to respectively receive the optical reception signals 50_1 and 50_2 transmitted from optical transmission apparatuses different from each other. For example, the reception port 41_1 is able to receive the optical reception signal 50_1 transmitted from the first optical transmission apparatus (not shown) and the reception port 41_2 is able to receive the optical reception signal 50_2 transmitted from the second optical transmission apparatus (not shown).

The switch unit 42 selectively outputs sub-carrier reception signals 52_1 to 52_$m$ included in the optical reception signals 51_1 and 51_2 received by the plurality of reception ports 41_1 and 41_2 to the plurality of sub-carrier reception units (SCR_1 to SCR_m) 43_1 to 43_$m$, respectively. In other words, the optical reception signals 51_1 and 51_2 that have been multiplexed are separated into the sub-carrier reception signals 52_1 to 52_$m$ in the switch unit 42. The sub-carrier reception signals 52_1 to 52_$m$ that have been separated are output to the sub-carrier reception units 43_1 to 43_$m$ respectively corresponding to the sub-carrier reception signals 52_1 to 52_$m$ (that is, the sub-carrier reception units that can receive the sub-carrier reception signals having wavelengths different from one another). At this time, one sub-carrier reception signal 52_$m$ is input to one sub-carrier reception unit 43_$m$.

The switch unit 42 is able to arbitrarily and dynamically switch the output destinations (sub-carrier reception units 43_1 to 43_$m$) of the respective sub-carrier reception signals 52_1 to 52_$m$. For example, the switch unit 42 is controlled using control means (not shown).

The sub-carrier reception unit 43_1 receives data transmitted using the sub-carrier reception signal 52_1. The sub-carrier reception unit 43_2 receives data transmitted using the sub-carrier reception signal 52_2. In this way, the sub-carrier reception unit 43_m receives data transmitted using the sub-carrier reception signal 52_m. The sub-carrier reception units 43_1 to 43_m include detectors (not shown) to respectively detect the sub-carrier reception signals 52_1 to 52_m. Each of the detectors may include a local oscillator. That is, the sub-carrier reception units 43_1 to 43_m are able to receive the sub-carrier reception signals 52_1 to 52_m respectively corresponding to the sub-carrier reception units 43_1 to 43_m by making the local oscillation light generated in the respective local oscillators and the sub-carrier reception signals 52_1 to 52_m that have been input interfere with each other.

The sub-carrier reception signals 52_1 to 52_m may be modulated using a predetermined modulation system. In this case, the sub-carrier reception units 43_1 to 43_m include circuits for reading out data from the sub-carrier reception signals 52_1 to 52_m modulated by a predetermined modulation system. The predetermined modulation system may include, for example, amplitude shift keying (ASK), frequency shift keying (FSK), phase shift keying (PSK), quadrature amplitude modulation (QAM), or quadri-phase shift keying (QPSK). Quadrature amplitude modulation (QAM) may be, for example, 16-QAM, 64-QAM, 128-QAM, or 256-QAM.

Further, in the optical reception apparatus 2_2 according to this exemplary embodiment, the sub-carrier reception units of the plurality of sub-carrier reception units 43_1 to 43_m that have received the sub-carrier reception signal (optical reception signal 50_1) via the reception port 41_1 are able to receive the first data that has been serial-parallel converted in parallel. Further, the sub-carrier reception units of the plurality of sub-carrier reception units 43_1 to 43_m that have received the sub-carrier reception signal (optical reception signal 50_2) via the second reception port 41_2 are able to receive the second data that has been serial-parallel converted. In other words, the respective sub-carrier reception signals included in the optical reception signal 50_1 received via the reception port 41_1 share the set of information. Further, the respective sub-carrier reception signals included in the optical reception signal 50_2 received via the reception port 41_2 share the set of information.

Specifically, it is assumed, for example, that the optical reception apparatus 2_2 includes sub-carrier reception units 43_1 to 43_10 and the sub-carrier reception units 43_1 to 43_6 of the sub-carrier reception units 43_1 to 43_10 receive the first data via the reception port 41_1. It is further assumed that the sub-carrier reception units 43_7 to 43_10 receive the second data via the reception port 41_2.

In this case, the optical reception apparatus 2_2 receives the optical reception signal 50_1 transmitted from the first optical transmission apparatus (not shown) via the reception port 41_1. The sub-carrier reception units 43_1 to 43_6 respectively receive sub-carrier reception signals 52_1 to 52_6 included in the optical reception signal 50_1, whereby it is possible to receive the first data (data serial-parallel converted by the first optical transmission apparatus) in parallel. The first data that has been transmitted in parallel can be converted into serial data by the signal processing unit 45 provided in the latter stage.

In a similar way, the optical reception apparatus 2_2 receives the optical reception signal 50_2 transmitted from the second optical transmission apparatus (not shown) via the reception port 41_2. The sub-carrier reception units 43_7 to 43_10 respectively receive the sub-carrier reception signals 52_7 to 52_10 included in the optical reception signal 50_2, whereby it is possible to receive the second data (data that has been serial-parallel converted by the second optical transmission apparatus) in parallel. The second data that has been transmitted in parallel can be converted into serial data by the signal processing unit 45 provided in the latter stage.

For example, each of the sub-carrier reception units 43_1 to 43_m includes a photoelectric converter (not shown). The respective photoelectric converters convert the sub-carrier reception signals 52_1 to 52_m into electric signals and output the electric signals to the signal processing unit 45 as reception signals 53_1 to 53_m. A photodiode may be used, for example, as the photoelectric converter.

The signal processing unit 45 performs predetermined processing on the reception signals 53_1 to 53_m output from the sub-carrier reception units 43_1 to 43_m to generate data. Further, the signal processing unit 45 may compensate for the influence of mutual interference among the sub-carrier reception signals 52_1 to 52_m. That is, by concurrently processing the sub-carrier reception units 43_1 to 43_m in the signal processing unit 45, compensation of crosstalk and compensation of a non-linear optical effect (e.g., cross-phase modulation (XPM), four wave mixing (FWM)) may be carried out, for example. For example, the signal processing unit 45 may compensate for the influence of the mutual interference among the sub-carrier reception signals 52_1 to 52_m by controlling the local oscillators included in the respective sub-carrier reception units 43_1 to 43_m according to the sub-carrier reception signals 52_1 to 52_m.

In the SuperChannel technology, the plurality of wavelengths (sub-carriers) are used in the bandwidth of one channel and the wavelengths are multiplexed with a high density. Therefore, there is a large influence of the mutual interference among the sub-carriers. In the optical reception apparatus according to this exemplary embodiment, the plurality of different sub-carriers are received by one optical reception apparatus and the neighboring sub-carriers that have an influence on one sub-carrier can be concurrently monitored. It is therefore possible to set compensation parameters for compensating for the influence of the mutual interference among the sub-carrier reception signals.

In this exemplary embodiment, the case in which the optical reception apparatus 2_2 includes two reception ports 41_1 and 41_2 has been described. However, the number of reception ports included in the optical reception apparatus 2_2 may be three or more.

Similar to the case described in the first exemplary embodiment, if the optical reception apparatus includes only one reception port, the following problem occurs. That is, if there are unused sub-carrier reception units while the optical reception apparatus is receiving data from the first optical transmission apparatus (not shown) via one reception port, the unused sub-carrier reception units cannot be used and the resources are wasted. That is, when there is only one reception port, it is impossible to receive data from another optical transmission apparatus using the unused sub-carrier reception units and the unused sub-carrier reception units are wasted.

In the optical reception apparatus 2_2 according to this exemplary embodiment, as shown in FIG. 15, the plurality of reception ports 41_1 and 41_2 and the switch unit 42 are provided and the sub-carrier reception signals 52_1 to 52_m included in the optical reception signals 51_1 and 51_2 received by the plurality of reception ports 41_1 and 41_2 are selectively output to the plurality of sub-carrier reception units 43_1 to 43_m using the switch unit 42. Therefore, when there are unused sub-carrier reception units, for example, it is possible to receive the optical reception signal from another optical transmission apparatus (not shown) via a free reception port and the unused sub-carrier reception units are able to receive the data using this optical reception signal.

While the case in which one sub-carrier reception signal 52_m is input to one sub-carrier reception unit 43_m has been described above, the optical reception apparatus 2_2 according to this exemplary embodiment may be configured in such a way that a plurality of sub-carrier reception signals are input to one sub-carrier reception unit 43_m and one sub-carrier reception unit 43_m selectively receives the plurality of sub-carrier reception signals. In this case, by providing a local oscillator (not shown) in each of the sub-carrier reception units 43_1 to 43_m and making the local oscillation light having specific wavelengths output from the local oscillators and the plurality of sub-carrier reception signals (multiplexed sub-carrier reception signal) that have been input interfere with each other, it is possible to selectively receive a predetermined sub-carrier reception signal (i.e., sub-carrier reception signal corresponding to a particular wavelength) from the plurality of sub-carrier reception signals. In this way, by allowing the plurality of sub-carrier reception signals to be input to one sub-carrier reception unit 43_m, it is possible to simplify the configuration of the switch unit 42.

According to the present invention described in this exemplary embodiment, it is possible to provide the optical reception apparatus and the optical reception method capable of efficiently allocating the resources in the optical communication network.

Seventh Exemplary Embodiment

Figure 16:
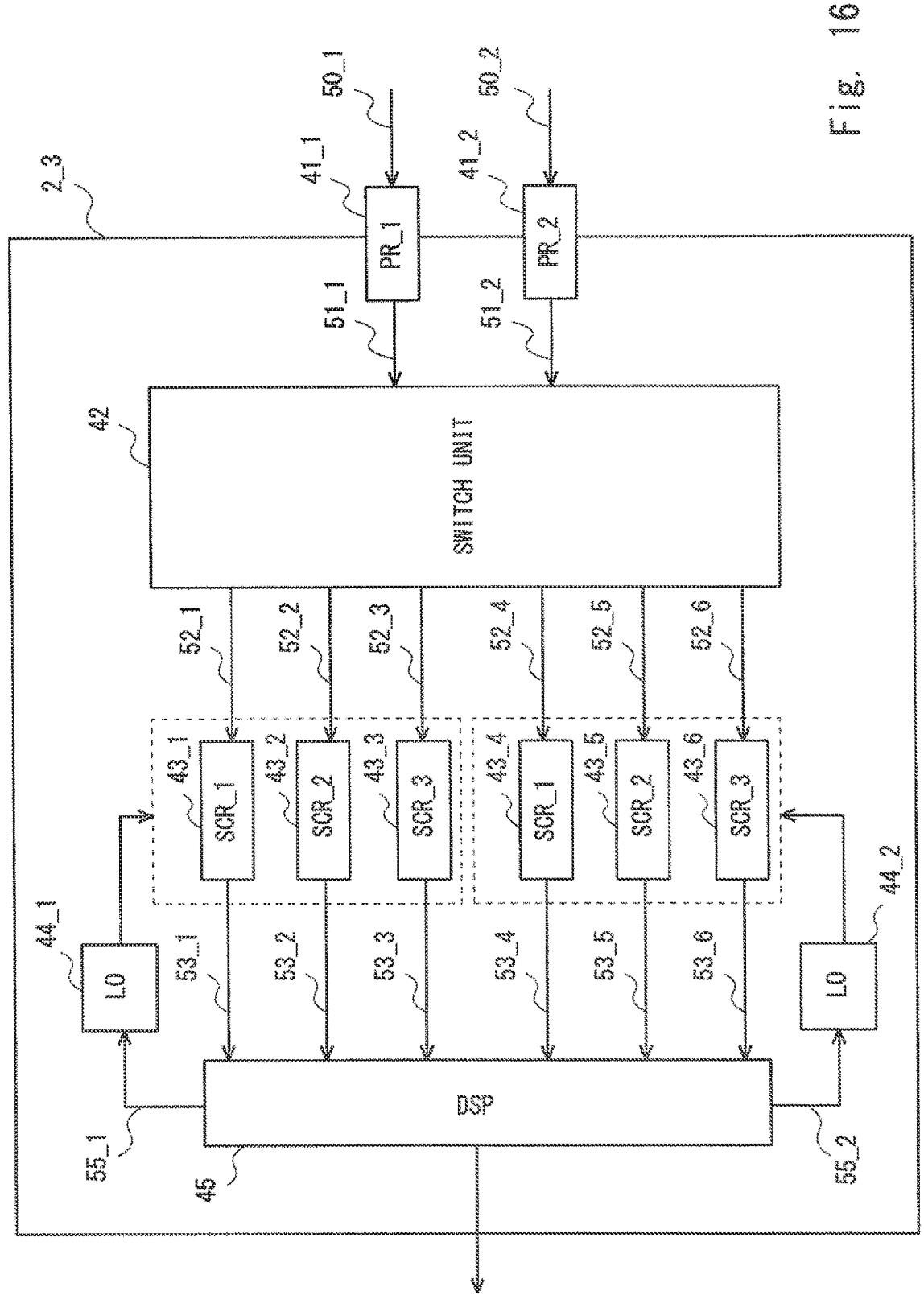
FIG. 16 is a block diagram showing an optical reception apparatus according to a seventh exemplary embodiment.

Next, a seventh exemplary embodiment of the present invention will be described. FIG. 16 is a block diagram showing an optical reception apparatus 2_3 according to this exemplary embodiment. The optical reception apparatus 2_3 according to this exemplary embodiment is different from the optical reception apparatus 2_2 according to the sixth exemplary embodiment in that a plurality of sub-carrier reception units share a local oscillator (LO) in the optical reception apparatus 2_3 according to this exemplary embodiment. Since the other configurations are similar to those of the optical reception apparatus 2_2 described in the sixth exemplary embodiment, the same components are denoted by the same reference symbols and overlapping descriptions will be omitted.

As shown in FIG. 16, the optical reception apparatus 2_3 according to this exemplary embodiment includes a plurality of reception ports 41_1 and 41_2, a switch unit 42, sub-carrier reception units 43_1 to 43_6, local oscillators 44_1 and 44_2, and a signal processing unit 45. In the optical reception apparatus 2_3 according to this exemplary embodiment, a plurality of sub-carrier reception units share a local oscillator. That is, the plurality of sub-carrier reception units 43_1 to 43_3 share the local oscillator 44_1. Further, the plurality of sub-carrier reception units 43_4 to 43_6 share the local oscillator 44_2. In the example shown in FIG. 16, the number of sub-carrier reception units is 6 (m=6). However, the number of sub-carrier reception units may be other than 6. In this case, the number of local oscillators may be increased according to the number of sub-carrier reception units. While the example in which the three sub-carrier reception units share one local oscillator is shown in the example shown in FIG. 16, the number of sub-carrier reception units that share one local oscillator may be two or four or more.

The switch unit 42 selectively outputs the sub-carrier reception signals 52_1 to 52_6 included in the optical reception signals 51_1 and 51_2 received by the plurality of reception ports 41_1 and 41_2 to the plurality of sub-carrier reception units 43_1 to 43_6. In other words, the optical reception signals 51_1 and 51_2 that have been multiplexed are separated into the sub-carrier reception signals 52_1 to 52_6 in the switch unit 42. The sub-carrier reception signals 52_1 to 52_6 that have been separated are output to the sub-carrier reception units 43_1 to 43_6 corresponding to the sub-carrier reception signals 52_1 to 52_6, respectively. At this time, one sub-carrier reception signal is input to one sub-carrier reception unit.

The switch unit 42 is able to arbitrarily and dynamically switch the output destinations of the respective sub-carrier reception signals 52_1 to 52_6. For example, the switch unit 42 is controlled using control means (not shown).

The sub-carrier reception units 43_1 to 43_6 respectively receive data transmitted using the sub-carrier reception signals 52_1 to 52_6. The sub-carrier reception units 43_1 to 43_6 include detectors (not shown) to detect the sub-carrier reception signals 52_1 to 52_6. At this time, the detectors included in the sub-carrier reception units 43_1 to 43_6 may perform detection using the local oscillation light output the from local oscillators 44_1 and 44_2.

In summary, the sub-carrier reception units 43_1 to 43_3 are able to respectively detect the sub-carrier reception signals 52_1 to 52_3 using the local oscillation light output from the local oscillator 44_1. At this time, the local oscillator 44_1 generates the local oscillation light having wavelengths corresponding to the respective sub-carrier reception signals 52_1 to 52_3 (wavelengths that interfere with the respective sub-carrier reception signals 52_1 to 52_3). That is, when the wavelengths of the sub-carrier reception signals 52_1 to 52_3 are close to each other, even when the local oscillation light output from the local oscillator 44_1 is a local oscillation light having a single wavelength, the sub-carrier reception signals 52_1 to 52_3 interfere with the local oscillation light. Therefore, the sub-carrier reception units 43_1 to 43_3 are able to respectively detect the sub-carrier reception signals 52_1 to 52_3 using the local oscillation light output from the local oscillator 44_1.

In a similar way, the sub-carrier reception units 43_4 to 43_6 are able to respectively detect the sub-carrier reception signals 52_4 to 52_6 using the local oscillation light output from the local oscillator 44_2. At this time, the local oscillator 44_2 generates the local oscillation light having wavelengths corresponding to the respective sub-carrier reception signals 52_4 to 52_6 (wavelengths that interfere with the respective sub-carrier reception signals 52_4 to 52_6). That is, when the wavelengths of the sub-carrier reception signals 52_4 to 52_6 are close to each other, even when the local oscillation light output from the local oscillator 44_2 is a local oscillation light having a single wavelength, the sub-carrier reception signals 52_4 to 52_6 interfere with the local oscillation light. Therefore, the sub-carrier reception units 43_4 to 43_6 are able to respectively detect the sub-carrier reception signals 52_4 to 52_6 using the local oscillation light output from the local oscillator 44_2. For example, the local oscillators 44_1 and 44_2 may be formed using laser diodes.

For example, each of the sub-carrier reception units 43_1 to 43_6 includes a photoelectric converter (not shown). The respective photoelectric converters convert the sub-carrier reception signals 52_1 to 52_6 into electric signals and output the electric signals to the signal processing unit 45 as reception signals 53_1 to 53_6. The photoelectric converter may be, for example, a photodiode.

The signal processing unit 45 performs predetermined processing on the reception signals 53_1 to 53_6 respectively output from the sub-carrier reception units 43_1 to 43_6 to generate data. Further, the signal processing unit 45 is able to control the local oscillators 44_1 and 44_2 according to the reception signals 53_1 to 53_6 output from the sub-carrier reception units 43_1 to 43_6. In other words, the local oscillators 44_1 and 44_2 are controlled according to the sub-carrier reception signals 52_1 to 52_6 included in the optical reception signals 51_1 and 51_2.

For example, when the sub-carrier reception signals corresponding to the plurality of sub-carrier reception units are not included in the optical reception signals 51_1 and 51_2, the signal processing unit 45 may turn off the local oscillator shared by the plurality of sub-carrier reception units. Specifically, when none of the sub-carrier reception signals 52_1 to 52_3 corresponding to the sub-carrier reception units 43_1 to 43_3 is included in the optical reception signals 51_1 and 51_2, the local oscillator 44_1 shared by the sub-carrier reception units 43_1 to 43_3 may be turned off. In a similar way, when none of the sub-carrier reception signals 52_4 to 52_6 corresponding to the sub-carrier reception units 43_4 to 43_6 is included in the optical reception signals 51_1 and 51_2, the local oscillator 44_2 shared by the sub-carrier reception units 43_4 to 43_6 may be turned off. According to such a control, unnecessary local oscillators may be turned off and power consumption in the optical reception apparatus 2_3 can be reduced.

Further, similar to the case described in the sixth exemplary embodiment, by concurrently processing the plurality of sub-carrier reception signals in the signal processing unit 45, it is possible to compensate for crosstalk and the non-linear optical effect (e.g., cross-phase modulation (XPM), four wave mixing (FWM)).

According to the present invention described in this exemplary embodiment, it is possible to provide the optical reception apparatus and the optical reception method capable of efficiently allocating the resources in the optical communication network.

Eighth Exemplary Embodiment

Figure 17:
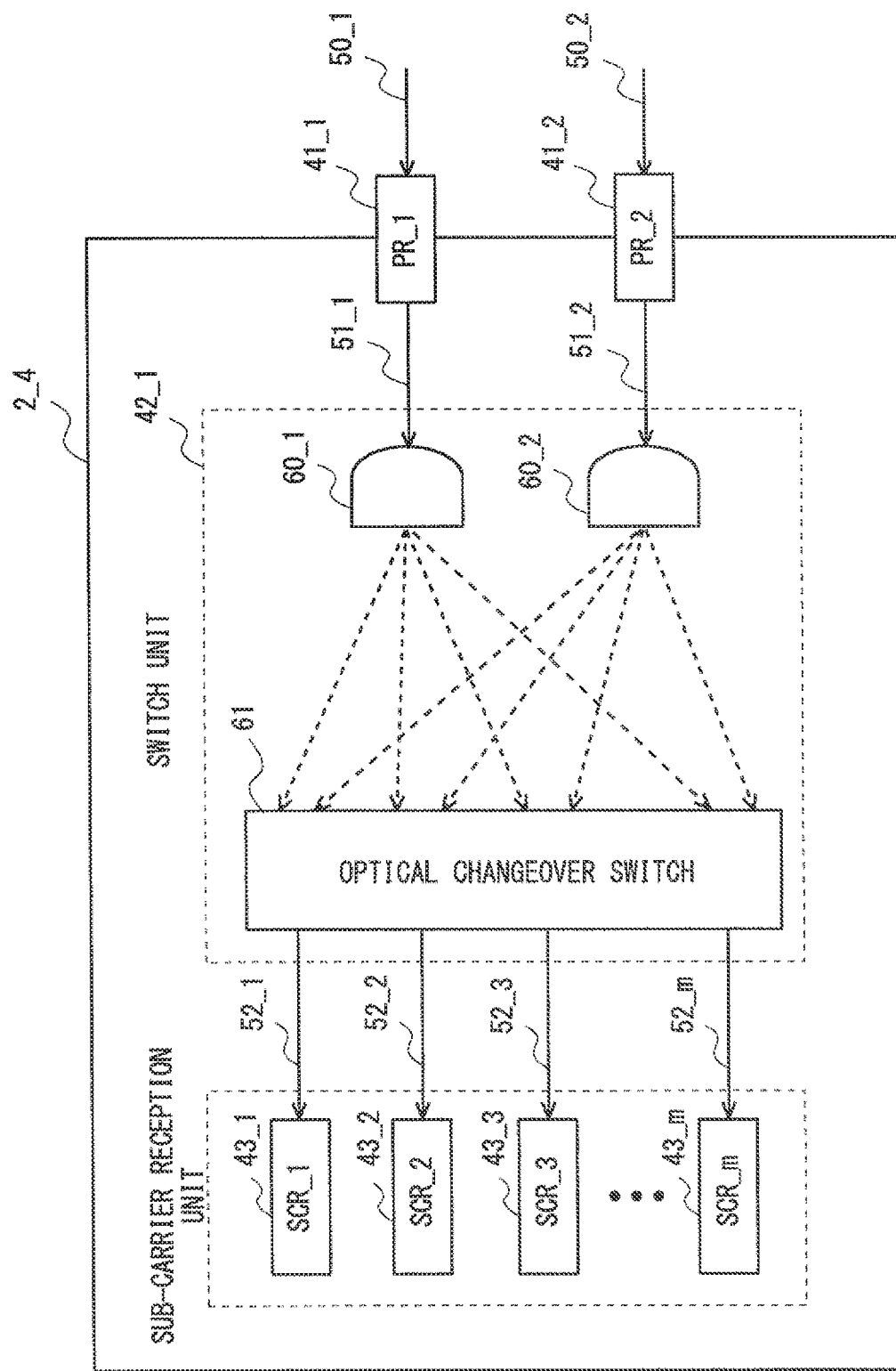
FIG. 17 is a block diagram showing an optical reception apparatus according to an eighth exemplary embodiment.

Next, an eighth exemplary embodiment according to the present invention will be described. FIG. 17 is a block diagram showing an optical reception apparatus 2_4 according to this exemplary embodiment. In the optical reception apparatus 2_4 according to this exemplary embodiment, a specific configuration example of the switch unit 42 included in the optical reception apparatuses 2_1 to 2_3 described in the fifth to seventh exemplary embodiments is shown. Since the other configurations are similar to those of the optical reception apparatuses 2_1 to 2_3 described in the fifth to seventh exemplary embodiments, the same components are denoted by the same reference symbols and overlapping descriptions will be omitted.

As shown in FIG. 17, a switch unit 42_1 included in the optical reception apparatus 2_4 according to this exemplary embodiment includes optical branching devices 60_1 and 60_2 and an optical changeover switch 61. The optical branching devices 60_1 and 60_2 are provided to correspond to the reception ports 41_1 and 41_2, respectively, branch the optical reception signals 51_1 and 51_2 respectively received by the reception ports 41_1 and 41_2, and output the signals that have been branched off to the optical changeover switch 61.

The optical changeover switch 61 receives the optical reception signals branched off by the optical branching devices 60_1 and 60_2 and selectively outputs the optical reception signals to the sub-carrier reception units 43_1 to 43_m. For example, the optical changeover switch 61 may be formed using an optical matrix switch having m×2 inputs and m outputs. The m outputs of the optical changeover switch 61 correspond to the number of sub-carrier reception units 43_1 to 43_m. For example, the optical changeover switch 61 is controlled using control means (not shown).

As described above, in the optical reception apparatus 2_4 according to this exemplary embodiment, the switch unit 42_1 is configured using the optical branching devices 60_1 and 60_2 and the optical changeover switch 61. Therefore, it is possible to dynamically switch the sub-carrier reception signals 52_1 to 52_m respectively supplied to the sub-carrier reception units 43_1 to 43_m.

Figure 18:
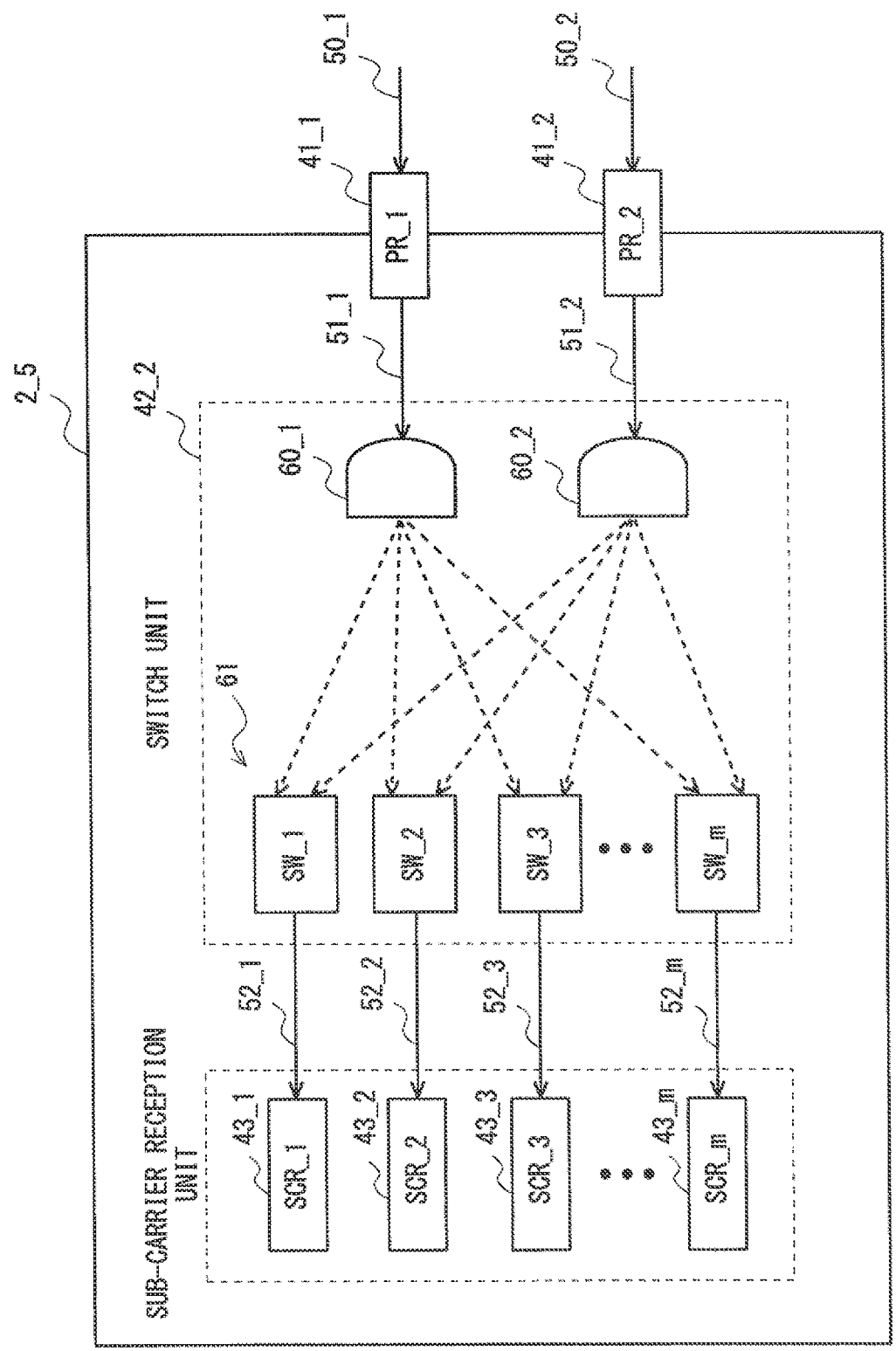
FIG. 18 is a block diagram showing the optical reception apparatus according to the eighth exemplary embodiment.

The optical changeover switch 61 may be configured using a plurality of optical switches SW_1 to SW_m, as shown in a switch unit 42_2 included in an optical reception apparatus 2_5 shown in FIG. 18. In this case, the optical switches SW_1 to SW_m are provided to correspond to the sub-carrier reception units 43_1 to 43_m, respectively, select the optical reception signals to be output to the sub-carrier reception units 43_1 to 43_m from the optical reception signals branched off by the optical branching devices 60_1 and 60_2, and output the optical reception signals to the sub-carrier reception units 43_1 to 43_m.

For example, the optical switch SW_1 is provided to correspond to the sub-carrier reception unit 43_1, selects the sub-carrier reception signal 52_1 corresponding to the sub-carrier reception unit 43_1 from the optical reception signals branched off by the optical branching devices 60_1 and 60_2, and outputs the sub-carrier reception signal 52_1 that has been selected to the sub-carrier reception unit 43_1. The optical switch SW_2 is provided to correspond to the sub-carrier reception unit 43_2, selects the sub-carrier reception signal 52_2 corresponding to the sub-carrier reception unit 43_2 from the optical reception signals branched off by the optical branching devices 60_1 and 60_2, and outputs the sub-carrier reception signal 52_2 that has been selected to the sub-carrier reception unit 43_2. The respective optical switches SW_1 to SW_m are controlled using control means (not shown). For example, each of the optical switches SW_1 to SW_m may be formed of a wavelength selective optical switch.

Further, like the optical reception apparatus described in the latter part of the sixth exemplary embodiment, for example, if each of the sub-carrier reception units 43_1 to 43_m is able to selectively receive a particular sub-carrier reception signal, a plurality of sub-carrier reception signals may be input to one sub-carrier reception unit 43_m. In this case, for example, each of the optical switches SW_1 to SW_m may output the plurality of sub-carrier reception signals to one sub-carrier reception unit 43_m.

Figure 19:
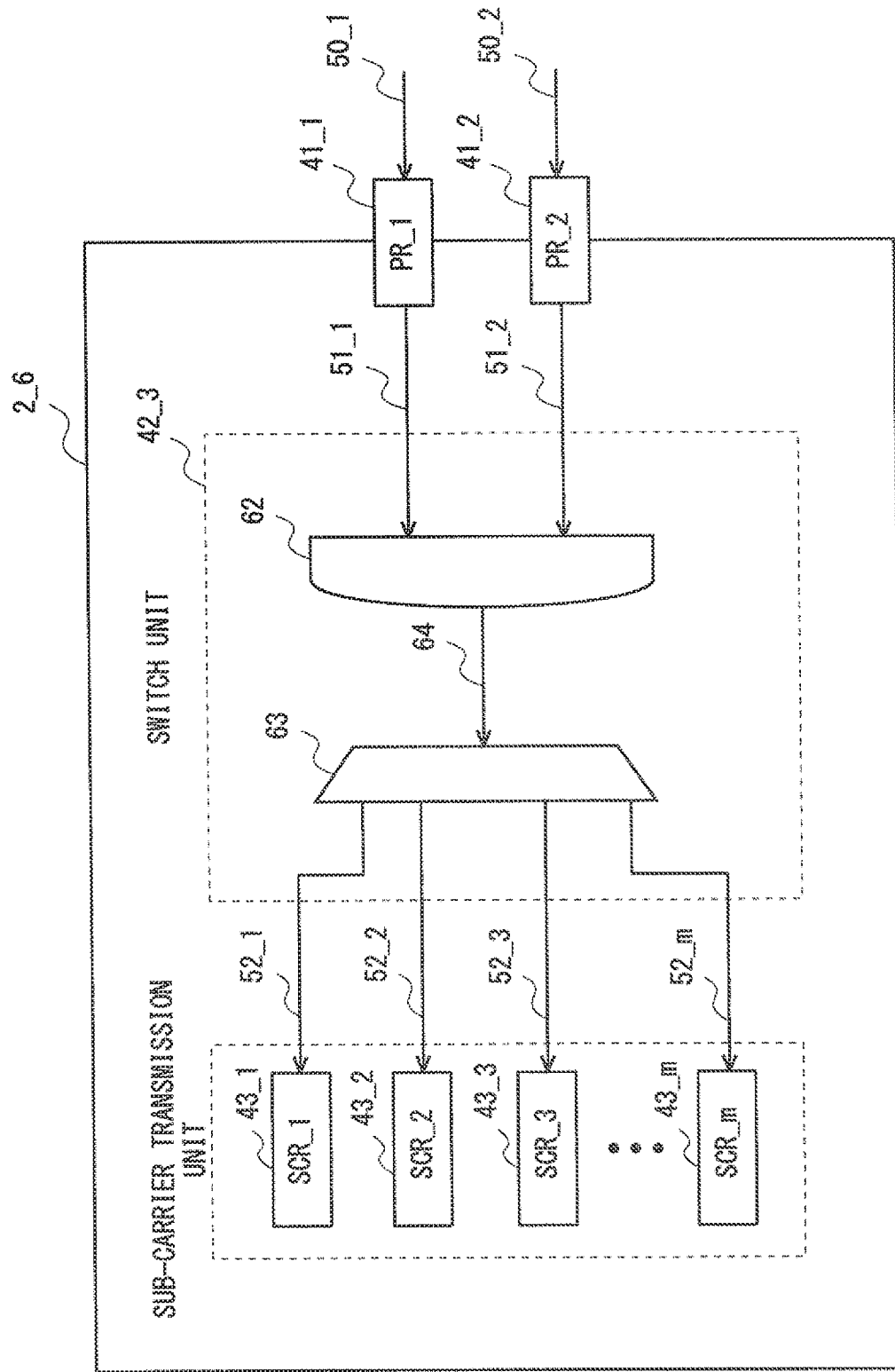
FIG. 19 is a block diagram showing the optical reception apparatus according to the eighth exemplary embodiment.

Alternatively, the switch unit may be formed of an optical multiplexer 62 and an optical demultiplexer 63, as shown in a switch unit 42_3 included in an optical reception apparatus 2_6 shown in FIG. 19. The optical multiplexer 62 multiplexes the optical reception signals 51_1 and 51_2 respectively received by the reception ports 41_1 and 41_2 to produce a multiplexed optical signal 64 and outputs the multiplexed optical signal 64 to the optical demultiplexer 63. The optical demultiplexer 63 selectively outputs the respective sub-carrier reception signals 52_1 to 52_m included in the multiplexed optical signal 64 to the sub-carrier reception units 43_1 to 43_m, respectively.

That is, the optical demultiplexer 63 outputs the sub-carrier reception signal 52_1 included in the multiplexed optical signal 64 to the sub-carrier reception unit 43_1. Further, the optical demultiplexer 63 outputs the sub-carrier reception signal 52_2 included in the multiplexed optical signal 64 to the sub-carrier reception unit 43_2.

For example, the optical demultiplexer 63 is able to selectively output the sub-carrier reception signals 52_1 to 52_m included in the multiplexed optical signal 64 to the sub-carrier reception units 43_1 to 43_m, respectively, according to the wavelength. In this case, the optical demultiplexer 63 may be formed of the wavelength selective optical demultiplexer 63.

Further, like the optical reception apparatus described in the latter part of the sixth exemplary embodiment, for example, if each of the sub-carrier reception units 43_1 to 43_m is able to selectively receive a specific sub-carrier reception signal, the plurality of sub-carrier reception signals may be input to one sub-carrier reception unit 43_m. In this case, for example, the optical demultiplexer 62 may output the plurality of sub-carrier reception signals included in the multiplexed optical signal 63 to one sub-carrier reception unit 43_m. For example, an optical branching device may be used in place of the optical demultiplexer 63.

Ninth Exemplary Embodiment

Figure 20:
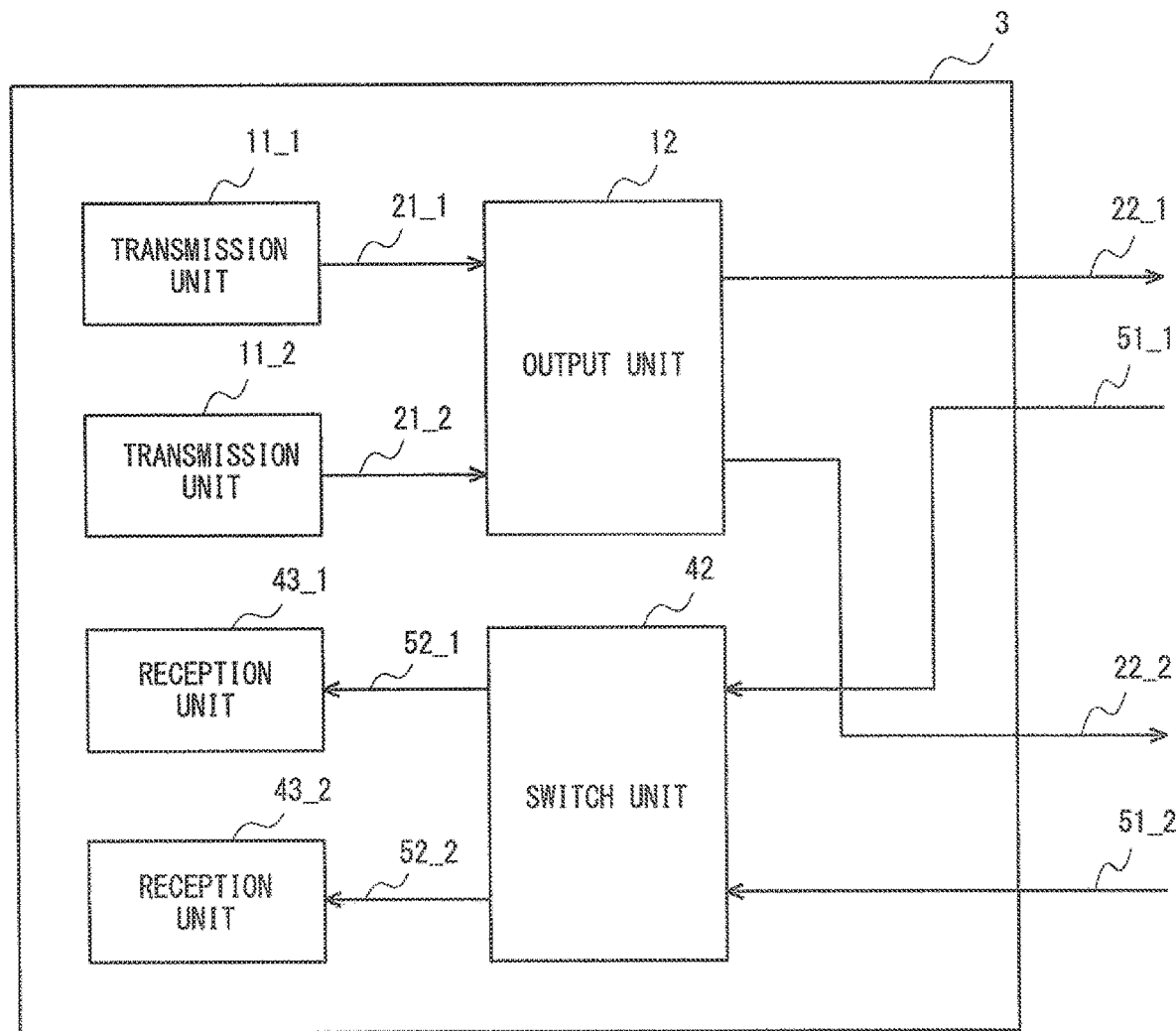
FIG. 20 is a block diagram showing an optical communication apparatus according to a ninth exemplary embodiment.

Next, a ninth exemplary embodiment of the present invention will be described. FIG. 20 is a block diagram showing an optical communication apparatus 3 according to this exemplary embodiment. The optical communication apparatus 3 according to this exemplary embodiment is an optical communication apparatus that can transmit and receive data and has a configuration in which the optical transmission apparatus 1_1 described in the first exemplary embodiment and the optical reception apparatus 2_1 described in the fifth exemplary embodiment are combined with each other.

As shown in FIG. 20, the optical communication apparatus 3 according to this exemplary embodiment includes a first transmission unit 11_1, a second transmission unit 11_2, an output unit 12, a switch unit 42, a first reception unit 43_1, and a second reception unit 43_2. The optical transmission signal 22_1 and the optical reception signal 51_1 can be transmitted or received via the first path. Further, the optical transmission signal 22_2 and the optical reception signal 51_2 can be transmitted or received via the second path.

Since the configurations and the operations of the first transmission unit 11_1, the second transmission unit 11_2, and the output unit 12 are similar to those of the optical transmission apparatus 1_1 described in the first exemplary embodiment, overlapping descriptions will be omitted. Further, since the configurations and the operations of the switch unit 42, the first reception unit 43_1, and the second reception unit 43_2 are similar to those of the optical reception apparatus 2_1 described in the fifth exemplary embodiment, overlapping descriptions will be omitted.

Further, also in the optical communication apparatus 3 according to this exemplary embodiment as well, the configurations of the optical transmission apparatuses 1_2 to 1_6 described in the second to fourth exemplary embodiments may be applied or the configurations of the optical reception apparatuses 2_2 to 2_6 described in the sixth to eighth exemplary embodiments may be applied.

According to the present invention described in this exemplary embodiment, it is possible to provide the optical communication apparatus and the optical communication method capable of efficiently allocating the resources in the optical communication network.

Tenth Exemplary Embodiment

Figure 21:
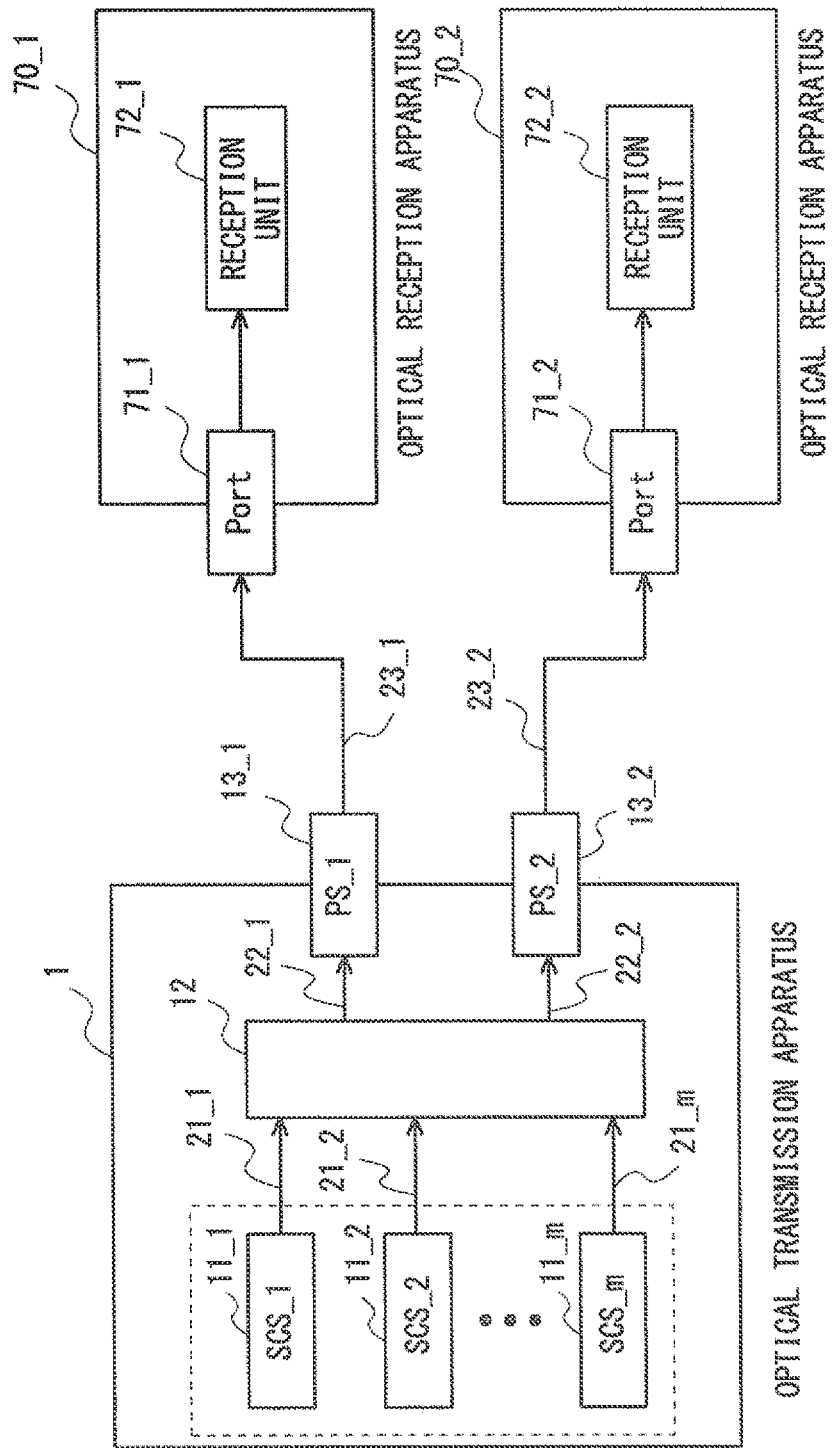
FIG. 21 is a block diagram showing an optical communication system according to a tenth exemplary embodiment.

Next, a tenth exemplary embodiment of the present invention will be described. FIG. 21 is a block diagram showing an optical communication system according to this exemplary embodiment. As shown in FIG. 21, the optical communication system according to this exemplary embodiment includes an optical transmission apparatus 1 and optical reception apparatuses 70_1 and 70_2 that communicate with the optical transmission apparatus 1. The optical transmission apparatuses 1_1 to 1_6 described in the first to fourth exemplary embodiments may be used as the optical transmission apparatus 1.

The optical transmission apparatus 1 includes a plurality of sub-carrier transmission units 11_1 to 11_m, an output unit 12, and transmission ports 13_1 and 13_2. The plurality of sub-carrier transmission units 11_1 to 11_m respectively generate optical transmission signals 21_1 to 21_m that transmit data using sub-carriers. The output unit 12 selectively outputs the optical transmission signals 21_1 to 21_m respectively output from the sub-carrier transmission units 11_1 to 1_m to the transmission port 13_1 or the transmission port 13_2. Since the configuration and the operation of the optical transmission apparatus 1 are similar to those of the optical transmission apparatuses 1_1 to 1_6 described in the first to fourth exemplary embodiments, overlapping descriptions will be omitted.

The transmission port 13_1 is connected to a reception port 71_1 of the optical reception apparatus 70_1 via an optical fiber and the transmission port 13_2 is connected to a reception port 71_2 of the optical reception apparatus 70_2 via an optical fiber. The optical transmission apparatus 1 transmits the optical transmission signal 23_1 to the optical reception apparatus 70_1 via the transmission port 13_1. Further, the optical transmission apparatus 1 transmits the optical transmission signal 23_2 to the optical reception apparatus 70_2 via the transmission port 13_2. The optical transmission signal 23_1 is a signal in which the plurality of optical transmission signals 21_m are multiplexed. A reception unit 72_1 included in the optical reception apparatus 70_1 is configured to be able to receive the multiplexed optical transmission signal. In a similar way, the optical transmission signal 23_2 is a signal in which the plurality of optical transmission signals 21_m are multiplexed. A reception unit 72_2 included in the optical reception apparatus 70_2 is configured to be able to receive the multiplexed optical transmission signal.

The sub-carrier transmission units of the plurality of sub-carrier transmission units 11_1 to 11_m that transmit the optical transmission signals via the transmission port 13_1 may transmit the first data that has been serial-parallel converted to the optical reception apparatus 70_1 in parallel. Further, the sub-carrier transmission units of the plurality of sub-carrier transmission units 11_1 to 11_m that transmit the optical transmission signals via the transmission port 13_2 may transmit the second data that has been serial-parallel converted to the optical reception apparatus 70_2 in parallel.

That is, the optical transmission apparatus 1 serial-parallel converts the first data to be transmitted to the optical reception apparatus 70_1 and generates the optical transmission signal to transmit data that have been serial-parallel converted by the sub-carrier transmission unit to transmit the optical transmission signal to the optical reception apparatus 70_1. The optical reception apparatus 70_1 is able to receive data that has been serial-parallel converted included in the optical transmission signal 23_1 and parallel-serial convert the received data that has been serial-parallel converted to obtain the first data that has been parallel-serial converted. The same is applicable to the second data to be transmitted to the optical reception apparatus 70_2.

Further, in the optical communication system according to this exemplary embodiment, the transmission capacity between the optical transmission apparatus 1 and the optical reception apparatus 70_1 is determined based on the number of sub-carrier transmission units 11_1 to 11_m that output the optical transmission signals to the transmission port 13_1. In a similar way, the transmission capacity between the optical transmission apparatus 1 and the optical reception apparatus 70_2 is determined based on the number of sub-carrier transmission units 11_1 to 11_m that output the optical transmission signals to the transmission port 13_2. In other words, the ratio of the transmission capacity of the optical transmission signal 23_1 to the transmission capacity of the optical transmission signal 23_2 corresponds to the ratio of the number of sub-carrier transmission units connected to the transmission port 13_1 to the number of sub-carrier transmission units connected to the transmission port 13_2. For example, in order to increase the transmission capacity between the optical transmission apparatus 1 and the optical reception apparatus 70_1, the output unit 12 is controlled to increase the number of sub-carrier transmission units connected to the transmission port 13_1.

Further, the sub-carrier of a first wavelength band may be used as the transmission between the optical transmission apparatus 1 and the optical reception apparatus 70_1 and the sub-carrier of a second wavelength band may be used as the transmission between the optical transmission apparatus 1 and the optical reception apparatus 70_2. The first wavelength band and the second wavelength band are bands whose wavelengths do not overlap each other. For example, these wavelength bands are C band, L band, S band or the like used in the WDM.

Further, the settings of the communication between the optical transmission apparatus 1 and the optical reception apparatus 70_1 may be determined according to at least one of the distance between the optical transmission apparatus 1 and the optical reception apparatus 70_1, a time zone in which the communication is performed, and the state of the transmission path between the optical transmission apparatus 1 and the optical reception apparatus 70_1. Alternatively, the communication between the optical transmission apparatus 1 and the optical reception apparatus 70_1 may be set using at least one of the allocation of the wavelength band of the sub-carrier in the communication between the optical transmission apparatus 1 and the optical reception apparatus 70_1, the path of the optical signal, and the modulation system. The same is applicable to the settings of the communication between the optical transmission apparatus 1 and the optical reception apparatus 70_2.

For example, the multi-value degree for each sub-carrier may decrease and the number of sub-carriers may increase as the communication distance between the optical transmission apparatus 1 and the optical reception apparatus 70_1 increases. On the other hand, the multi-value degree for each sub-carrier may increase and the number of sub-carriers may decrease as the communication distance between the optical transmission apparatus 1 and the optical reception apparatus 70_1 decreases.

A case in which the quadrature amplitude modulation (QAM) is used will be specifically described as an example. When the communication distance between the optical transmission apparatus 1 and the optical reception apparatus 70_1 is long, the bit error rate increases when the multi-value degree for each sub-carrier increases using the modulation system such as 128-QAM or 256-QAM. Therefore, in this case, the multi-value degree for each sub-carrier is decreased using the modulation system such as 16-QAM or 64-QAM. Further, in this case, the amount of information included in one sub-carrier becomes small. Therefore, the number of sub-carriers is increased by the amount corresponding to this decreased amount.

On the other hand, when the communication distance between the optical transmission apparatus 1 and the optical reception apparatus 70_1 is short, it is possible to increase the multi-value degree for each sub-carrier using the modulation system such as 128-QAM or 256-QAM. In this case, the amount of information included in one sub-carrier can be increased. Therefore, the number of sub-carriers can be decreased by the amount corresponding to this increased amount.

Further, when the transmission path between the optical transmission apparatus 1 and the optical reception apparatus 70_1 is degraded (e.g., when tension is applied to an optical fiber), for example, the multi-value degree for each sub-carrier may decrease, for example. In this way, by decreasing the multi-value degree for each sub-carrier, it is possible to suppress the increase in the bit error rate.

The arrangements for the communication in the optical communication system described above may be determined by the optical transmission apparatus 1 and the optical reception apparatuses 70_1 and 70_2.

According to the present invention described in this exemplary embodiment, it is possible to provide the optical communication system and the method of controlling the optical communication system that can efficiently allocate the resources in the optical communication network.

Eleventh Exemplary Embodiment

Figure 22:
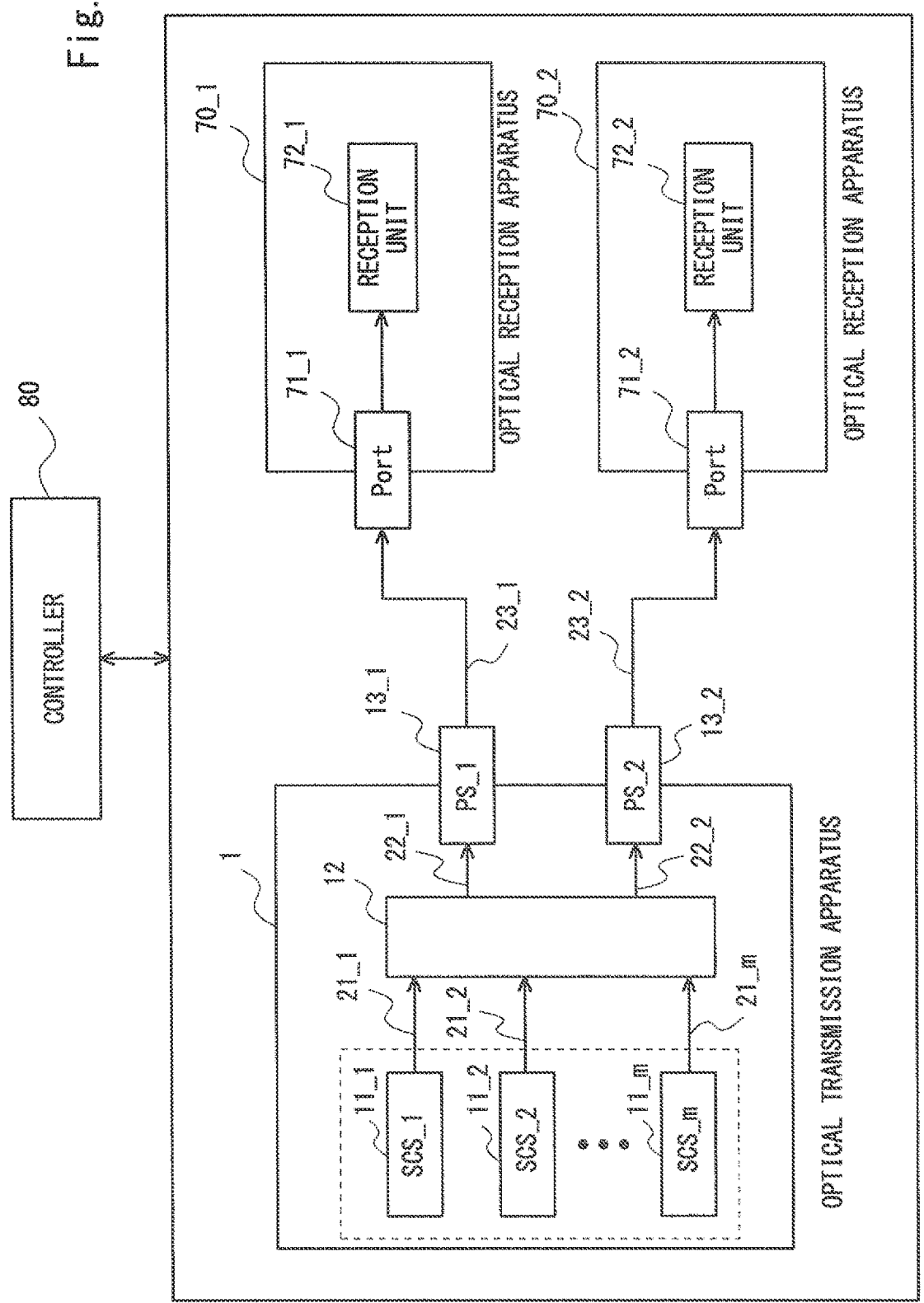
FIG. 22 is a block diagram showing an optical communication system according to an eleventh exemplary embodiment.

Next, an eleventh exemplary embodiment of the present invention will be described. FIG. 22 is a block diagram showing an optical communication system according to this exemplary embodiment. As shown in FIG. 22, the optical communication system according to this exemplary embodiment includes an optical transmission apparatus 1, optical reception apparatuses 70_1 and 70_2 that communicate with the optical transmission apparatus 1, and a controller 80. Since the optical communication system according to this exemplary embodiment is similar to the optical communication system described in the tenth exemplary embodiment except that the optical communication system according to this exemplary embodiment includes the controller 80, overlapping descriptions will be omitted. Further, in this exemplary embodiment as well, the optical transmission apparatuses 1_1 to 1_6 described in the first to fourth exemplary embodiments may be used as the optical transmission apparatus 1.

The controller 80 is provided to control the optical transmission apparatus 1 and the optical reception apparatuses 70_1 and 70_2. That is, the controller 80 is able to control the optical transmission apparatus 1 and the optical reception apparatuses 70_1 and 70_2 according to the state of communication between the optical transmission apparatus 1 and the optical reception apparatus 70_1 and the state of communication between the optical transmission apparatus 1 and the optical reception apparatus 70_2.

Figure 23:
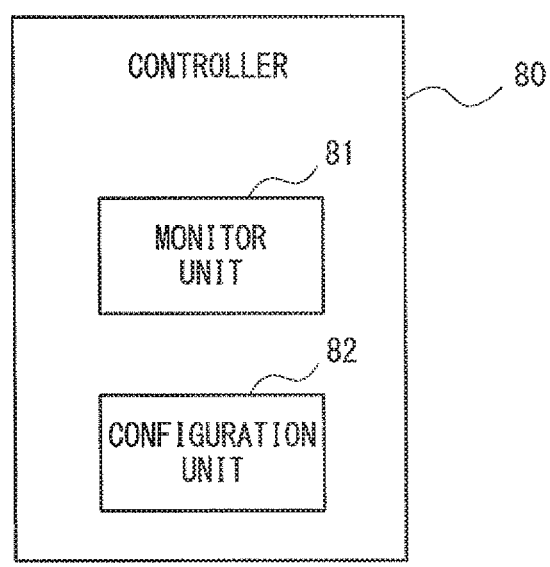
FIG. 23 is a block diagram showing a controller included in the optical communication system according to the eleventh exemplary embodiment.

FIG. 23 is a block diagram showing a configuration example of the controller 80. As shown in FIG. 23, the controller 80 includes a monitor unit 81 and a configuration unit 82. The monitor unit 81 monitors the state of communication of the optical communication system, which is the state of communication between the optical transmission apparatus 1 and the optical reception apparatus 70_1 and the state of communication between the optical transmission apparatus 1 and the optical reception apparatus 70_2. The configuration unit 82 configures the optical transmission apparatus 1 and the optical reception apparatuses 70_1 and 70_2 according to the result of monitoring in the monitor unit 81.

The controller 80 is able to configure the sub-carrier transmission unit used in the communication between the optical transmission apparatus 1 and the optical reception apparatus 70_1 and the sub-carrier transmission unit used in the communication between the optical transmission apparatus 1 and the optical reception apparatus 70_2. At this time, the controller 80 is able to change the sub-carrier transmission unit used in the communication with each of the optical reception apparatuses 70_1 and 70_2 by changing the configuration of the output unit 12 included in the optical transmission apparatus 1.

For example, the controller 80 is able to change the transmission capacity between the optical transmission apparatus 1 and the optical reception apparatus 70_1 and the transmission capacity between the optical transmission apparatus 1 and the optical reception apparatus 70_2 by controlling the number of sub-carrier transmission units 11_1 to 11_$m$ that output the optical transmission signals to the transmission ports 13_1 and 13_2.

Further, the controller 80 is able to set the wavelength band of the sub-carrier used in the communication between the optical transmission apparatus 1 and the optical reception apparatus 70_1 and the wavelength band of the sub-carrier used in the communication between the optical transmission apparatus 1 and the optical reception apparatus 70_2. For example, the controller 80 is able to set the wavelength bands so that the sub-carrier of the first wavelength band is used in the communication between the optical transmission apparatus 1 and the optical reception apparatus 70_1 and the sub-carrier of the second wavelength band is used in the communication between the optical transmission apparatus 1 and the optical reception apparatus 70_2. The first wavelength band and the second wavelength band are bands whose wavelengths do not overlap each other. For example, these wavelength bands are C band, L band, S band or the like used in the WDM.

Alternatively, the controller 80 is able to set the communication between the optical transmission apparatus 1 and the optical reception apparatus 70_1 according to at least one of the distance between the optical transmission apparatus 1 and the optical reception apparatus 70_1, a time zone in which the communication is performed, and the state of the transmission path between the optical transmission apparatus 1 and the optical reception apparatus 70_1. Alternatively, the controller 80 may set the communication between the optical transmission apparatus 1 and the optical reception apparatus 70_1 using at least one of the allocation of the wavelength band of the sub-carrier in the communication between the optical transmission apparatus 1 and the optical reception apparatus 70_1, the path of the optical signal, and the modulation system. The same is applicable to the settings of the communication between the optical transmission apparatus 1 and the optical reception apparatus 70_2.

For example, the controller 80 may decrease the multi-value degree for each sub-carrier and increase the number of sub-carriers as the communication distance between the optical transmission apparatus 1 and the optical reception apparatus 70_1 increases. On the other hand, the controller 80 may increase the multi-value degree for each sub-carrier and decrease the number of sub-carriers as the communication distance between the optical transmission apparatus 1 and the optical reception apparatus 70_1 decreases. The same is applicable to the modulation system in the communication between the optical transmission apparatus 1 and the optical reception apparatus 70_2.

Further, the controller 80 may decrease the multi-value degree for each sub-carrier, for example, when the transmission path between the optical transmission apparatus 1 and the optical reception apparatus 70_1 is degraded (when tension is applied to an optical fiber). In this way, by decreasing the multi-value degree for each sub-carrier, it is possible to suppress the increase in the bit error rate. The same is applicable to the modulation system between the optical transmission apparatus 1 and the optical reception apparatus 70_2.

While the optical communication system including one optical transmission apparatus and two optical reception apparatuses has been described in this exemplary embodiment, two or more optical transmission apparatuses and three or more optical reception apparatuses that constitute the optical communication system may be included. In this case as well, the controller 80 is able to configure the optical transmission apparatus and the optical reception apparatus in such a way that the whole optical communication system is in an optimal communication state.

The optimal communication state may be arbitrarily determined depending on users. The optimal communication state may be, for example, a communication state in which the cost of communication is minimized, a communication state in which the reliability of the communication is maximized (that is, a communication state in which the highest priority is given to keeping the communication, which is a communication state in which a redundant path is considered), a communication state in which the communication speed is particularly prioritized (a communication state that makes the path the shortest), a communication state in which the wavelength use efficiency becomes the maximum.

Further, the controller 80 is able to collect information regarding changes in the state of the network reported by the optical transmission apparatus and the optical reception apparatus (e.g., a failure in an optical transmission path and a degradation of an optical communication signal) and re-configure the optical transmission apparatus and the optical reception apparatus to follow the changes in the state of the network and to make the whole optical communication system be in the optimal communication state.

According to the present invention described above in this exemplary embodiment, it is possible to provide the optical communication system and the method of controlling the optical communication system capable of efficiently allocating the resources in the optical communication network. Further, it is possible to provide the optical communication system and the method of controlling the optical communication system which make the whole optical communication system be in the optimal communication state.

Twelfth Exemplary Embodiment

Figure 24:
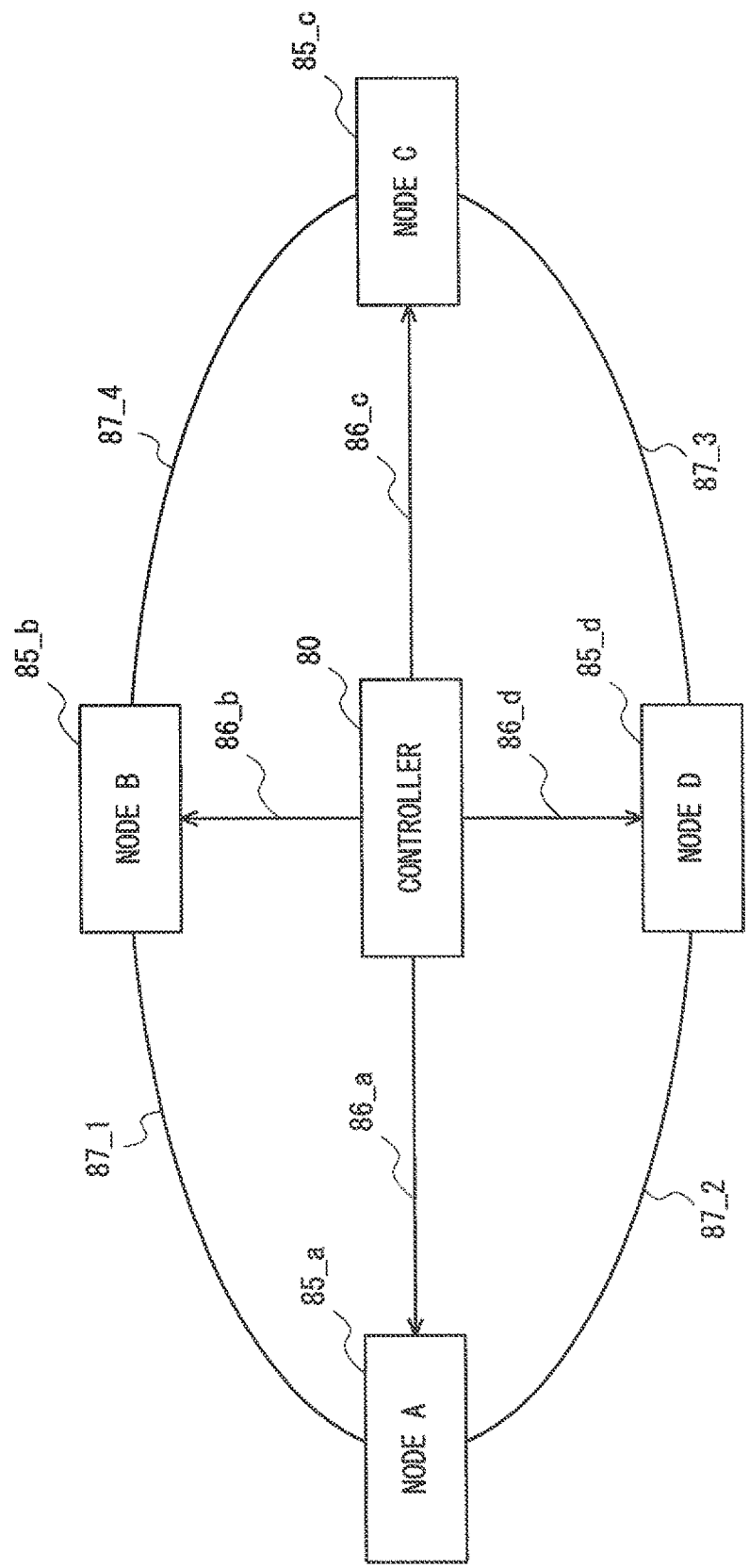
FIG. 24 is a block diagram showing a controller included in an optical communication system according to a twelfth exemplary embodiment.

Next, a twelfth exemplary embodiment of the present invention will be described. In this exemplary embodiment, a case in which the optical communication system according to the present invention is applied to a centrally controlled network will be described. FIG. 24 is a block diagram showing an optical communication system according to this exemplary embodiment. As shown in FIG. 24, the optical communication system according to this exemplary embodiment includes a controller 80 and a plurality of nodes A to D (85_a to 85_d). The controller 80 corresponds to the controller 80 described in the eleventh exemplary embodiment. Further, the plurality of nodes A to D (85_a to 85_d) are components that form the communication network. For example, the optical transmission apparatuses 1_1 to 1_6 described in the first to fourth exemplary embodiments, the optical reception apparatuses 2_1 to 2_6 described in the fifth to eighth exemplary embodiments, or the optical communication apparatus 3 described in the ninth exemplary embodiment may be used as the plurality of nodes A to D (85_a to 85_d).

The controller 80 monitors the state of the communication of each of the nodes 85_a to 85_d and controls the nodes 85_a to 85_d according to the state of the communication of the respective nodes 85_a to 85_d. The controller 80 outputs control signals 86_a to 86_d to control the respective nodes 85_a to 85_d to the respective nodes 85_a to 85_d.

The controller 80 is able to make arrangements for the allocation of resources used in the respective nodes 85_a to 85_d (e.g., arrangements for the sub-carrier transceiver units to be used) and the path of the optical signal. For example, the controller 80 is able to change the transmission capacity between the node 85_a and the node 85_b by determining the sub-carrier to be used in the communication between the node 85_a and the node 85_b.

Further, the controller 80 is able to set the wavelength bands of the sub-carriers used in the communication among the nodes 85_a to 85_d. For example, the controller 80 is able to set the wavelength bands so that the sub-carrier of the first wavelength band is used in the communication between the node 85_a and the node 85_b and the sub-carrier of the second wavelength band is used in the communication between the node 85_a and the node 85_d. The first wavelength band and the second wavelength band are bands whose wavelengths do not overlap each other. For example, these wavelength bands are C band, L band, S band or the like used in the WDM.

The controller 80 is also able to set the communication among the nodes 85_a to 85_d according to at least one of the distance between the nodes 85_a to 85_d, a time zone in which the communication is performed, and the state of the transmission path between the nodes 85_a to 85_d. The time zone in which the communication is performed is, for example, a predetermined time zone (day or night), a predetermined period, or a time zone of a predetermined event (e.g., execution of backup). Alternatively, the controller 80 may set the communication among the nodes 85_a to 85_d using at least one of an allocation of the wavelength band of the sub-carrier in the communication among the nodes 85_a to 85_d, a path of the optical signal, and the modulation system.

For example, the controller 80 may decrease the multi-value degree for each sub-carrier and increase the number of sub-carriers as the communication distance between the node 85_a and the node 85_b increases. On the other hand, the controller 80 may increase the multi-value degree for each sub-carrier and decrease the number of sub-carriers as the communication distance between the node 85_a and the node 85_b decreases. The same is applicable to the modulation system among the other nodes.

Further, the controller 80 may decrease the multi-value degree for each sub-carrier, for example, when the transmission path between the node 85_a and the node 85_b is degraded (when tension is applied to an optical fiber). In this way, by decreasing the multi-value degree for each sub-carrier, it is possible to suppress the increase in the bit error rate. The same is applicable to the modulation system among the other nodes.

While the optical communication system including four nodes 85_a to 85_d has been described as an example in this exemplary embodiment, the number of nodes that constitute the optical communication system may be larger than four.

The controller 80 is able to configure the optical transmission apparatus and the optical reception apparatus so that the whole optical communication system becomes in an optimal communication state. The optimal communication state may be arbitrarily determined depending on users. The optimal communication state may be, for example, a communication state in which the cost of communication is minimized, a communication state in which the reliability of the communication is maximized (that is, a communication state in which the highest priority is given to keeping the communication, which is a communication state in which a redundant path is considered), a communication state in which the communication speed is particularly prioritized (a communication state that makes the path the shortest), a communication state in which the wavelength use efficiency becomes the maximum.

Further, the controller 80 is able to collect information regarding changes in the state of the network reported by the optical transmission apparatus and the optical reception apparatus (e.g., a failure in an optical transmission path and a degradation of an optical communication signal) and re-configure the optical transmission apparatus and the optical reception apparatus to follow the changes in the state of the network and to make the whole optical communication system be in the optimal communication state.

For example, when a failure occurs in a shortest path 87_1 while data is being transmitted from the node 85_a to the node 85_b via the shortest path 87_1, the controller 80 is able to switch the path to a redundant path that transmits data to the node 85_b via a path 87_2 that connects the node 85_a and the node 85_d, a path 87_3 that connects the node 85_d and the node 85_c, and a path 87_4 that connects the node 85_c and the node 85_b to prevent the communication from being interrupted.

According to the present invention described above in this exemplary embodiment, it is possible to provide the optical communication system and the method of controlling the optical communication system capable of efficiently allocating the resources in the optical communication network. Further, it is possible to provide the optical communication system and the method of controlling the optical communication system which make the whole optical communication system be in the optimal communication state.

Thirteenth Exemplary Embodiment

Figure 25:
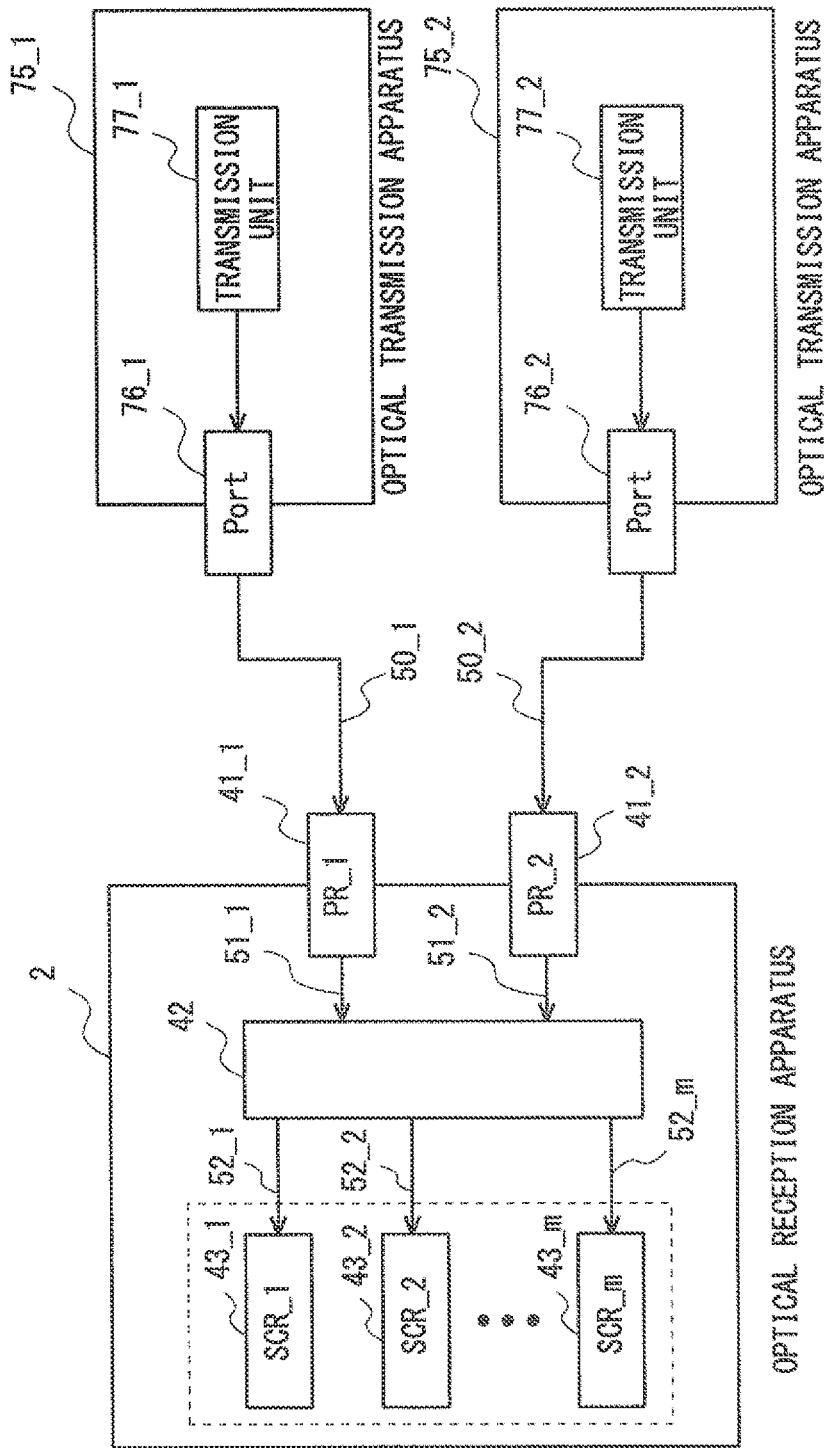
FIG. 25 is a block diagram showing an optical communication system according to a thirteenth exemplary embodiment.

Next, a thirteenth exemplary embodiment according to the present invention will be described. FIG. 25 is a block diagram showing an optical communication system according to this exemplary embodiment. As shown in FIG. 25, the optical communication system according to this exemplary embodiment includes an optical reception apparatus 2 and optical transmission apparatuses 75_1 and 75_2 that communicate with the optical reception apparatus 2. The optical reception apparatuses 2_1 to 2_6 described in the fifth to eighth exemplary embodiments may be used as the as the optical reception apparatus 2.

The optical reception apparatus 2 includes reception ports 41_1 and 41_2, a switch unit 42, and a plurality of sub-carrier reception units 43_1 to 43_$m$. The reception ports 41_1 and 41_2 respectively receive multiplexed optical reception signals 50_1 and 50_2. The switch unit 42 selectively outputs the sub-carrier reception signals 52_1 to 52_$m$ respectively included in the optical reception signals 51_1 and 51_2 respectively received by the reception ports 41_1 and 41_2 to the plurality of sub-carrier reception units 43_1 to 43_$m$. The plurality of sub-carrier reception units 43_1 to 43_$m$ receive the data included in the respective sub-carrier reception signals 52_1 to 52_$m$. Since the configuration and the operation of the optical reception apparatus 2 are similar to those of the optical reception apparatuses 2_1 to 2_6 described in the fifth to eighth exemplary embodiments, overlapping descriptions will be omitted.

A transmission unit 77_1 included in the optical transmission apparatus 75_1 is configured to be able to transmit the multiplexed optical transmission signal generated using a plurality of sub-carriers. A transmission unit 77_2 included in the optical transmission apparatus 75_2 is configured to be able to transmit the multiplexed optical transmission signal generated using a plurality of sub-carriers. The reception port 41_1 is connected to a transmission port 76_1 of the optical transmission apparatus 75_1 via an optical fiber and the reception port 41_2 is connected to a transmission port 76_2 of the optical transmission apparatus 75_2 via an optical fiber. The optical reception apparatus 2 receives the optical reception signal 50_1 transmitted from the optical transmission apparatus 75_1 via the reception port 41_1. Further, the optical reception apparatus 2 receives the optical reception signal 50_2 transmitted from the optical transmission apparatus 75_2 via the reception port 41_2.

At this time, the respective sub-carrier reception units of the plurality of sub-carrier reception units 43_1 to 43_$m$ that receive the optical reception signals via the reception port 41_1 may receive first data transmitted from the optical transmission apparatus 75_1 (data that has been serial-parallel converted) in parallel. Further, the respective sub-carrier reception units of the plurality of sub-carrier reception units 43_1 to 43_$m$ that receive the optical reception signals via the reception port 41_2 may receive second data transmitted from the optical transmission apparatus 75_2 (data that has been serial-parallel converted) in parallel.

That is, the optical transmission apparatus 75_1 serial-parallel converts the first data to be transmitted to the optical reception apparatus 2 and transmits each of the pieces of data that have been serial-parallel converted to the optical reception apparatus 2 using the respective optical transmission signals. The optical reception apparatus 2 receives the sub-carrier reception signal included in the optical transmission signal (that is, optical reception signal 50_1) transmitted from the optical transmission apparatus 75_1 by the sub-carrier reception unit. By parallel-serial converting the data included in the sub-carrier reception signal, the first data that has been parallel-serial converted can be obtained. The same is applicable to the second data transmitted to the optical reception apparatus 2 from the optical transmission apparatus 75_2.

Further, in the optical communication system according to this exemplary embodiment, the transmission capacity between the optical reception apparatus 2 and the optical transmission apparatus 75_1 corresponds to the number of sub-carrier reception units connected to the reception port 41_1. In a similar way, the transmission capacity between the optical reception apparatus 2 and the optical transmission apparatus 75_2 corresponds to the number of sub-carrier reception units connected to the reception port 41_2. For example, in order to increase the transmission capacity between the optical reception apparatus 2 and the optical transmission apparatus 75_1, the switch unit 42 is controlled to increase the number of sub-carrier reception units connected to the reception port 41_1.

Further, the sub-carrier of the first wavelength band may be used as the transmission between the optical reception apparatus 2 and the optical transmission apparatus 75_1 and the sub-carrier of the second wavelength band may be used as the transmission between the optical reception apparatus 2 and the optical transmission apparatus 75_2. The first wavelength band and the second wavelength band are bands whose wavelengths do not overlap each other. For example, these wavelength bands are C band, L band, S band or the like used in the WDM.

The settings of the communication between the optical reception apparatus 2 and the optical transmission apparatus 75_1 may be determined according to at least one of the distance between the optical reception apparatus 2 and the optical transmission apparatus 75_1, a time zone in which the communication is performed, and the state of the transmission path between the optical reception apparatus 2 and the optical transmission apparatus 75_1. Alternatively, the communication between the optical reception apparatus 2 and the optical transmission apparatus 75_1 may be set using at least one of the allocation of the wavelength band of the sub-carrier in the communication between the optical reception apparatus 2 and the optical transmission apparatus 75_1, the path of the optical signal, and the modulation system. The same is applicable to the settings of the communication between the optical reception apparatus 2 and the optical transmission apparatus 75_2.

For example, the multi-value degree for each sub-carrier may decrease and the number of sub-carriers may increase as the communication distance between the optical reception apparatus 2 and the optical transmission apparatus 75_1 increases. On the other hand, the multi-value degree for each sub-carrier may increase and the number of sub-carriers may decrease as the communication distance between the optical reception apparatus 2 and the optical transmission apparatus 75_1 decreases. The same is applicable to the modulation system in the communication between the optical reception apparatus 2 and the optical transmission apparatus 75_2.

Further, for example, when the transmission path between the optical reception apparatus 2 and the optical transmission apparatus 75_1 is degraded (when tension is applied to an optical fiber), for example, the multi-value degree for each sub-carrier may decrease. In this way, by decreasing the multi-value degree for each sub-carrier, it is possible to suppress the increase in the bit error rate.

The arrangements for the communication in the optical communication system described above may be determined by the optical reception apparatus 2 and the optical transmission apparatuses 75_1 and 75_2. Further, the optical communication system according to this exemplary embodiment may include a controller like the optical communication system described in the eleventh exemplary embodiment. In this exemplary embodiment as well, the controller may control the optical reception apparatus 2 and the optical transmission apparatuses 75_1 and 75_2 according to the state of the communication between the optical reception apparatus 2 and the optical transmission apparatus 75_1 and the state of the communication between the optical reception apparatus 2 and the optical transmission apparatus 75_2.

According to the invention described in this exemplary embodiment described above, it is possible to provide the optical communication system and the method of controlling the optical communication system capable of efficiently allocating the resources in the optical communication network.

Fourteenth Exemplary Embodiment

Figure 26:
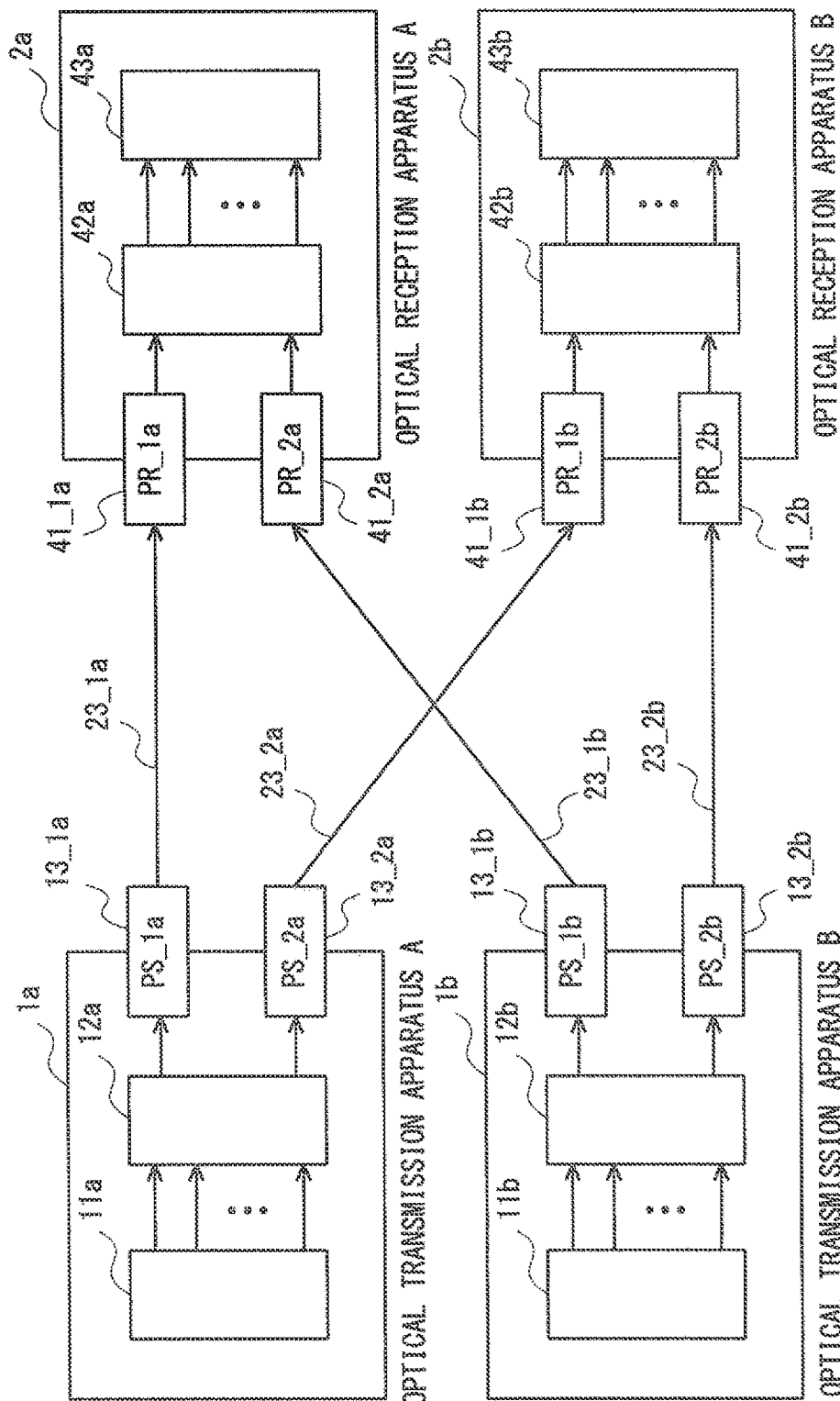
FIG. 26 is a block diagram showing an optical communication system according to a fourteenth exemplary embodiment.

Next, a fourteenth exemplary embodiment of the present invention will be described. FIG. 26 is a block diagram showing an optical communication system according to this exemplary embodiment. As shown in FIG. 26, the optical communication system according to this exemplary embodiment includes optical transmission apparatuses 1a and 1b and optical reception apparatuses 2a and 2b.

The optical transmission apparatus 1a includes a plurality of sub-carrier transmission units 11a, an output unit 12a, and transmission ports 13_1a and 13_2a. The optical transmission apparatus 1b includes a plurality of sub-carrier transmission units 11b, an output unit 12b, and transmission ports 13_1b and 13_2b. The optical transmission apparatuses 1_1 to 1_6 described in the first to fourth exemplary embodiments may be used as the optical transmission apparatuses 1a and 1b. For example, the sub-carrier transmission units 11a and 11b correspond to the plurality of sub-carrier transmission units 11_1 to 11_m shown in FIG. 5, the output units 12a and 12b correspond to the output unit 12 shown in FIG. 5, and the transmission ports 13_1a, 13_2a, 13_1b, and 13_2b correspond to the transmission ports 13_1 and 13_2 shown in FIG. 5.

The optical reception apparatus 2a includes reception ports 41_1a and 41_2a, a switch unit 42a, and a plurality of sub-carrier reception units 43a. The optical reception apparatus 2b includes reception ports 41_1b and 41_2b, a switch unit 42b, and a plurality of sub-carrier reception units 43b. The optical reception apparatuses 2_1 to 2_6 described in the fifth to eighth exemplary embodiments may be used as the optical reception apparatuses 2a and 2b. For example, the reception ports 41_1a, 41_2a, 41_1b, and 41_2b correspond to the reception ports 41_1 and 41_2 shown in FIG. 15, the switch units 42a and 42b correspond to the switch unit 42 shown in FIG. 15, and the sub-carrier reception units 43a and 43b correspond to the sub-carrier reception units 43_1 to 43_m shown in FIG. 15.

As shown in FIG. 26, the transmission port 13_1a of the optical transmission apparatus 1a is connected to the reception port 41_1a of the optical reception apparatus 2a. The transmission port 13_2a of the optical transmission apparatus 1a is connected to the reception port 41_1b of the optical reception apparatus 2b. The transmission port 13_1b of the optical transmission apparatus 1b is connected to the reception port 41_2a of the optical reception apparatus 2a. The transmission port 13_2b of the optical transmission apparatus 1b is connected to the reception port 41_2b of the optical reception apparatus 2b.

At this time, the optical transmission apparatus 1a transmits data to the optical reception apparatus 2a using an optical transmission signal 23_1a generated using the plurality of sub-carriers of the first wavelength band. Further, the optical transmission apparatus 1a transmits data to the optical reception apparatus 2b using an optical transmission signal 23_2a generated using the plurality of sub-carriers of the second wavelength band. Further, the optical transmission apparatus 1b transmits data to the optical reception apparatus 2a using an optical transmission signal 23_1b generated using the plurality of sub-carriers of the second wavelength band. Further, the optical transmission apparatus 1b transmits data to the optical reception apparatus 2b using an optical transmission signal 23_2b generated using the plurality of sub-carriers of the first wavelength band. The first wavelength band and the second wavelength band are bands whose wavelengths do not overlap each other. For example, these wavelength bands are C band, L band, S band or the like used in the WDM.

By setting the combination of the wavelength bands of the optical transmission signals 23_1a, 23_2a, 23_1b, and 23_2b used in the communication between the optical transmission apparatuses 1a and 1b and the optical reception apparatuses 2a and 2b as stated above, it is possible to prevent the wavelength bands of the sub-carriers used in the communication between the optical transmission apparatuses 1a and 1b and the optical reception apparatuses 2a and 2b from being overlapped each other.

In the optical communication system according to this exemplary embodiment as well, the settings of the communication between the optical transmission apparatuses 1a and 1b and the optical reception apparatuses 2a and 2b may be determined according to at least one of the distance between the optical transmission apparatuses 1a and 1b and the optical reception apparatuses 2a and 2b, a time zone in which the communication is performed, and the state of the transmission path between the optical transmission apparatuses 1a and 1b and the optical reception apparatuses 2a and 2b. Alternatively, the communication between the optical transmission apparatuses 1a and 1b and the optical reception apparatuses 2a and 2b may be set using at least one of the allocation of the wavelength band of the sub-carrier in the communication between the optical transmission apparatuses 1a and 1b and the optical reception apparatuses 2a and 2b, the path of the optical signal, and the modulation system.

According to the present invention described in this exemplary embodiment, it is possible to provide the optical communication system and the method of controlling the optical communication system capable of efficiently allocating the resources in the optical communication network.

Fifteenth Exemplary Embodiment

Figure 27:
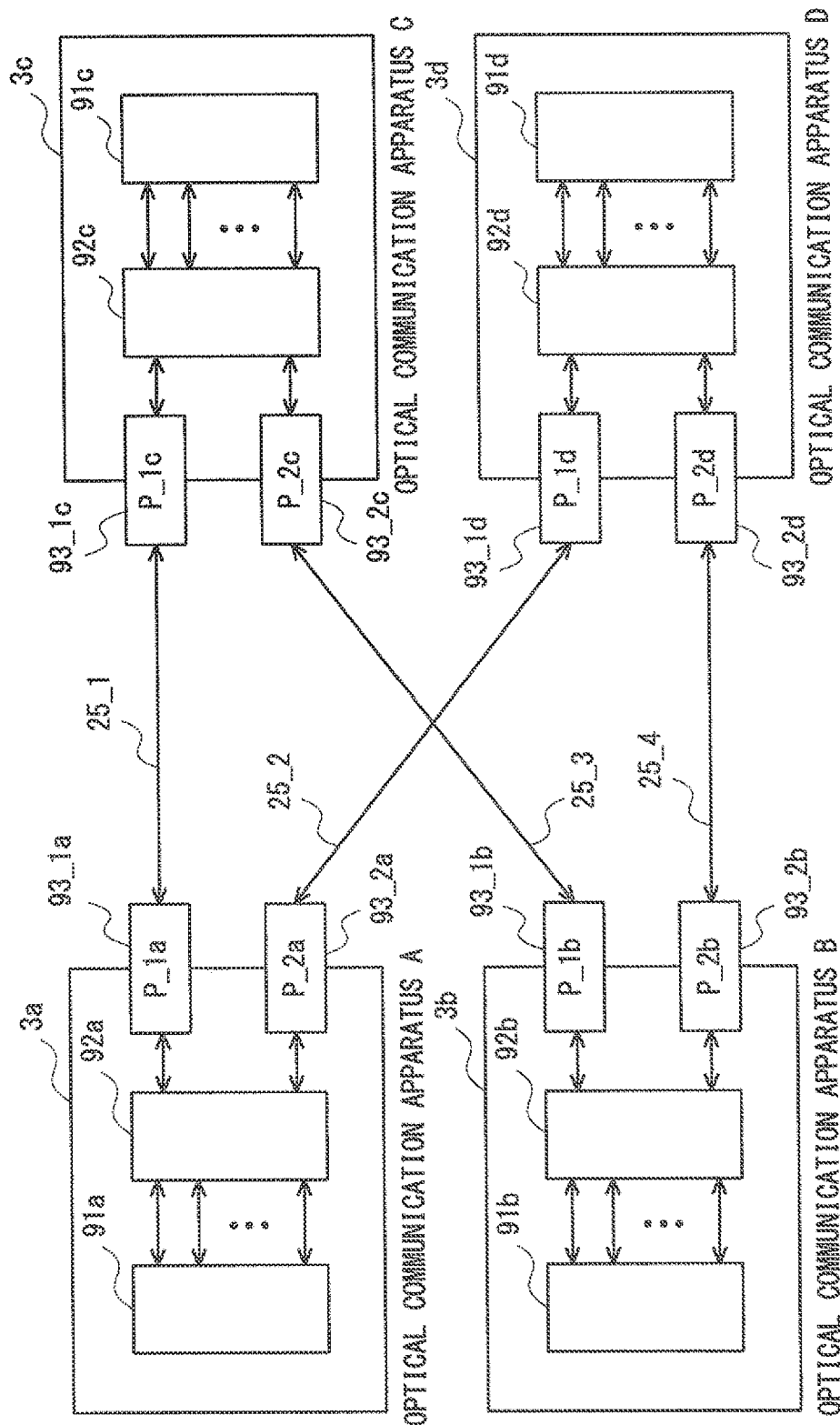
FIG. 27 is a block diagram showing an optical communication system according to a fifteenth exemplary embodiment.

Next, a fifteenth exemplary embodiment of the present invention will be described. FIG. 27 is a block diagram showing an optical communication system according to this exemplary embodiment. As shown in FIG. 27, the optical communication system according to this exemplary embodiment includes optical communication apparatuses 3a to 3d. The optical communication apparatuses 3a to 3d are optical communication apparatuses capable of transmitting and receiving data.

The optical communication apparatus 3a includes a sub-carrier transceiver unit 91a, an optical transmission/reception signal switch unit 92a, and transmission/reception ports 93_1a and 93_2a. The optical communication apparatus 3b includes a sub-carrier transceiver unit 91b, an optical transmission/reception signal switch unit 92b, and transmission/reception ports 93_1b and 93_2b. The optical communication apparatus 3c includes a sub-carrier transceiver unit 91c, an optical transmission/reception signal switch unit 92c, and transmission/reception ports 93_1c and 93_2c. The optical communication apparatus 3d includes a sub-carrier transceiver unit 91d, an optical transmission/reception signal switch unit 92d, and transmission/reception ports 93_1d and 93_2d. The optical communication apparatus 3 described in the ninth exemplary embodiment (see FIG. 20) may be used as the optical communication apparatuses 3a to 3d. For more detailed configurations, see FIG. 5 (second exemplary embodiment) and FIG. 15 (sixth exemplary embodiment).

The sub-carrier transceiver unit 91a of the optical communication apparatus 3a includes the sub-carrier transmission units 11_1 to 11_m shown in FIG. 5 and the sub-carrier reception units 43_1 to 43_m shown in FIG. 15, the optical transmission/reception signal switch unit 92a includes the output unit 12 shown in FIG. 5 and the switch unit 42 shown in FIG. 15, and the transmission/reception ports 93_1a and 93_2a correspond to the transmission ports 13_1 and 13_2 shown in FIG. 5 and the reception ports 41_1 and 41_2 shown in FIG. 15. The same is applicable to the other optical communication apparatuses 3b to 3d.

As shown in FIG. 27, the transmission/reception port 93_1a of the optical communication apparatus 3a is connected to the transmission/reception port 93_1c of the optical communication apparatus 3c. The transmission/reception port 93_2a of the optical communication apparatus 3a is connected to the transmission/reception port 93_1d of the optical communication apparatus 3d. The transmission/reception port 93_1b of the optical communication apparatus 3b is connected to the transmission/reception port 93_2c of the optical communication apparatus 3c. The transmission/reception port 93_2b of the optical communication apparatus 3b is connected to the transmission/reception port 93_2d of the optical communication apparatus 3d.

In this case, the optical communication apparatus 3a and the optical communication apparatus 3c communicate with each other using an optical signal 25_1 generated using the plurality of sub-carriers of the first wavelength band. Further, the optical communication apparatus 3a and the optical communication apparatus 3d communicate with each other using an optical signal 25_2 generated using the plurality of sub-carriers of the second wavelength band. Further, the optical communication apparatus 3b and the optical communication apparatus 3c communicate with each other using an optical signal 25_3 generated using the plurality of sub-carriers of the second wavelength band. Further, the optical communication apparatus 3b and the optical communication apparatus 3d communicate with each other using an optical signal 25_4 generated using the plurality of sub-carriers of the first wavelength band. The first wavelength band and the second wavelength band are bands whose wavelengths do not overlap each other. For example, these wavelength bands are C band, L band, S band or the like used in the WDM.

By setting the combination of the wavelength bands of the optical signals 25_1 to 25_4 used in the communication among the optical communication apparatuses 3a to 3d as stated above, it is possible to prevent the wavelength bands of the sub-carriers used in the communication among the optical communication apparatuses 3a to 3d from being overlapped each other.

In the optical communication system according to this exemplary embodiment as well, the settings of the communication among the optical communication apparatuses 3a to 3d may be determined according to at least one of the distance between the optical communication apparatuses 3a and 3b and the optical communication apparatuses 3c and 3d, a time zone in which the communication is performed, and the state of the transmission path between the optical communication apparatuses 3a and 3b and the optical communication apparatuses 3c and 3d. Alternatively, the communication between the optical communication apparatuses 3a and 3b and the optical communication apparatuses 3c and 3d may be set using at least one of the allocation of the wavelength band of the sub-carrier in the communication between the optical communication apparatuses 3a and 3b and the optical communication apparatuses 3c and 3d, the path of the optical signal, and the modulation system.

According to the present invention described in this exemplary embodiment, it is possible to provide the optical communication system and the method of controlling the optical communication system that can efficiently allocate the resources in the optical communication network.

While the present invention has been described as a hardware configuration in the above exemplary embodiments, the present invention is not limited to the hardware configuration. The present invention may also achieve desired processing by causing a CPU (Central Processing Unit) to execute a computer program.

The program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

While the present invention has been described with reference to the exemplary embodiments, the present invention is not limited to the above exemplary embodiments. Various changes that can be understood by those skilled in the art can be made to the configurations and the details of the present invention within the scope of the present invention.

REFERENCE SIGNS LIST 1, 1_1-1_6 OPTICAL TRANSMISSION APPARATUS
2, 2_1-2_6 OPTICAL RECEPTION APPARATUS
3 OPTICAL COMMUNICATION APPARATUS
11, 11_1-11_m SUB-CARRIER TRANSMISSION UNIT
12 OPTICAL TRANSMISSION SIGNAL SWITCH UNIT
13 TRANSMISSION PORT
14 LIGHT SOURCE
15 SUB-CARRIER GENERATION UNIT
16 SIGNAL CONVERTER
21_1-21_m OPTICAL TRANSMISSION SIGNAL
22_1, 22_2 OPTICAL TRANSMISSION SIGNAL
23_1, 23_2 OPTICAL TRANSMISSION SIGNAL
26_1 FIRST PATH
26_2 SECOND PATH
30 SWITCH UNIT
31_1, 31_2 OPTICAL MULTIPLEXER
32 OPTICAL MULTIPLEXER
33 OPTICAL DEMULTIPLEXER
41_1, 41_2 RECEPTION PORT
42 SWITCH UNIT
43_1-43_m SUB-CARRIER RECEPTION UNIT
44_1, 44_2 LOCAL OSCILLATOR
45 SIGNAL PROCESSING UNIT
51_1, 51_2 OPTICAL RECEPTION SIGNAL

52_1-52_m SUB-CARRIER RECEPTION SIGNAL
53_1-53_6 RECEPTION SIGNAL
60_1, 60_2 OPTICAL BRANCHING DEVICE
61 OPTICAL CHANGEOVER SWITCH
62 OPTICAL MULTIPLEXER
63 OPTICAL DEMULTIPLEXER
64 MULTIPLEXED OPTICAL SIGNAL
80 CONTROLLER
81 MONITOR UNIT
82 CONFIGURATION UNIT

The invention claimed is:

1. An optical transmission apparatus comprising:
a signal processor configured to convert a first data stream into a first electrical signal and a second electrical signal;
a first optical transmitter configured to convert the first electrical signal into a first optical signal;
a second optical transmitter configured to convert the second electrical signal into a second optical signal; and
an output interface configured to output the first optical signal and the second optical signal to a first optical reception apparatus,
wherein:
the signal processor converts a second data stream into a third electrical signal and converts a third data stream into a fourth electrical signal, the second and third data streams transmitted via different paths;
the first optical transmitter converts the third electrical signal into a third optical signal;
the second optical transmitter converts the fourth electrical signal into a fourth optical signal; and
the output interface outputs the third optical signal to the first optical reception apparatus and outputs the fourth optical signal to a second optical reception apparatus.

2. The optical transmission apparatus according to claim 1, wherein the third optical signal is generated by a first sub-carrier and the fourth optical signal is generated by a second sub-carrier, and predetermined parameters of the first and second sub-carriers are allocated in such a way that they do not overlap with each other.

3. The optical transmission apparatus according to claim 2, wherein:
each of the plurality of parameters comprises a plurality of parameters, and
the first and second sub-carriers are arranged in such a way that they do not overlap with each other.

4. The optical transmission apparatus according to claim 2, wherein each of the predetermined parameters comprises at least one of a wavelength, a polarization, and a time.

5. The optical transmission apparatus according to claim 1, wherein the third and fourth optical signals have wavelengths different from each other.

6. The optical transmission apparatus according to claim 1, wherein:
the first optical transmitter is supplied with a first sub-carrier from a first light source, and the second optical transmitter is supplied with a second sub-carrier from a second light source.

7. The optical transmission apparatus according to claim 5, further comprising:
a single light source; and
a sub-carrier generator configured to generate the first and second sub-carriers using light generated in the single light source and supplies the first and second sub-carriers that have been generated to the first and second optical transmitters, respectively.

8. The optical transmission apparatus according to claim 7, wherein the sub-carrier generator modulates light generated in the single light source using orthogonal frequency division multiplexing to generate the first sub-carrier and the second sub-carrier that are perpendicular to each other.

9. The optical transmission apparatus according to claim 1, wherein:
when the first and second electrical signals are converted based on the first data stream, data that has been serial-parallel converted is supplied to the first and second optical transmitters, and
the first and second optical transmitters transmit the data that has been serial-parallel converted in parallel.

10. The optical transmission apparatus according to claim 1, further comprising:
first and second optical multiplexers that
correspond to the first and second optical reception apparatuses, respectively, and
are configured to multiplex the third and fourth optical signals output from the output interface, respectively.

11. The optical transmission apparatus according to claim 10, wherein the output interface comprises a first and second output interfaces that respectively correspond to the first and second optical transmitters and switch output destinations of the third and fourth optical signals output from the first and second optical transmitters to the first optical multiplexer and the second optical multiplexer, respectively.

12. The optical transmission apparatus according to claim 1, further comprising:
an optical multiplexer that multiplexes the third and fourth optical signals output from the first and second optical transmitters; and
an optical demultiplexer that selectively outputs the third and fourth optical signals included in the multiplexed optical signal output from the optical multiplexer to the first and second optical reception apparatuses.

13. An optical communication apparatus comprising:
a signal processor configured to convert a first data stream into a first electrical signal and a second electrical signal;
a first optical transmitter configured to convert the first electrical signal into a first optical signal;
a second optical transmitter configured to convert the second electrical signal into a second optical signal;
a first output interface configured to output the first optical signal and the second optical signal to a first optical reception apparatus, wherein:
the signal processor converts a second data stream into a third electrical signal and converts a third data stream into a fourth electrical signal, the second and third data streams transmitted via different paths,
the first optical transmitter converts the third electrical signal into a third optical signal,
the second optical transmitter converts the fourth electrical signal into a fourth optical signal, and
the first output interface outputs the third optical signal to the first optical reception apparatus and outputs the fourth optical signal to a second optical reception apparatus;
first and second receivers configured to receive sub-carrier reception signals; and
a second output interface configured to output a first sub-carrier reception signal and a second sub-carrier reception signal that have been input to the first and second receivers, wherein:

when the first and second sub-carrier reception signals correspond to the first and second optical signals respectively, the second output interface receives the first and second sub-carrier reception signals via one path and outputs the first sub-carrier reception signal to the first receiver and the second sub-carrier reception signal to the second receiver, and when the first sub-carrier reception signal and the second sub-carrier reception signal correspond to the third and fourth optical signals respectively, the second output interface receives the first and second sub-carrier reception signals via paths different from each other and outputs the first sub-carrier reception signal to the first receiver and the second sub-carrier reception signal to the second receiver.

14. An optical communication system comprising an optical transmission apparatus and first and second optical reception apparatuses, wherein:

the optical transmission apparatus comprises:

a signal processor configured to convert a first data stream into a first electrical signal and a second electrical signal;

a first optical transmitter configured to convert the first electrical signal into a first optical signal;

a second optical transmitter configured to convert the second electrical signal into a second optical signal; and an output interface configured to output the first optical signal and the second optical signal to the first optical reception apparatus, wherein:

the signal processor converts a second data stream into a third electrical signal and converts a third data stream into a fourth electrical signal, the second and third data streams transmitted via different paths;

the first optical transmitter converts the third electrical signal into a third optical signal;

the second optical transmitter converts the fourth electrical signal into a fourth optical signal; and the output interface outputs the third optical signal to the first optical reception apparatus and outputs the fourth optical signal to a second optical reception apparatus.

15. The optical communication system according to claim 14, wherein the third optical signal is generated by a first sub-carrier and the fourth optical signal is generated by a second sub-carrier, and predetermined parameters of the first and second sub-carriers are allocated in such a way that they do not overlap with each other.

16. The optical communication system according to claim 15, wherein:

each of the plurality of parameters comprises a plurality of parameters, and the first and second sub-carriers are arranged in such a way that they do not overlap with each other.

17. The optical communication system according to claim 15, wherein each of the predetermined parameters comprises at least one of a wavelength, a polarization, and a time.

18. The optical communication system according to claim 14, wherein the third and fourth optical signals have wavelengths different from each other.

19. The optical communication system according to claim 14, wherein:

the first optical transmitter is supplied with a first sub-carrier from a first light source, and the second optical transmitter is supplied with a second sub-carrier from a second light source.

20. The optical communication system according to claim 18, further comprising:

a single light source; and a sub-carrier generator configured to generate the first and second sub-carriers using light generated in the single light source and supplies the first and second sub-carriers that have been generated to the first and second optical transmitters, respectively.

21. The optical communication system according to claim 20, wherein the sub-carrier generator modulates light generated in the single light source using orthogonal frequency division multiplexing to generate the first sub-carrier and the second sub-carrier that are perpendicular to each other.

22. The optical communication system according to claim 14, wherein:

when the first and second electrical signals are converted based on the first data stream, data that has been serial-parallel converted is supplied to the first and second optical transmitters, and the first and second optical transmitters transmit the data that has been serial-parallel converted in parallel.

23. The optical communication system according to claim 14, wherein the optical transmission apparatus further comprises:

first and second optical multiplexers that correspond to the first and second optical reception apparatuses, respectively, and multiplex the third and fourth optical signals output from the output interface, respectively.

24. The optical communication system according to claim 23, wherein the output interface comprises a first and second output interfaces that respectively correspond to the first and second optical transmitters and switch output destinations of the third and fourth optical signals output from the first and second optical transmitters to the first optical multiplexer or the second optical multiplexer, respectively.

25. The optical communication system according to claim 14, wherein the optical transmission apparatus further comprises:

an optical multiplexer that multiplexes the third and fourth optical signals output from the first and second optical transmitters, respectively; and an optical demultiplexer that selectively outputs the third and fourth optical signals included in the multiplexed optical signal output from the optical multiplexer to the first and second optical reception apparatuses.

26. A method of controlling an optical communication system comprising an optical transmission apparatus and first and second optical reception apparatuses, comprising:

converting, by a signal processor, a first data stream into a first electrical signal and a second electrical signal;

converting, by a first optical transmitter, the first electrical signal into a first optical signal;

converting, by a second optical transmitter, the second electrical signal into a second optical signal; and outputting, by an output interface, the first optical signal and the second optical signal to the first optical reception apparatus, wherein the signal processor converts a second data stream into a third electrical signal and converts a third data stream into a fourth electrical signal, the second and third data stream transmitted via different paths, wherein the third electrical signal is converted by the first optical transmitter into a third optical signal, wherein the fourth electrical signal is converted by the second optical transmitter into a fourth optical signal, wherein the third optical signal is outputted by the output interface to the first optical reception apparatus and the second optical signal is outputted by the output interface to the second optical reception apparatus, and wherein each of the optical transmission apparatus and the first and second optical reception apparatuses is controlled according to a state of communication of the optical communication system.

27. A non-transitory computer-readable storage medium storing a program for causing a computer to perform a method for controlling an optical communication system comprising an optical transmission apparatus and first and second optical reception apparatuses, wherein the method comprises:

controlling a signal processor to convert a first data stream into a first electrical signal and a second electrical signal;

converting, by a first optical transmitter, the first electrical signal into a first optical signal;

converting, by a second optical transmitter, the second electrical signal into a second optical signal; and outputting, by an output interface, the first optical signal and the second optical signal to the first optical reception apparatus, wherein the signal processor converts a second data stream into a third electrical signal and converts a third data stream into a fourth electrical signal, the second and third data streams transmitted via different paths, wherein the third electrical signal is converted by the first optical transmitter into a third optical signal, wherein the fourth electrical signal is converted by the second optical transmitter into a fourth optical signal, wherein the third optical signal is outputted by the output interface to the first optical reception apparatus and the second optical signal is outputted by the output interface to the second optical reception apparatus, and wherein the program causes the computer to execute processing for controlling each of the optical transmission apparatus and the first and second optical reception apparatuses according to a state of communication of the optical communication system.

28. An optical transmission method comprising:

converting, by a signal processor, a first data stream into a first electrical signal and a second electrical signal;

converting, by a first optical transmitter, the first electrical signal into a first optical signal;

converting, by a second optical transmitter, the second electrical signal into a second optical signal; and outputting, by an output interface, the first optical signal and the second optical signal to a first optical reception apparatus, wherein the signal processor converts a second data stream into a third electrical signal and converts a third data stream into the third electrical signal, the second and third data streams transmitted via different paths, wherein the third electrical signal is converted by the first optical transmitter into a third optical signal, wherein the fourth electrical signal is converted by the second optical transmitter into a fourth optical signal, and wherein the first optical signal is outputted by the output interface to the first optical reception apparatus and the second optical signal is outputted by the output interface to the second optical reception apparatus.

* * * * *